(12) United States Patent
Korobkin

(10) Patent No.: US 9,129,433 B1
(45) Date of Patent: Sep. 8, 2015

(54) PHOTOGRAMMETRY ENGINE FOR MODEL CONSTRUCTION

(71) Applicant: Carl Phillip Korobkin, Los Altos, CA (US)

(72) Inventor: Carl Phillip Korobkin, Los Altos, CA (US)

( * ) Notice: Subject to any disclaimer, the term of this patent is extended or adjusted under 35 U.S.C. 154(b) by 0 days.

(21) Appl. No.: 14/330,699

(22) Filed: Jul. 14, 2014

Related U.S. Application Data

(63) Continuation of application No. 13/972,770, filed on Aug. 21, 2013, now Pat. No. 8,818,080, which is a continuation of application No. 13/726,490, filed on Dec. 24, 2012, now Pat. No. 8,542,911, which is a continuation of application No. 12/701,434, filed on Feb. 5, 2010, now Pat. No. 8,369,610, which is a continuation of application No. 11/168,141, filed on Jun. 27, 2005, now Pat. No. 7,720,276, which is a continuation of application No. 09/344,814, filed on Jun. 25, 1999, now Pat. No. 6,912,293.

(60) Provisional application No. 60/090,749, filed on Jun. 26, 1998.

(51) Int. Cl.
G06K 9/00 (2006.01)
G06T 17/10 (2006.01)

(52) U.S. Cl.
CPC ..................................... *G06T 17/10* (2013.01)

(58) Field of Classification Search
USPC ........ 382/106, 154; 348/42–60; 345/419–427
See application file for complete search history.

(56) References Cited

U.S. PATENT DOCUMENTS

| | | | | |
|---|---|---|---|---|
| 5,856,844 A | * | 1/1999 | Batterman et al. | 348/207.99 |
| 5,978,521 A | * | 11/1999 | Wallack et al. | 382/294 |
| 6,304,298 B1 | * | 10/2001 | Steinberg et al. | 348/587 |
| 6,600,511 B1 | * | 7/2003 | Kaneko et al. | 348/231.3 |

* cited by examiner

*Primary Examiner* — Alex Liew
(74) *Attorney, Agent, or Firm* — Fernandez & Associates, LLP

(57) ABSTRACT

A system and methods for accessing 2D digital images and 3D geometric models over a network (preferably the Internet) and transforming and composing that media along with 2D digital image and 3D geometric model media, acquired by other means, into enhanced 2D image and 3D model representations for virtual reality visualization and simulation is disclosed. Digital images and models from a network and other sources are incorporated and manipulated through an interactive graphical user interface. A photogrammetric media processing engine automatically extracts virtual sensor (camera) and geometric models from imagery. Extracted information is used by a reconstruction processor to automatically and realistically compose images and models. A rendering system provides real-time visualization and simulation of the constructed media. A client-server processing model for deployment of the media processing engine system over a network is disclosed.

11 Claims, 52 Drawing Sheets

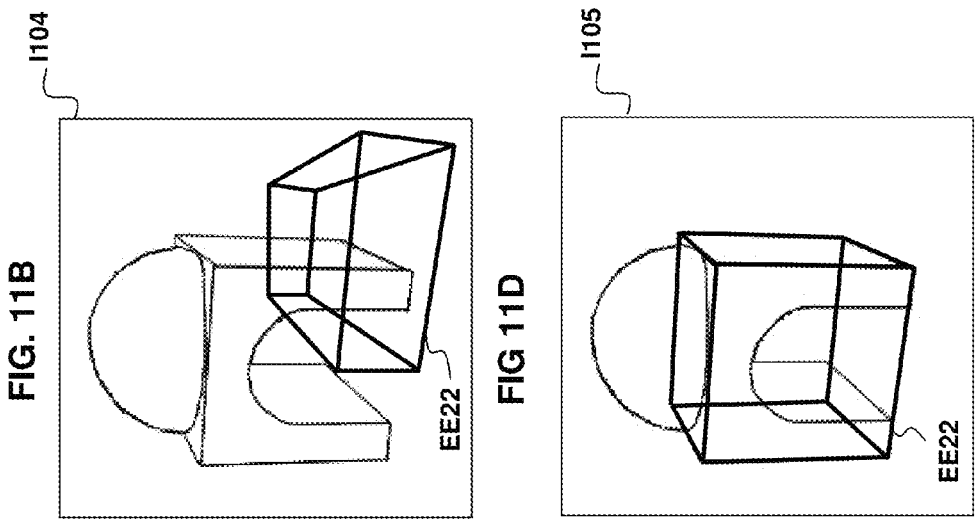
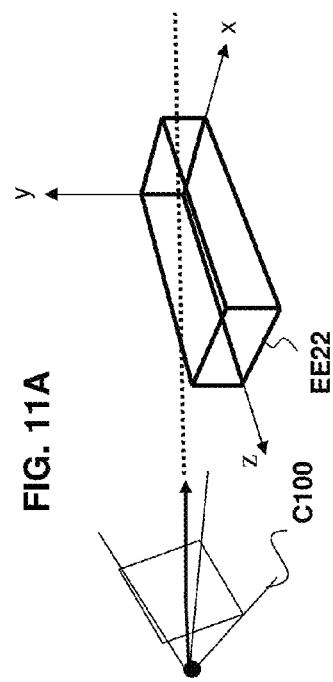
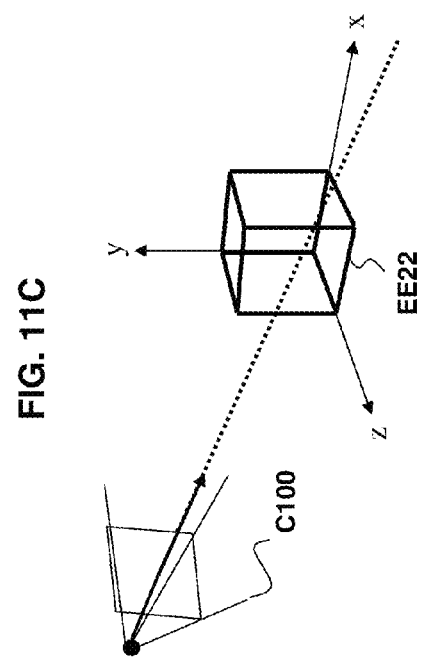

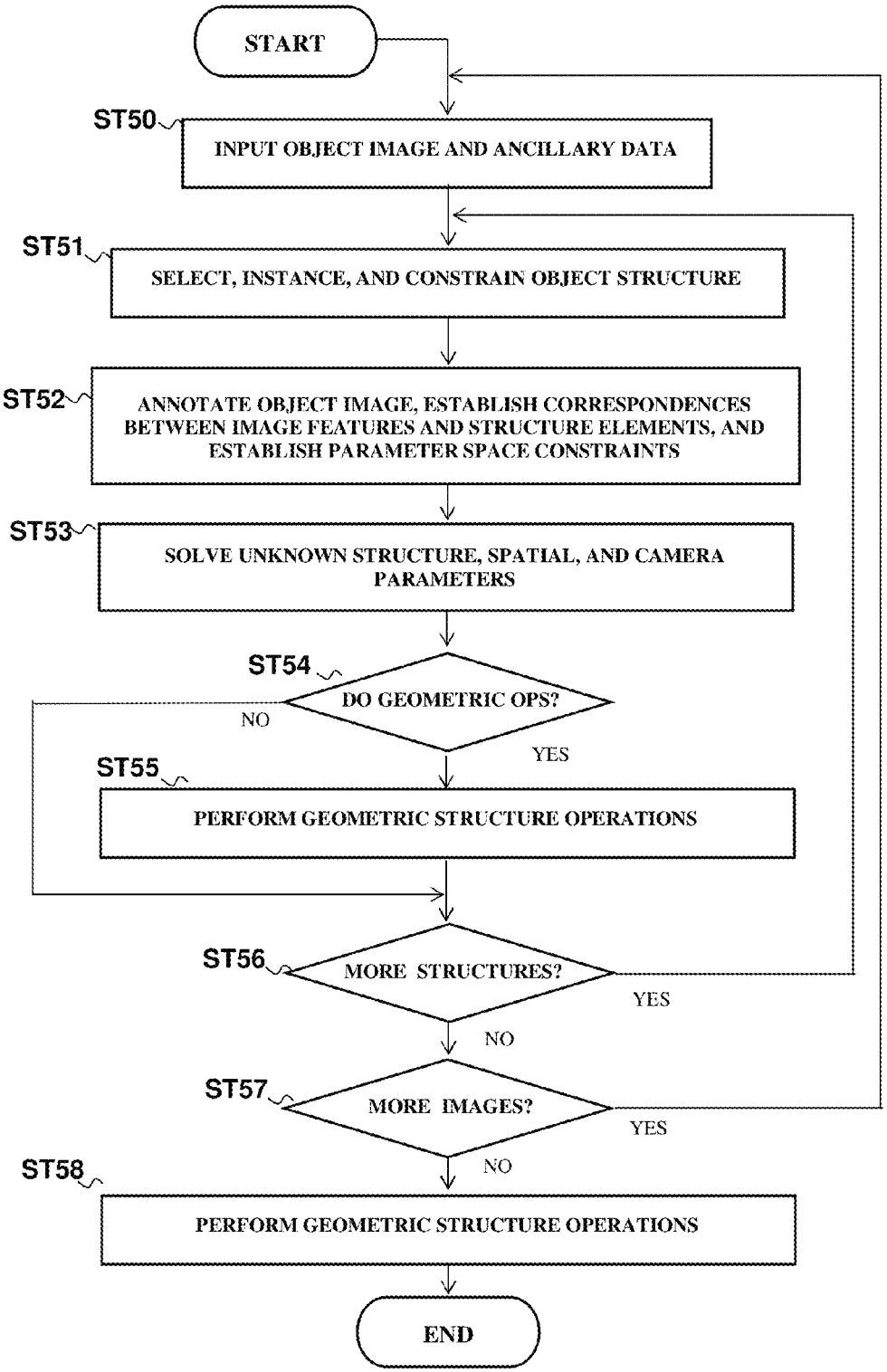

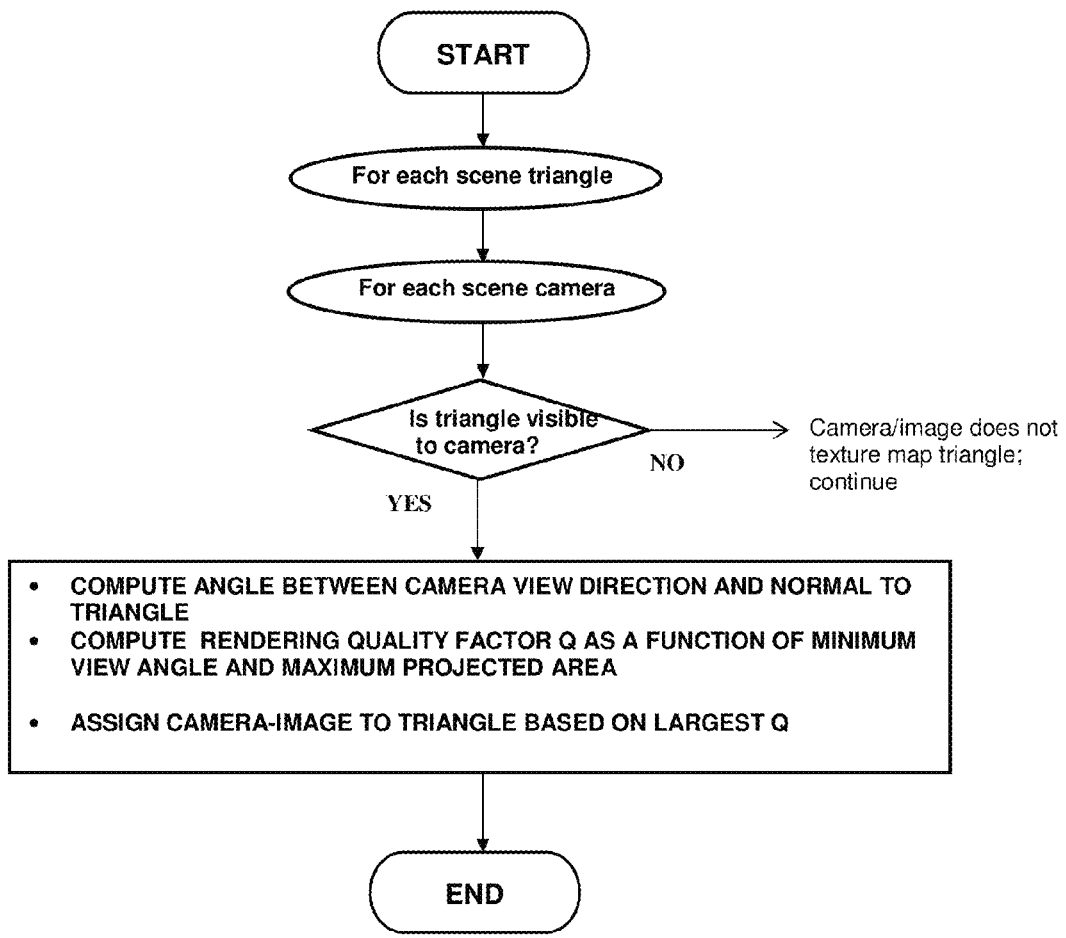

VE5: (x5, y5) = (xa, ya)
VE6: (x6, y6) = (xb, yb)
VE7: (x7, y7) = (xc, yc)
VE8: (x8, y8) = (xd, yd)

|    | F10 | F11 | F12 | F13 | F14 | F15 | F16 | F17 | F18 | F19 | F20 | F21 |
|----|-----|-----|-----|-----|-----|-----|-----|-----|-----|-----|-----|-----|
| E1 | X   |     |     |     | X   |     |     |     | X   |     |     |     |
| E2 |     | X   |     |     |     | X   |     |     |     | X   |     |     |
| E3 |     |     | X   |     |     |     | X   |     |     |     | X   |     |
| E4 |     |     |     | X   |     |     |     | X   |     |     |     | X   |

PHOTOGRAMMETRY ENGINE FOR MODEL CONSTRUCTION

CROSS-REFERENCES TO RELATED APPLICATIONS

This application is a Continuation of U.S. patent application Ser. No. 13/972,770 filed on Aug. 21, 2013, which is a continuation of Ser. No. 13/726,490 filed on Dec. 24, 2012, which is a continuation of Ser. No. 12/701,434 filed Feb. 5, 2010, which is a continuation of Ser. No. 11/168,141 filed on Jun. 27, 2005 which is a continuation of U.S. patent application Ser. No. 09/344,814 filed on Jun. 25, 1999, which claims priority of U.S. Provisional Patent application Ser. No. 60/090,749, filed Jun. 26, 1998 and incorporates those applications herein by reference for all purposes.

BACKGROUND OF THE INVENTION

A parametric solid modeler is an approach to creating geometric models of 3D objects and scenes. Constructive Solid Geometry (CSG) and Boundary Representation (Brep) methods are two fundamental solid modeling methods. CSG uses solid primitive shapes (cones, cylinders, torus, spheres, rectangular prisms, etc.) and boolean operations (unions, subtractions, intersections) to create a solid model. A cylinder subtracted from a cube produces a hole, for instance. Brep methods start with one or more wireframe profiles, and create a solid model by extruding, sweeping, revolving or skinning these profiles. The boolean operations can also be used on the profiles themselves and the solids generated from these profiles. Solids are also created by combining surfaces through a sewing operation. Most commercial solid modeling systems are hybrids combining both CSG and Brep methods to create the desired models.

In a parametric model, each geometric entity has parameters associated with it. These parameters control the various geometric properties of the entities, such as the length, width and height of a rectangular prism, or the radius of a fillet. They also control the locations of these entities within the model. Parameters are changed by the user to create a desired model.

If the task is to construct a 3D model of a scene or object depicted in a sketch or a photograph, the use of a conventional solid modeling system can be an arduous task. This is especially true when producing a texture-mapped model, where the original photograph or other imagery is applied to the derived geometric model. The current process typically involves first creating a 3D geometric model then tediously "cutting and pasting" textures onto the model to add realism. Ultimately, the results are limited by the hand-eye coordination of the user. In short, the current approach and available tools cannot achieve desired levels of geometric accuracy, realism (visual fidelity), are too time-consuming, and require too much skill.

SUMMARY OF THE INVENTION

One application of the graphics system described herein is for visualizing the placement of one or more physical objects in a physical scene. In general, digital images of those one or more physical objects and a digital image of the physical scene are input to the graphics system and the graphic system maps the objects in those images to a three-dimensional geometric model using cues in the digital image or provided as additional inputs. The graphics system then generates an image output that is an image of the geometric model, thereby showing a virtual image of the physical objects in the physical scene without actually moving those physical objects into the physical scene.

One use of the graphics system is for electronic commerce. For example, a consumer captures a digital image of a room in the user's home and provides it to the graphics system. A merchant captures digital images of products it has for sale. Thus, the graphics system can combine the images to show the consumer an image of what the product might look like within the room where the user might place the products, if purchased.

If the user cannot capture all of the room in one image, the user can capture multiple images with some overlap and the graphics system will match them up to form a "mosaic" image that can then be mapped to a geometric model.

In both the consumer and merchant images, the image provider might include cues to assist the graphics system in mapping the two-dimensional object onto the three-dimensional model. For example, the user might have an object in the scene that is a rectangular prism (such as a box, dresser, refrigerator, etc) and indicate the bounds of the rectangular prism on the two-dimensional image. The graphics system can handle shapes besides rectangular prisms, such as spheres, flat rectangles, arches, boolean combinations of simple shapes, etc., limited only by the shapes represented in a shape library that forms part of the graphics system. In a typical user interface, the user selects a shape while viewing an image and then moves the shape around to approximately coincide with an object in the image.

Because the images are mapped to a geometric model, the images of the scene and the objects to be inserted do not need to be taken from the same camera position. For example, a consumer might capture an image of a room from an angle, standing at the edge of the room, but a merchant might have captured an image of a rug they are offering for sale with their camera directly over the rug. As part of the processing performed by the graphics system, it determines camera parameters, such as camera position in the geometric model, camera rotation, focal length, center of view, etc. Those parameters might already be available if the image capturing device is sophisticated or the camera is always held in a known position, but such parameters are usually not available and the graphics system will generate them from the images and constraints.

The graphics system could be a localized system or a client-server system. For example, a server connected to clients over the Internet might be used to create an electronic commerce system in connection with one or more Web sites. Merchants could provide catalogs of goods to the server and the consumer could provide an image of a scene to the server. The server could then return to the consumer an image of how the product would look in the scene. Since the images are mapped into a three-dimensional geometric model, the combination of the objects and the scene appear more realistically combined, even when taken with different camera parameters, than if the image of the object were just distorted and overlaid into an area of the image of the scene.

In variations of the basic systems, complex interactive objects can be provided for combination with a scene. For example, if the merchant provides multiple images of an object, the consumer can place the object in a scene at any angle. An object such as a chest of drawers might include the ability to open a drawer and view the effect. Additional, non-image information, such as a product description, pricing, etc., might also be included with a complex object.

BRIEF DESCRIPTION OF THE DRAWINGS

FIG. 11A shows another view of the 3D construction of FIG. 8A. FIG. 11B shows the back projection of the 3D box into the image for the construction of FIG. 8A and unsolved parameters; FIG. 11C shows a view of the construction of FIG. 8A with camera and box parameters recovered; FIG. 11D shows the back projection of the 3D box into the image for the construction of FIG. 8A and solved camera and geometry parameters.

FIG. 14 is a flow diagram showing the process for constructing 3D objects as assemblages of structures.

FIG. 16 is a flow diagram showing how visibility between cameras and geometry is resolved to reapply imagery back onto geometry.

DESCRIPTION OF THE SPECIFIC EMBODIMENTS

Figure 1:
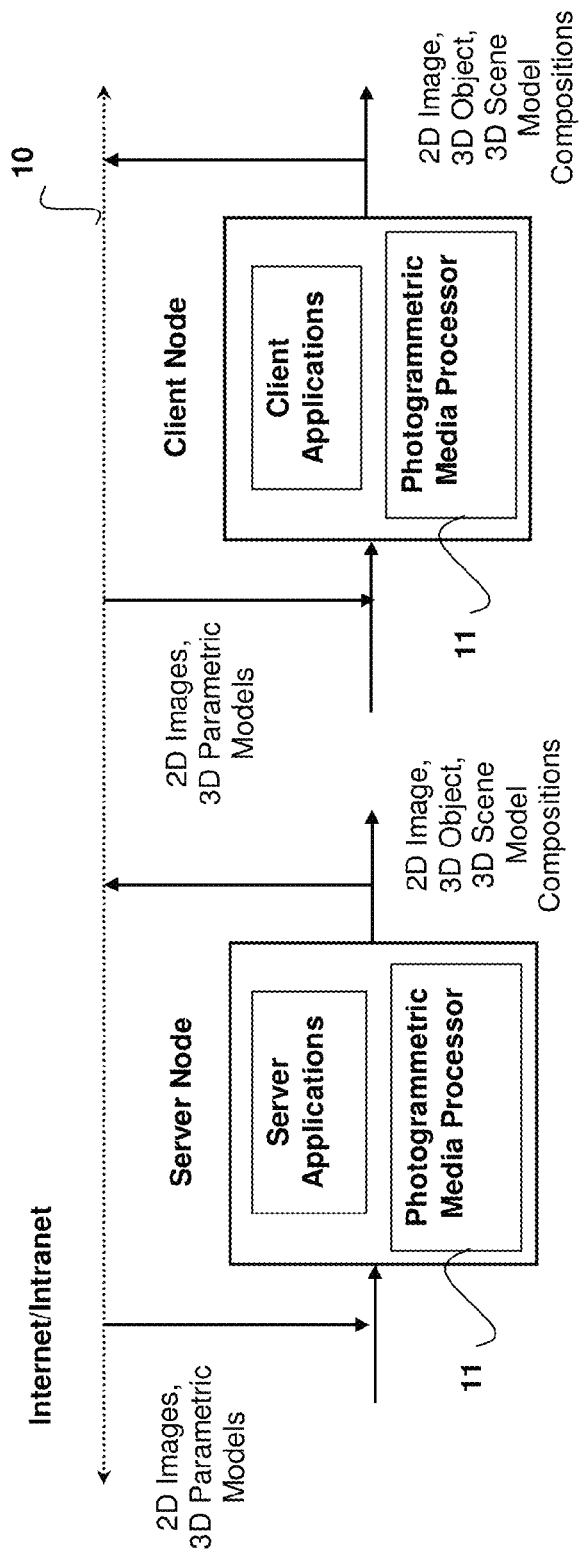
FIG. 1 is a high-level block diagram of a media processing engine residing on a network in a client-server configuration.

A photogrammetric processing engine placed between the user and the solid modeling engine transforms the conventional "hand-eye" coordinated modeling interface to one driven by user-interaction with the input photographs. Photogrammetry is the art, science, and technology of obtaining reliable information about physical objects and the environment through processes of recording, measuring, and interpreting photographic images and patterns of electromagnetic radiant energy and other phenomena.

The user paradigm becomes one of molding and sculpting directly from imagery. Unlike conventional solid modeling systems, which require the user to manually size and place modeling geometry, the system automatically sizes and positions (parameterizes) geometric entities, thus "fitting" 3D model entities to with 2D image features.

The system also automatically determines 3D parametric camera models for each photograph of the scene (e.g. location, pose, focal length, center-of-projection). Having derived geometry and camera models, the system automatically produces a visual reconstruction and rendering of the scene through re-projection of the input imagery onto derived geometry.

Many types of planar and volumetric 2D image and 3D model constructions, compositions, and visualizations are realized. Methods for 2D image mosaics and collages, 3D object and scene constructions, and compositions of these are disclosed. With the underlying image-based user paradigm, these methods are highly intuitive and enable a novice audience.

A network-based client-server system leveraging the solid modeling system is disclosed. This system is suited for a wide range of applications, from professional CAD development and collaboration to Internet e-commerce activities.

The Internet is rapidly becoming a dominant medium for commerce. One area enjoying rapid growth is that of online shopping. While the Internet offers unprecedented convenience to consumers searching and researching products, there exist barriers to consumer willingness or ability to purchase certain products online. High among these barriers is a shopper's desire to physically see or try out a product ahead of time.

To reduce such barriers, great effort is underway to deliver richer digital content to online product catalogs. At present, one solution is the creation and addition of interactive photo-realistic 3D product models. The basic idea is to bring "virtual showroom" experiences to online shopping.

While this capability is useful for products such as watches and tennis shoes, it is limited for items that need to be evaluated within the customer's application context. In shopping for kitchen cabinets, a consumer is most interested in how they would look in their home, not on a web page.

Disclosed is an e-commerce system allows online shoppers to "take home" products from online catalogs and try them out as an integral part of their online shopping experience. In one embodiment, as a client-server system, a merchant serves a client application enabling end-users to construct 3D representations of their environments from their own digital photography. With a target scene constructed, a server node serves functional models of products that are readily composed with the end-user environments and allow the end-user to understand how they look, fit, and function.

Media Processing Engine (MPE)

Figure 2:
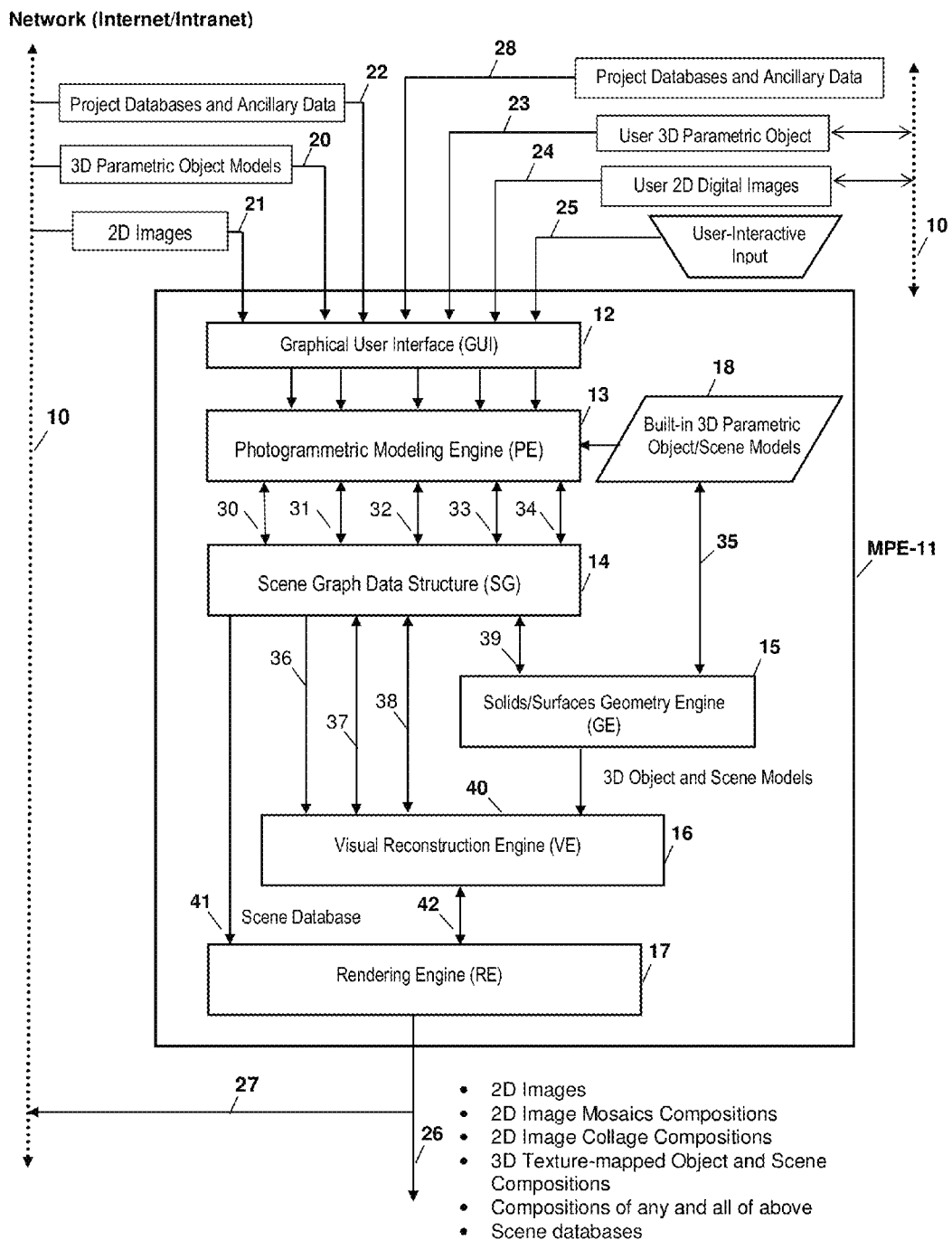
FIG. 2 is a detailed block diagram of the media processing engine with inputs and outputs to a network or otherwise.

Photogrammetric Media Processing Engine (MPE) 11 is shown in FIG. 1. A more detailed diagram is shown as FIG. 2. The main functional components of MPE 11 are Graphical User Interface (GUI) 12, Photogrammetric Modeling Engine (PE) 13, Scene Graph and Ancillary Data Structures (SG) 14, Built-in 3D Parametric Object and Scene Geometry Library (BL) 18, Solids and Surfaces Geometry Engine (GE) 15, Visual Reconstruction Engine (VE) 16, and Rendering Engine (RE) 17.

Digital data and program transmission network 10 is a source of data and program input and output of the system and is an integral component and backbone of the client-server data processing model. In its current embodiment, the network is the Internet. However, the system is not limited to any particular physical data transmission network and data transmission protocol.

All data input, output, and process control is directed by user-interactive input 25 through Graphical User Interface 12. The disclosed invention system and methods are not dependent on a particular design and implementation of 12.

The system imports and exports 2D digital images as a fundamental data type. User digital images 24 are those acquired or obtained by the user and supplied to the system or the network. Examples of user images are those acquired from acquisition devices such as a digital cameras and scanners or transferred from mediums such as CDROM. User digital images 24 are imported into the system or uploaded to network 10. Network digital images 21 are digital images downloaded from network 10. User digital images might also be downloaded as network images 21. As an example, user images are processed by a third and delivered over the Internet.

The system imports and exports 3D geometric models as a fundamental data type. Geometric models are typically imported and exported with sets of 2D image texture maps assigned to the models. User 3D geometric models 23 are those acquired or obtained by the user and supplied to the system or the network. Examples of such models are those acquired from acquisition devices such as scanner devices or transferred from mediums such as CDROM. User 3D models are imported into the system or uploaded to network 10. Network 3D models 20 are models downloaded from network 10.

Ancillary data input 22 imports general and information from network 10. For example, for images 21 and models 20, ancillary data 22 might specify size, color, price, and availability parameters. The user may also supply ancillary data, such as certain known dimensions of an object or feature, through user interactive input 25.

The system imports and exports project databases providing a convenient mechanism for project saving, restoration, and work collaboration. Project databases include system generated scene graph and other data structures and accompanying data. Data 22 imports project databases and all general data associated with incoming 2D and 3D media from network 10. Data input 28 imports project databases from storage medium such as system memory or disk. Output 26 exports project databases to storage mediums such as system memory or disk. Output 27 exports project databases to network 10.

System output 26 consists of 2D images, generated 2D images and image compositions, 3D models, 3D models and 3D texture-mapped object and scene compositions generated from 2D images, and compositions of all of these. Output 26 is directly viewed on a computer display device, stored on digital storage mediums such as computer hard disk. System output 27 sends system output 26 to network 10.

Scene graphs are used to store geometric, topological, and visual construction information. A scene graph conveniently and efficiently encodes a hierarchical organization of the components that comprise the scene. The scene graph and ancillary data structures are stored in data structures unit 14.

Figure 4A:
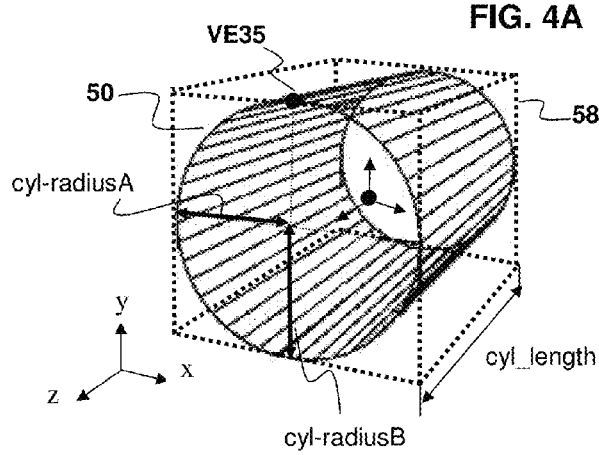
FIG. 4A shows a cylinder structure.
Figure 4B:
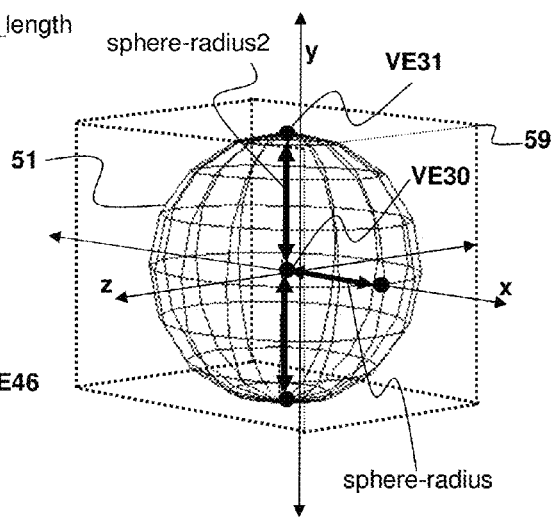
FIG. 4B shows a sphere structure.
Figure 4C:
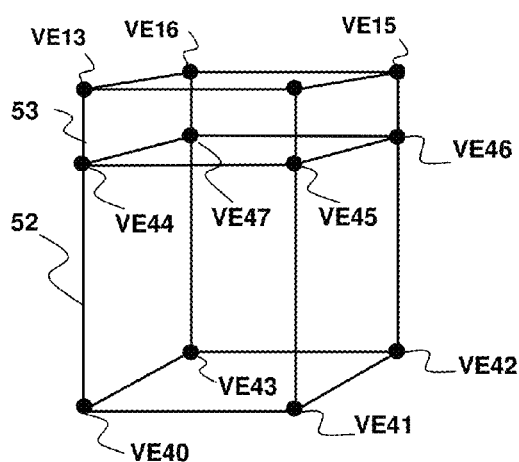
FIG. 4C shows a two box structures constrained to each other by equating point elements.
Figure 4D:
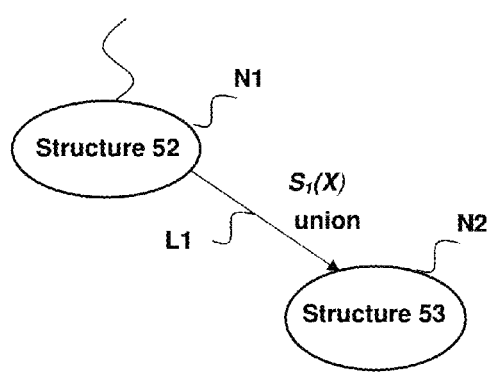
FIG. 4D shows a scene graph with two nodes and one link.

A scene graph is made up of nodes that represent geometric components drawn, properties of the components, hierarchical groupings of nodes, and other information such as cameras and visual reconstruction information. Nodes are connected by links in a parent-child hierarchy. The scene graph is processed or traversed from node to node by following a prescribed path of links. Nodes and links contain parameters. Nodes contain the parameters associated with the geometric structures they specify. Links contain the spatial relationships (e.g. rotation, translation, scale) between the geometric primitives (structures) of the interconnected nodes. A tree structure is an example of one of the most common types of graph structures. Another form of scene graph is a directed acyclic graph (DAG). The specific form of the scene graph is not essential to the invention as described here. FIG. 4D shows a scene graph 55 with two nodes and one link.

For media construction, photogrammetric modeling engine 13 and visual reconstruction engine 16 read from and write to the scene graph data structure. For media presentation, rendering engine 17 reads the scene graph data structure and composes a visual representation.

The Photogrammetric Modeling Engine 13 is highly-automated photogrammetry and constraints based modeling system that embodies a process for recovering parametric 3D geometric structure and camera models from 2D images. Under the direction of user interactive input 25, the system produces parametric and non-parametric polyhedral and solid (volumetric) models of image compositions and 3D models of objects and scenes depicted in supplied 2D digital imagery. Modeling Engine 13 recovers parametric camera models for each input image of a construction project.

Geometric constructions generated by the system are hierarchical and non-hierarchical assemblages of geometric components called "structures". Structures are parameterized geometric primitives, such as points, lines, line segments, planes, cubes, squares, rectangles, boxes, cylinders, cones, frustums, wedges, surfaces of revolution, and extrusions.

Figure 3A:
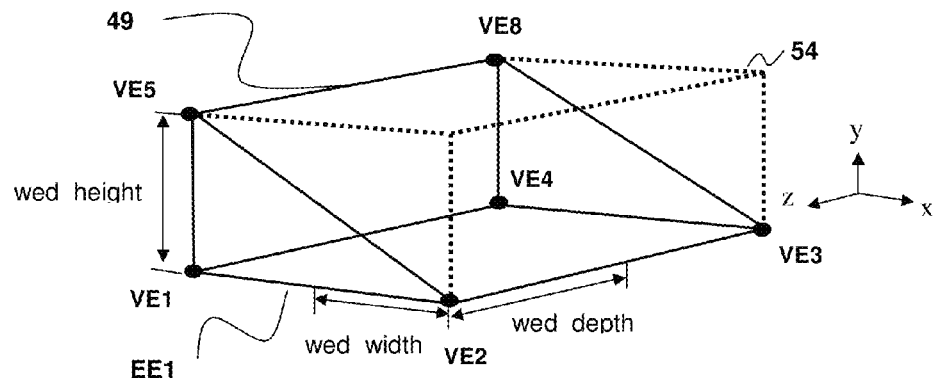
FIG. 3A is a wedge structure.

A structure contains a set of parameters describing its size and shape. The coordinates of each vertex of a structure are expressed as a linear combination of these parameters, relative to the structure's internal coordinate frame. The spatial extent of a structure is specified as a bounding volume. In FIG. 3A, half-wedge structure 49 is defined by shape parameters wed_width, wed_height, and wed_depth. A vertex VE1 is expressed as (-;wed_width, wed_depth, 0). The spatial extent of structure 49 is defined by rectangular bounding volume 54. In FIG. 4A, cylinder structure 50 is described by three parameters cyl-radiusA, cyl-radiusB, and cyl_length. The first two parameters control diameter and the third controls length. When cyl-radiusA, and cyl-radiusB are equal, the cylinder is circular; otherwise the cylinder is elliptical. The extent of the cylinder is given by bounding box 58. The cylinder might also contain radius parameters at the "other end" of the cylinder, thus defining tapered cylinder profiles. In FIG. 4B, sphere structure 51 is described by radius parameter sphere-radius and bounding box 59.

Figure 13A:
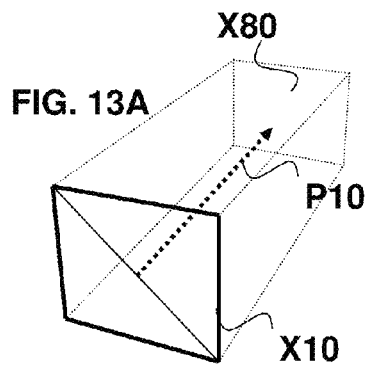
FIG. 13A shows a rectangular straight pipe extruded solid from a rectangle extrusion profile and linear extrusion path.
Figure 13B:
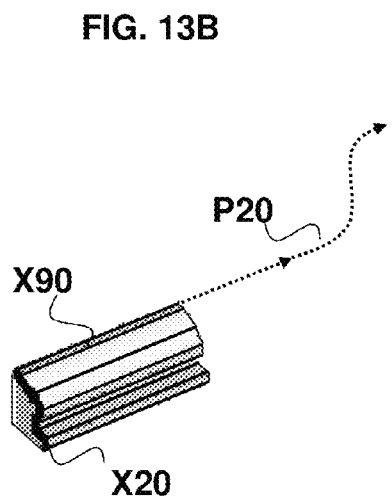
FIG. 13B shows a curved profile extruded solid tube from a curved profile and curved extrusion path.
Figure 13D:
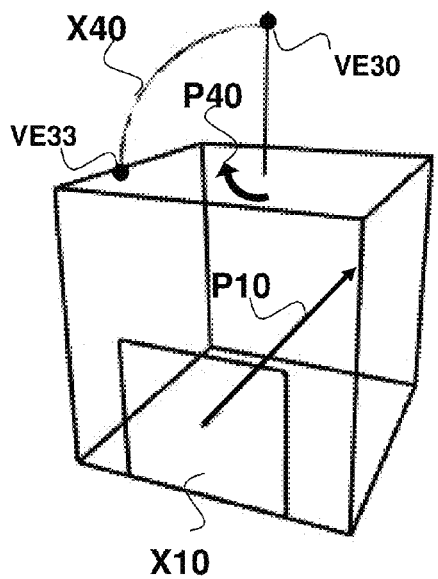
FIG. 13D shows a construction employing an extrusion.
Figure 13C:
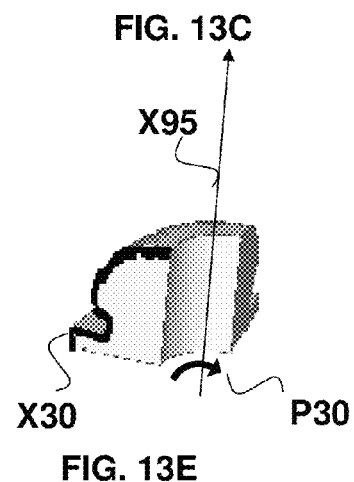
FIG. 13C shows a revolved solid generated from a curved profile and revolution axis.

Structures are also generated, as in the case of extruded and revolved solids. Shown in FIG. 13A is an extruded rectangular box structure X80. It is generated by translating rectangular profile element X10 along linear extrusion path element P10. FIG. 13B shows an extruded object X90 with a more complex curved profile element X20 and curved path element P20. FIG. 13C shows a solid structure X95 generated by revolving profile element X30 around sweep axis element P30.

The system embeds a library of built-in structures 18, including, but not limited to, fundamental geometric structures typically associated with conventional solid modeling systems. Library 18 is fully extensible and the number and types of structures supported may be tailored to suit the application software used. New classes of structures are pre-programmed into built-in library 18, imported as user input 23, or downloaded as network input 20.

Geometric structures are comprised of elements. An element is a component of a structure or higher-level construct or possibly a 3D structure itself, as in the case of a point. It represents a 3D structure part or shape that can be transformed and projected into the planes of related 2D input images. Examples of elements include points, lines, line segments, planar polygons, circles, and curves.

Figure 3B:
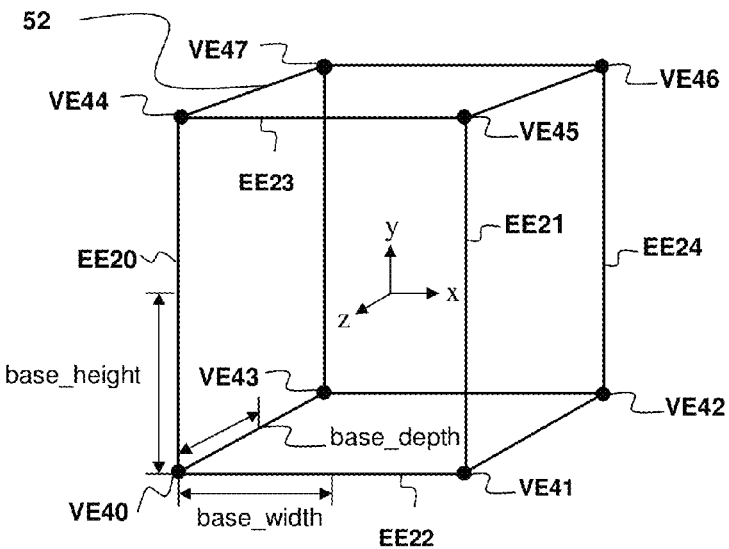
FIG. 3B is a box structure.
Figure 3C:
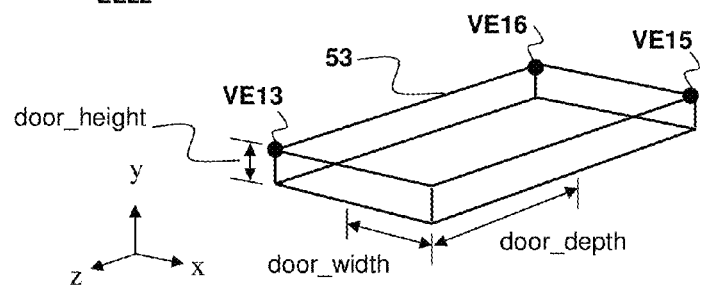
FIG. 3C is another box structure.

In FIG. 3A, FIG. 3B, and FIG. 3C, structures 49, 52, and 53 comprise edge and point type elements. Point elements are structure vertices and edge elements are line segments forming edges between structure vertices. In FIG. 3B, "box" structure 52 has eight vertex elements, VE40 through VE47. Connecting these vertex elements are 12 edge elements. For example, edge element EE24 is the line segment formed between vertices VE42 and VE46.

Figure 5A:
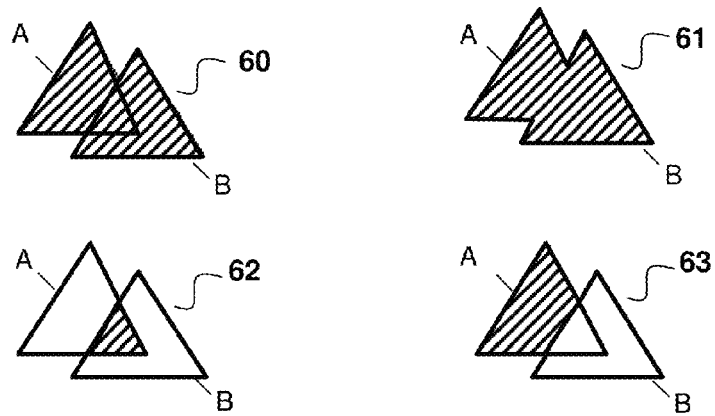
FIG. 5A shows examples of boolean union, merge, intersection, and difference.
Figure 5B:
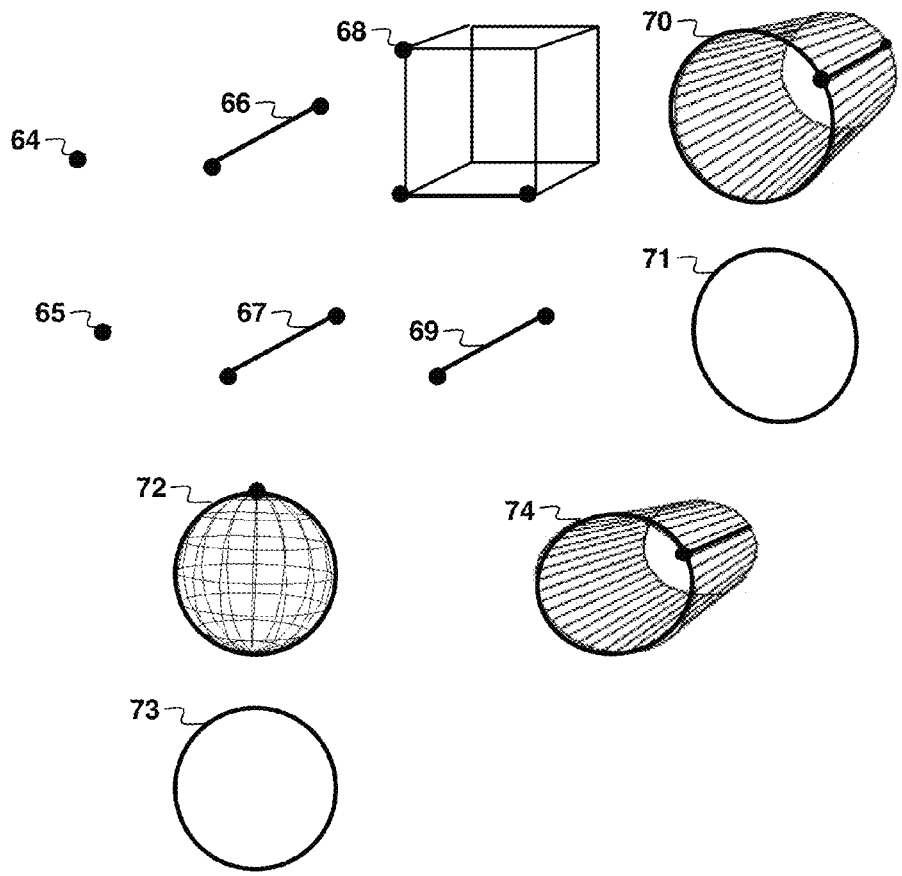
FIG. 5B shows several three dimensional geometric structures and associated geometric elements and two dimensional features corresponding to a projection of the 3D elements into 2D.

The number and type of elements supported by modeling engine 13 is fully extensible. The system does not limit the vocabulary of geometric elements supported. Any component of a geometric structure or higher-level construct that can be projected and identified in the imaging plane of a camera (plane of an image) may be defined as an element. FIG. 5B shows several examples of 3D structures and component element types. Point 64 is itself a structure and an element. Edge structure 66 is and edge element comprised of two vertex (point) elements and a connecting line segment. Box structure 68 contains individual point elements and edge elements. Cylinder structures 70 and 74, and sphere structure 72 are comprised of point elements, edge segment elements, circle, and ellipse elements. For generated structures, such as the extruded and revolved solids of FIG. 13, elements include defining profiles and paths.

The relationships between component structures in the hierarchy of a model assembly are represented by parametric operators, which encode spatial and geometric relationships between structures. In the present embodiment, spatial operators are the affine geometric transformations of rotation R, translation T, and scale S. In general, operators may also specify non-affine spatial transformations. Geometric operators determine the topology of the overall model assembly. FIG. 5A shows the boolean operators union 60, merge 61, intersection 62, and difference 63. Geometric operators also include, but are not limited to, blending, sweeping, imprinting, covering, lofting, skinning, offsetting, slicing, stitching, sectioning, and fitting. Geometric operators are processed by geometry engine 15.

3D geometric models are related to 2D images through annotations marked on images called features. A feature represents the projection of a 3D model element into the plane of projection of the camera attached to the image. The parameterized camera model attached to the image specifies the projective transformation.

FIG. 5B illustrates several projective relationships between 3D structure elements and 2D image features. Point, line segment, and circle elements in 3-space project into point, line segment, and ellipse features in 2-space, respectively. 3D point structure 64 projects into 2D point feature 65. 3D edge structure 66 projects into 2D edge feature 67. 3D point and edge segment elements of box structure 68 and cylinder structures 70 and 74 project into point and edge features 69. 3D circle elements of cylinder 70 and ellipsoid elements of cylinder 74 project into 2D ellipse features 71. 3D circle features of sphere 72 project into 2D circle features 73.

The modeling engine modeling process entails the marking of features in one or more input images and the establishment of correspondence between these 2D features and geometric elements of a 3D construction. In the present embodiment, the user places features in images through user-interactive input 25 and interface 12. An optional gradient-based technique aligns marked edges to image pixel features with sub-pixel accuracy.

Figure 6A:
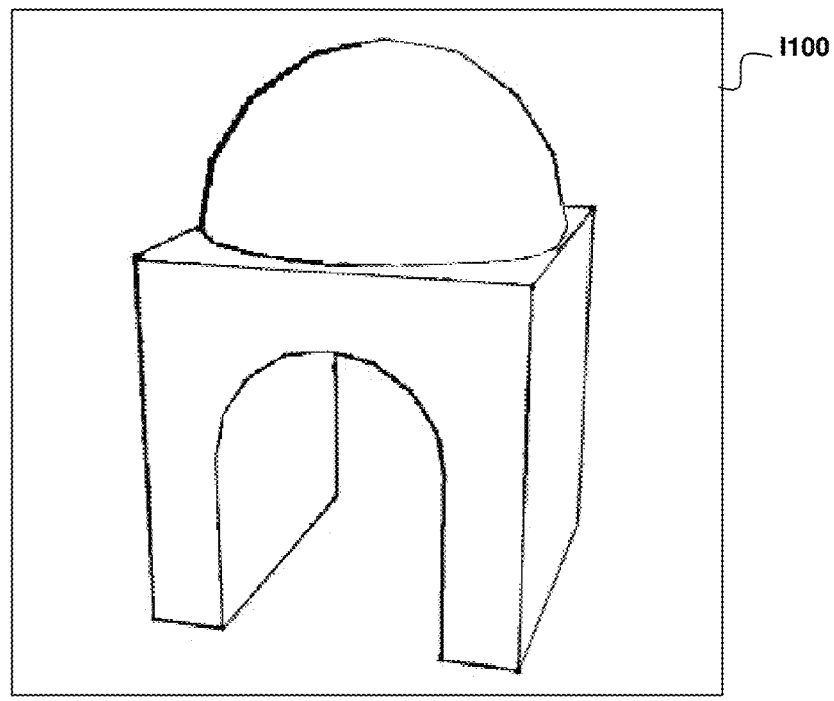
FIG. 6A is an image of an object.
Figure 6B:
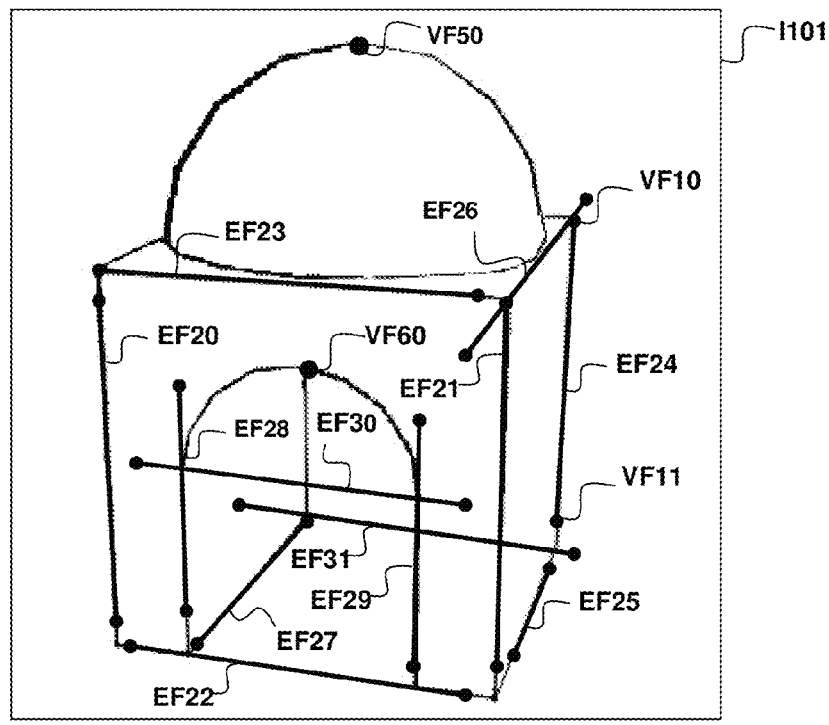
FIG. 6B is the image of the object with annotations added to identify individual edge and point features of the object shown in the image.

As an example, image I100 of FIG. 6B is annotated with edge and point features, resulting in image I101. In image I101, edge features EF20 through EF31 mark selected edge regions. Geometrically, each 2D edge feature is composed of two endpoint vertices and a connecting line segment. For example, edge feature EF24 contains endpoint feature vertices VF10 and VF11. The endpoints of marked edge features need not align with depicted endpoints of a selected edge in the image; the placed line segment need only align with the associated edge in the image. In image I101, in addition to edge features, point features VF50 and VF60 mark individual point feature positions in the image.

Correspondence establishes a relationship between 3D elements of structures in global position and 2D image features. A single correspondence is a feature-element pair. A geometric element can have multiple image correspondences.

Correspondence types define valid feature-element pairs that quantify the degree of geometrical coincidence of the projected view of a geometric element and a 2D image feature, relative to the camera associated with the image. Valid correspondence types are defined for each geometric element or higher-level construct. Example feature-element types include point-point, point-edge, and edge-point pairs. The system is fully extensible and not limited to a specific vocabulary of correspondence types.

The degree to which an annotated 2D image feature and a projected geometric element align is expressed in terms of a correspondence error. The manner by which the correspondence error is measured depends on the correspondence type. A correspondence error metric is defined for each valid correspondence type and quantifies the degree of geometrical coincidence of the projected view of the element and the feature.

Correspondences are established implicitly or explicitly. In the former case, features are placed in images and 3D structure elements are explicitly associated with them. In the latter case, images are annotated with features that directly (implicitly) correspond to structures and their elements. Correspondences may also be implicitly established by application program design.

As an example of explicit correspondence, edge correspondences are established between "box" structure 52 of FIG. 3B and image I100 of FIG. 6A.

Through user-interactive input 25 and interface 12, individual 2D edge features EF20, EF21, EF22, EF23, and EF24 are annotated, as shown in image I101. These features are then explicitly assigned to 3D structure 52 edge elements EE20, EE21, EE22, EE23, and EE24, respectively. In the present implementation, feature-to-element pairings are established through a "point-and-click" user interactive interface.

Figure 7:
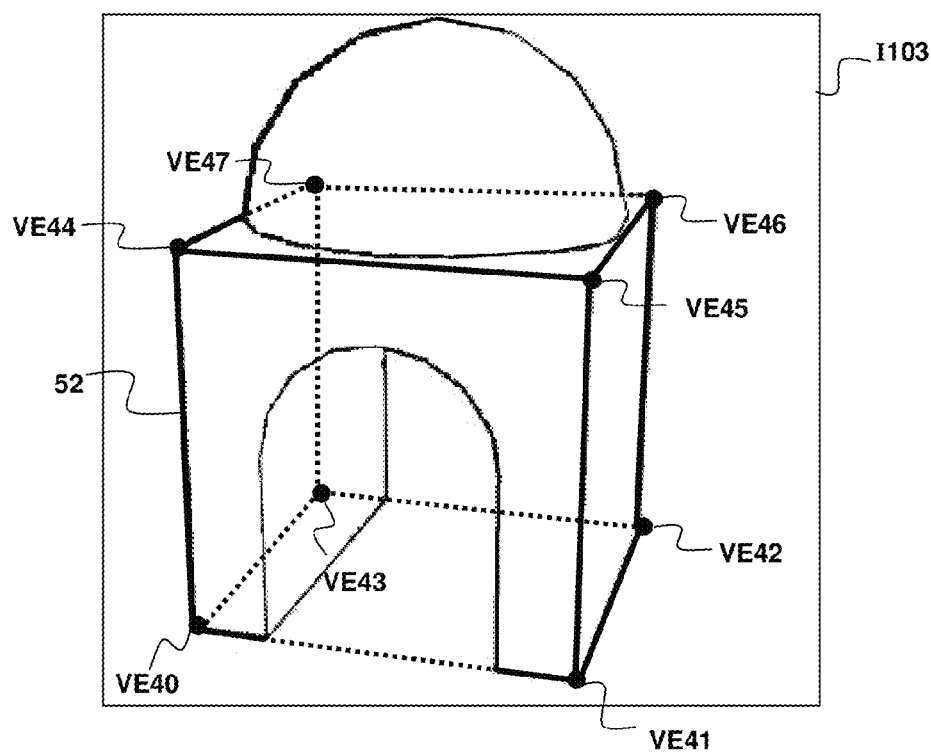
FIG. 7 is the same image of the object with annotations added to identify connected structure edge and point features of the object shown in the image.

With implicit assignment, structures are associated with images directly as feature annotations. For the present example, image I101 is annotated with structure 52 by placing 2D vertex features into the image that directly correspond to 3D vertex elements VE40 through VE47, as shown in FIG. 7 image I103. In doing so, edge elements adjoining the vertices implicitly correspond to (and serve as) edge features in the image. In the present implementation, as structure vertices are placed, interconnecting edges "rubber-band" in place, thus presenting the structure as a "pliable" 2D annotation object.

Constraints are values set for parameters of a construction. By reducing the number of unknown parameters of a construction, the computational load of parameters to be recovered by modeling unit 13 is reduced. Constraints may be placed on any values of a construction parameter-space, including structure shape parameters, spatial and geometric structure operators, and intrinsic and extrinsic camera parameters. Constraints on the parameter-space of a 3D model and camera construction may be defined by the application or explicitly specified by user-interactive input 25 through 12.

Structures may have their individual shape parameters constrained to specific fixed values. For example, setting structure 52 parameters base_width, base_depth, and base_height to x units each establishes a cube structure of 2x units in each dimension. In the present embodiment, the system treats parameters symbolically, so parameters are conveniently shared between structures. Equality is a common type of constraint. For example, if FIG. 3C structure 53 parameter door_depth is set equal to structure 52 parameter base_depth, the depth of both structures remain the same, even under varying values of base_depth.

Figure 9A:
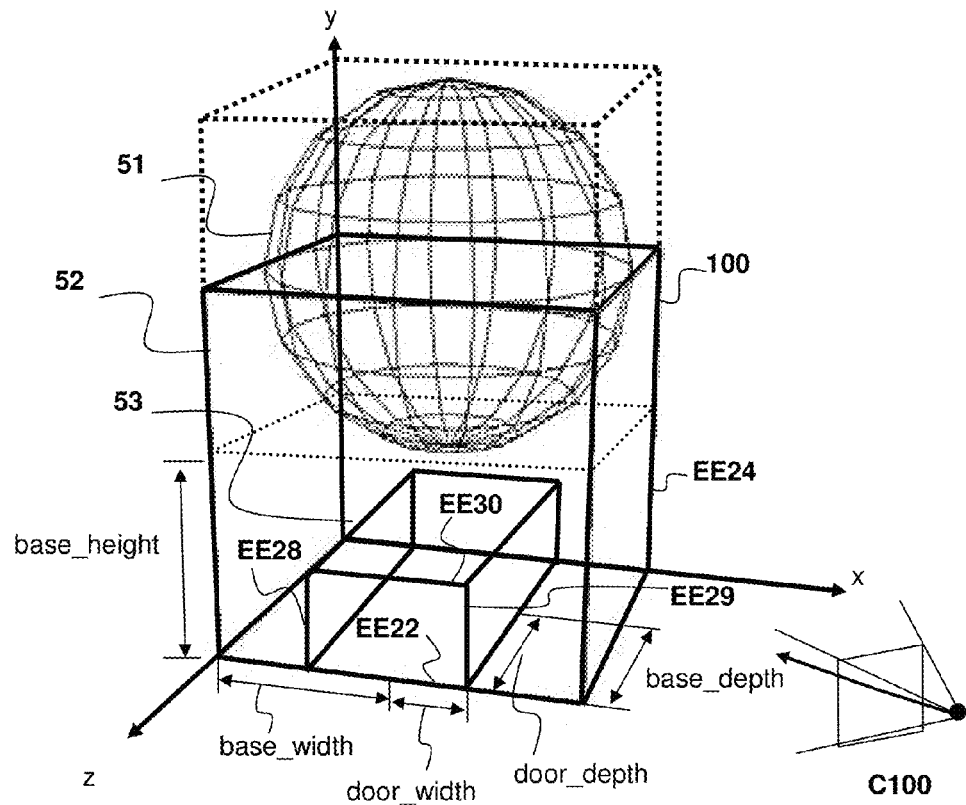
FIG. 9A is a 3D object construction containing two box structure and one sphere structure and corresponding to the scene graph of FIG. 8D.

Constraints on spatial operator parameters fix the placement of structures. In FIG. 9A, structures 51, 52 and 53 are spatially constrained by the rotation R, translation T, and scale S operators linking them. In this example, with the given default bounding volumes, R is set to null (no rotation in any axis) between 51 and 52 and between 52 and 53. Between 52 and 53, translation T is set such that the midpoints of structures 52 and 53 align in the x-axis and z-axis and the minimum bounding extents of structures 52 and 53 are coincident in the y-axis. Between structures 51 and 52, translation T is set such that the midpoints of structures 52 and 53 align in the x-axis and z-axis. Scale S is set to unity for all structures.

As another example, a user interactively selects and equates structure vertex elements. In FIG. 4C, structure 53 is attached to the top of structure 52 by the user selecting and equating vertex elements VE44 and VE13, VE47 and VE16, and VE46 and VE15. This constraint specification sets the spatial translation T and rotation R between the structures to zero while also equating their width and depth shape parameters.

Cameras

Associated with each input image is a 3-space camera system that models the imaging process between structures in 3-space and corresponding features in 2-space. Camera models are parametric and include variable parameters describing external pose and internal settings. For pose, three parameters Cx, Cy, and Cz describe 3-space position and three parameters Rx, Ry, and Rz describe angular viewing direction. For internal calibration, parameters include focal length f and center-of-projection parameters cop_x and cop_y. A camera's pose and internal projection parameterization is composed into a homogenous 4×4 matrix. The composition of the intrinsic projection transformation and extrinsic pose transformations specify the mapping of an arbitrary 3D point in the global 3D coordinate frame into the camera's image plane.

Geometry and Camera Reconstruction Processing

In contrast to a conventional modeling system which requires the user to manually size and place modeling geometry, the modeling engine 13 automatically sizes and positions (parameterizes) geometric structures. Modeling engine 13 also determines 3D camera models (location, pose, focal length, center-of-projection). Camera model derivation is an intimate component of the photogrammetric process and is central to subsequent visual scene and object reconstruction.

Modeling engine 13 recovers all unknown unconstrained variables of a construction parameter space to form a reconstruction of depicted objects or scenes and the cameras that image them. The solution of the geometry and camera parameterization aligns 3D model elements with corresponding 2D image features and allows recovered camera system to accurately project (re-project) their imagery onto geometric representations.

Modeling engine 13 solves for the variable parameters by minimizing the aggregate correspondence error (sum of all correspondence errors). This is a nonlinear multivariate function referred to as the objective function O. Minimizing the objective function requires nonlinear minimization. Defined constraints eliminate variables and thereby reduce the dimensionality of the unconstrained nonlinear minimization process. In addition, it makes use of invariants and linearities to progressively minimize the function.

Figures 10A, 10B:
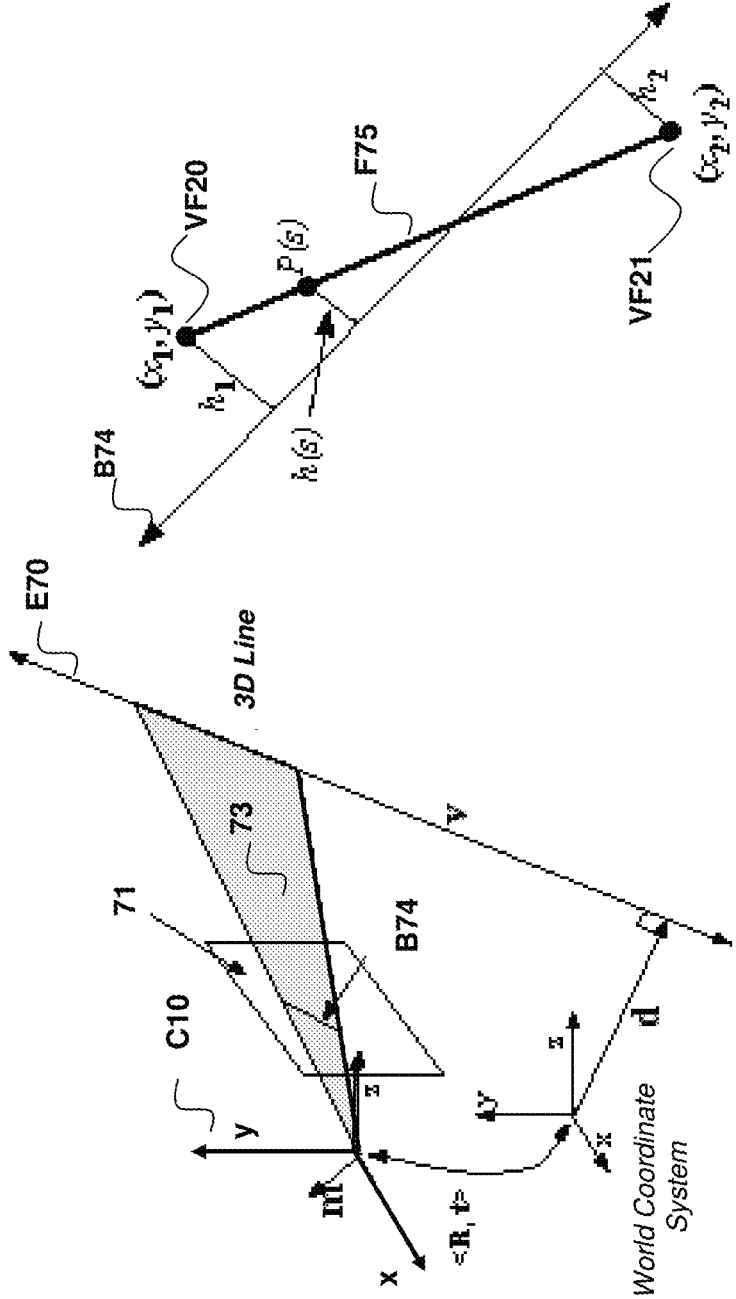
FIG. 10A shows the relationship between a line in 3-space, a camera system in the same space, and the projection of that line into the imaging plane of the camera.
FIG. 10B shows the construction of an error function quantifying the error between a line segment annotated into the imaging plane of the camera and the projection of the 3D line through the camera and into the imaging plane

FIG. 10A illustrates an edge-to-edge correspondence type and implementation of the present embodiment. Line element E70 of a 3D model projects onto image plane 71 of camera C10. The 3-space line E70 is defined by a pair of vectors (v,d) where v represents the direction of the line and d represents a point on the line.

The world coordinates $P_w(X)$ of a structure vertex $P_s(X)$ is $P_s(X)=S_1(X) \ldots S_n(X)P_s(X)$, where X represents the vector of all structure parameters and $S_1(x) \ldots S_n(X)$ represent the spatial operators linking structures. The world orientation $v_w(X)$ of a particular line segment v(X) is given as $v_w(X)=S_1(X) \ldots S_n(X)v(X)$.

The position of camera C10 with respect to world coordinates is expressed in terms of a rotation matrix Rj and a translation vector Tj. The normal vector m is computed as m=Rj(v×(d−;Tj)).

The projection of line element E70 onto image plane 71 is projected edge segment B74. Edge segment B74 is the intersection of plane 73 defined by m with image plane 71, located at z=−f where f is the focal length of the camera. The computed image edge segment B74 is defined by the equation $m_x x + m_y y -; m_z f = 0$.

An annotated image edge feature F75 is delimited by image feature vertices VF20 and VF21, with image coordinates $(x_1, y_1)$ and $(x_2, y_2)$ respectively, and is denoted as $\{(x_1, y_1), (x_2, y_2)\}$.

The disparity (correspondence error) between a computed image edge B74 and an annotated image edge F75 is $Err_1$, for the ith correspondence of the model construction. FIG. 10B shows how the error between edges B74 and F75 is calculated. Points on the annotated edge segment F75 are parameterized by a single scalar variable $s \in [0,1]$ where 1 is the length of the edge. A function, h(s), returns the shortest distance from a point on the segment, P(s), to computed edge segment 74.

With these definitions, the total error between marked edge segment F75 and computed edge segment B74 is calculated as $$Err_1 = \int_0^l h^2(s)\,ds = \frac{1}{3}(h_1^2|h_1 h_2|h_2^2) = m^T(A^T B A)m$$

$$m = (m_x, m_y, m_z)^T$$

$$A = \begin{pmatrix} x_1 & y_1 & 1 \\ x_2 & y_2 & 1 \end{pmatrix}$$

$$B = \frac{l}{3(m_x^2 + m_y^2)}\begin{pmatrix} 1 & 0.5 \\ 0.5 & 1 \end{pmatrix}$$

The reconstruction minimizes the objective function O that sums the disparity between the projected edge elements of the model and the marked edge features in the images. The objective function $O = \Sigma \, Err_i$ is the sum of the error terms resulting from each correspondence i. O is minimized using a variant of the Newton-Raphson method, which involves calculating the gradient and Hessian of O with respect to the variable parameters of the camera and the model.

In the present embodiment, symbolic expressions for m are constructed in terms of the unknown model parameters. The minimization differentiates these expressions symbolically to evaluate the gradient and Hessian after each iteration. The reconstruction algorithm optimizes over the parameters of the model and the camera positions to make the model conform to the observed edges in the images.

Modeling engine 13 writes to, and reads from, scene graph unit 14. This data exchange includes 2D images 30, paramaterized geometric structures 31, parameterized operators and constraints 32, parameterized camera models 33, and ancillary data 34 which includes images features and correspondences.

Solids and Surfaces Geometry Engine (GE) 15 reads the scene graph and performs specified geometric operations on the construction. The resulting fundamental and complex geometric structures and models are sent back to scene graph unit 14 via 39 or are stored in built-in library 18 via 35 and augment the library. The latter generates structures beyond those pre-existing in 18. The output 40 of geometry engine 15 is also sent to visual reconstruction processor 16.

GE 15 supplies operations on and between all structure classes. This includes solid structures operating on surfaces structures and vice versa. Operations on and between geometric structures include, but are not limited to, booleans, extrusions, sweeps, revolutions, lofts, blending, shelling, and local manipulation and deformation. For example, boolean operations between a given set of shapes allow the creation of an infinite number of simple and complex shapes.

FIG. 5A shows example boolean operations union 60, merge 61, intersection 62, and difference 63 performed by GE 15. Geometric operators also include, but are not limited to, blending, sweeping, imprinting, covering, lofting, skinning, offsetting, slicing, stitching, sectioning, and fitting. FIG. 13A and FIG. 13B show examples of extrusion processing by GE 15. FIG. 13C shows an example of surface-of-revolution processing by GE 15.

The Visual Reconstruction Engine 16 automatically applies 2D input imagery onto 3D geometric models using recovered 3D camera models. The application of the input imagery onto the output geometry involves a re-sampling of the input imagery, a process commonly called texture-mapping. Conventional texture-mapping systems typically require users to manually and explicitly specify texture-to-geometry mappings. Such conventional approaches are labor-intensive and yield inaccurate results. Visual reconstruction engine 16 automatically determines the texture mapping strategy for visually reconstructing scenes and objects on a facet-by-facet basis. This includes determination of which texture map(s) to apply to each facet of the scene geometry, calculation of the texture coordinate parameterization, and texture rectification (as required). Camera-image assignments are made to constructed geometry based on the results of visibility tests and established image quality criteria.

The input to 16 is a database containing 3D object and scene geometry models, camera models 36, imagery 37 associated with each camera model, and geometric object and scene models 38 and 40.

Output 42 of 16 is a graphical database that is ready for processing by rendering engine 17 or export for further processing by another graphical database rendering apparatus or storage. The invention is not limited to any particular geometry, camera, or texture data format or rendering procedure. The specific output of reconstruction engine 16 output 42 is a function of the processing modality of media processing engine 11 and the media type produced.

For processing of 3D texture-mapped geometric object and scenes from one or more 2D images, visual reconstruction processor 16 produces a graphical database that includes camera maps, texture maps and coordinates, camera models, and 3D object and scene geometry. A camera map is an assignment of cameras to scene geometry. For each triangular facet of model geometry seen by at least one camera, a camera map produced by 16 designates a single "best" camera or group of cameras whose imagery is available and appropriate to texture map the triangle.

Hybrid Camera-Geometry Visibility Processing

Visibility processing is required to determine, for each (camera, image) pair in a given 3D scene, which facets of scene geometry (in whole or in part), are visible from the viewpoint of the camera. For visible/hidden surface determination, the system considers back-facing surfaces, surface visibility with respect to the extent of each camera's viewing frustum, and surface visibility within a camera's view frustum and in consideration of occlusions (partial and full) amongst the various surfaces. The latter two categories are referred to here as window visibility and occlusion visibility, respectively.

Window visibility is resolved by intersecting surfaces with a camera's viewing frustum, subdividing surfaces based on intersections, and selecting portions contained within the viewing frustum. Occlusion visibility is resolved by computing the intersections of object surfaces with each other. Then for each set of intersections, it is determined which surface is closer to the viewer (camera) and thus visible.

Visual reconstruction engine 16 presents a hybrid visibility processing approach, invoking both object-space and image-space visibility computation. Image-space and object-space visibility processing algorithms differ in the precision with which they compute the visible surfaces. Image space algorithms determine visible surfaces by examining surfaces at the pixel level, post-projection in to the imaging plane of the viewer. Object space algorithms directly compare surfaces in the defined space. Object space calculations are employed for computing the intersections of surfaces in the defined global 3D coordinate system of the geometry. Image-space computations process geometry visibility in the projected screen space of each camera. A hybrid approach is preferred, since it can be fully implemented in software or make use of commonly available computer graphics hardware. It allows the system to run on a host computer systems with or without 3D graphics capabilities (software or hardware). For systems with 3D graphics capabilities, including hardware acceleration, the application can effectively leverage available resources.

Preferably, all geometry is processed as triangles, but any n-sided polygons or other representations could be used.

Figure 15:
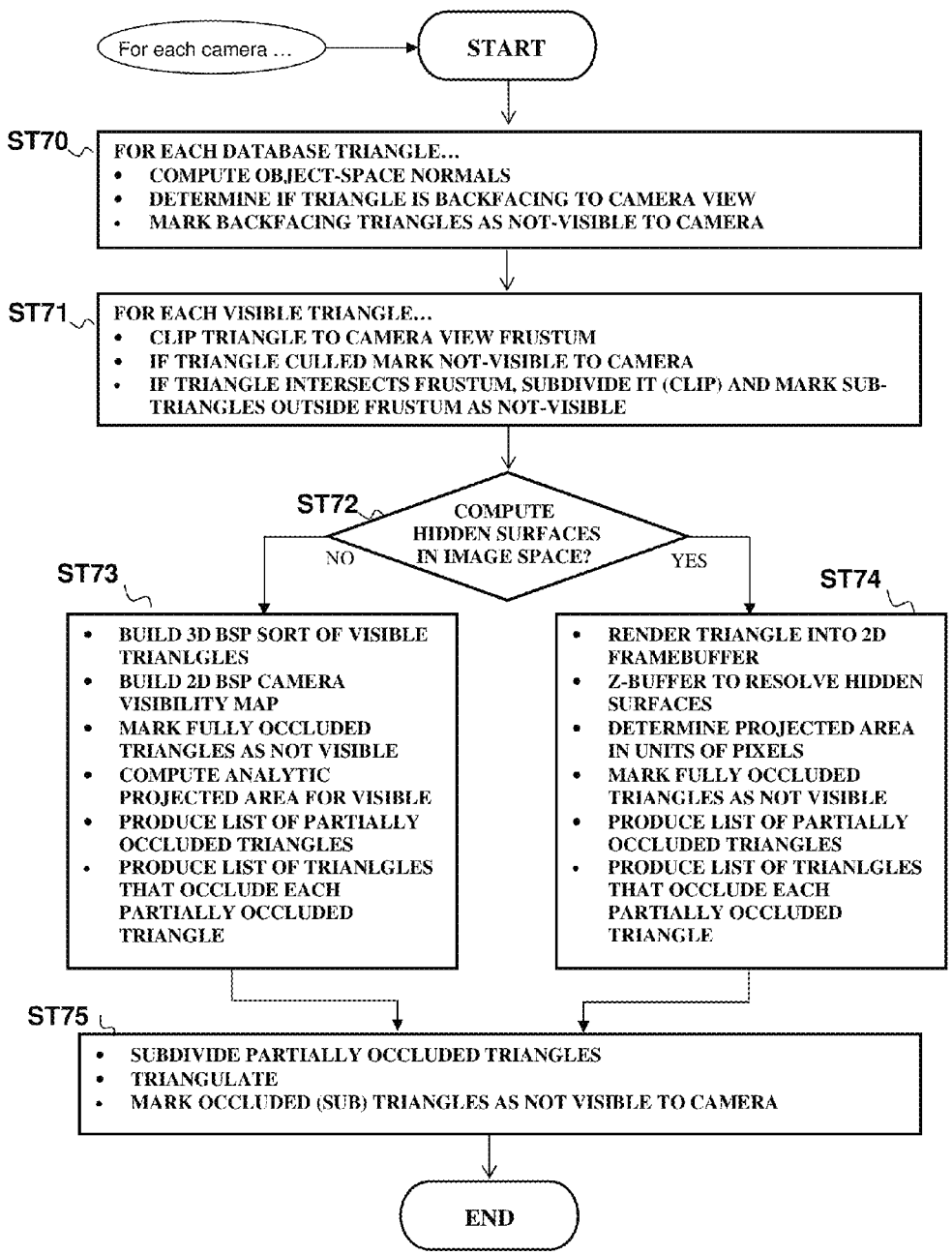
FIG. 15 is a flow diagram showing visibility processing on geometric models to determine which subfacets of the model each associated camera sees.

The visual reconstruction process is executed in two stages. The first stage of the visual reconstruction process is a determination of the visible triangles relative to each scene camera. This is a multiple step process carried out for each camera. FIG. 15 shows a flow diagram of the process.

At step ST70, all triangles are initialized as being visible and surface normals are computed for each. Triangles are backface filtered by taking the dot product between the triangle normal n and the camera viewing direction v determines if the triangle is back or front facing to the camera. If back-facing, a triangle is marked as not visible.

At step ST71, each triangle not filtered out at step ST70 is clipped against the camera frustums. An object-space clipping algorithm checks each triangle in three stages: trivial accept, trivial reject, and clip. If a triangle is trivially accepted, then it remains marked visible. If a triangle is trivially rejected (culled out of the cameras view), then it is marked not visible to the camera. Otherwise, the triangle is intersected (clipped) against the camera frustum. The triangle is then triangulated (subdivided) with the new intersection vertices. In the present implementation, Delaunay triangulation is employed. The resulting sub-triangles that are within the view frustum are marked as visible to the camera; those outside the frustum are marked as not visible.

At step ST72, occluded triangles (surfaces) are identified. An example of an occluded triangle is one that is fully or partially obscured from a camera's viewpoint by another triangle or group of triangles. Triangles that are fully occluded are marked as not visible. Triangles that are not occluded at all remain marked visible. Otherwise, for each partially occluded triangle, a list of those triangles that occlude it is produced. At step ST72, the system or the user selects image-space computation or object-space computation for resolution of hidden surfaces. If an object-space computation is selected, process flow proceeds to step ST73. Otherwise, process flow proceeds to step ST74.

At step ST73, an object-space algorithm computes analytic visibility in two stages. The first stage is a sort of the triangle database in 3-space. The second stage is a determination of the visible triangle fragments in a camera imaging screen.

3D Scene Visibility Tree

The system utilizes a 3D binary space partition (BSP) tree to accomplish a global visibility sort of the input database. The BSP tree sort recursively subdivides the object space and geometry with hyper-planes defined by the surface facets of the input From any given arbitrary viewpoint, a subsequent traversal of the tree will deliver triangles in a spatially correct "back-to-front" or "front-to-back" ordering.

The scene visibility tree is traversed in a front-to-back order. Each triangle encountered is ray-projected into the camera imaging plane and inserted in a 2D BSP referred to as 2D camera visibility map.

2D Camera Visibility Map

A camera visibility map depicts the visible geometry of the scene, as viewed by a camera and projected into its imaging plane (screen). In the event of inter-object occlusions, the visibility map resolves hidden surfaces, depicting resulting visible geometry fragments. A camera visibility map is constructed for each camera in the scene. The object-space camera visibility map is encoded as a 2D BSP tree. In two-dimensions, a BSP tree partitions a camera screen. Edges of the input geometry projected onto the imaging plane define the lines partitioning the space.

The screen of the camera is partitioned into regions that are occupied with projected geometry (G-regions), and those unoccupied (U-regions). When a polygon (triangle) is inserted, it is and clipped to visited U-regions. In the process, the clipped visible region of the polygon overlapping the U-region becomes a G-region. That is, it is removed from the visible region of the screen.

For a triangle, 3 edges become 3 line partitions. Each line recursively subdivides the camera screen into two new sub-planes.

G-regions and U-regions appear as leaf nodes in the tree. G-regions are tagged to identify their specific origin. Insertion of geometry stops when there are no U-region nodes (screen is full). Intersections of input geometry and previously inserted geometry (G-regions) detected. This determines, for a given triangle, which, if any other triangles obscure it. Fully occluded geometry is identified and tagged.

At step ST74, an image-space occluded surface algorithm is processed. The image-space algorithm may be implemented entirely in software or utilize 3D graphics hardware if available. The algorithm computes visibility by rasterizing triangles into a 3D graphics frame buffer and also has a z-buffer. Each triangle is rendered with a unique identification value. To determine which triangles are fully occluded, all triangles are rendered into the frame buffer with z-buffer to resolve hidden surfaces. The frame buffer is subsequently scanned and the triangle identification numbers present in the buffer are recorded. Those triangles whose identification numbers do not appear in the frame buffer are deemed fully occluded.

The determination of whether a given triangle is occluded, and if so, by which triangles, is as follows. For each triangle, a mask is generated such that a scan of the previously rendered frame buffer will read only pixels contained within the given triangle. The frame buffer is scanned and the triangle is determined to be fully visible if the pixel values read back are only equal to the triangle ID value. If this is not the case, then the triangle is partially obscured, and the triangles which obscure it are identified by the ID values found. Projected areas of triangles (in pixels) are also determined by rendering a triangle and counting the occurrences of its ID value in the frame buffer.

At step ST75, each occluded triangle is intersected (clipped) with all those that occlude it. The triangle and intersections are Delaunay triangulated. Fully occluded sub-triangles are marked as not visible. Others are marked visible. The projective area of each visible sub-triangle is calculated.

The second stage of the visual reconstruction process is an assignment of a cameras to triangles for texture mapping. FIG. 16 illustrates this process.

For each triangle and for each camera which "sees" the triangle, the angle between triangle normal and camera view direction is calculated. In the present embodiment, the camera presenting minimum view angle and maximum projective area is selected to map onto a given triangle.

Rendering Engine

Rendering Engine 17 is the visual rendering processor of media processing engine 11, producing all real-time and non-real-time visual output during media creation or playback. During interactive modeling and reconstruction processing with 11, 17 serves "in the loop" as the rendering engine for all graphical display. Rendering Engine 17 reads scene graph and ancillary data unit 14 and constructs visual output representations. Visual output 26 is suitable for direct display on a computer graphics display system or storage on a medium such as a computer hard disk. Rendering Engine 17 output 27 is sent to network 10.

Output 26 of 17 includes 2D images, 2D Image mosaic compositions, 2D image collage compositions, 3D texture-mapped object and scene compositions, and compositions of all of the above. The specific output depends on the processing modality of the system and the type of content produced.

The current and preferred embodiment of 17 is real-time projective-texture based apparatus and method for rendering a project scene graph on a host computer that supports projective texture mapping in a 3D graphics API such as OpenGL or Direct3D. In general, a real-time capability and use of these graphics API's are not required. In its present embodiment, 17 utilizes projective texture mapping [2] to texture map 3D geometric constructions directly from the original input images used to model the scene and the camera models recovered by the system. The rendering paradigm is one of treating the cameras in the scene as projectors, loaded with their images, and projecting these images back onto the recovered 3D geometric models. Since the 3D scene geometry and camera models where recovered directly from these images, such a projection (re-projection) process completes the loop in reconstructing the scene. The invention also does not require that rendering be executed using the projective texture mapping paradigm. Reconstruction processor 16 subsystem optionally outputs ortho-rectified texture maps and non-projective texture coordinates for rendering using non-affine (orthographic) texture mapping.

For efficient texture map management and overall rendering, the rendering engine 17 implements a tiling scheme for loading only those regions of interest of the input images required at any given stage of the rendering.

3D Object Construction

A process of constructing a parametric 3D solid object model from one or more 2D images depicting the object is disclosed. In the present example, object constructions are compositions of volumetric structure components. In general, modeling engine (PE) 13 and geometry engine (GE) 15 support an extensive and extensible library of structure components, ranging from individual point structures to complex parametric surface structures. A 3D construction process flow diagram is shown as FIG. 14.

Figure 9B:
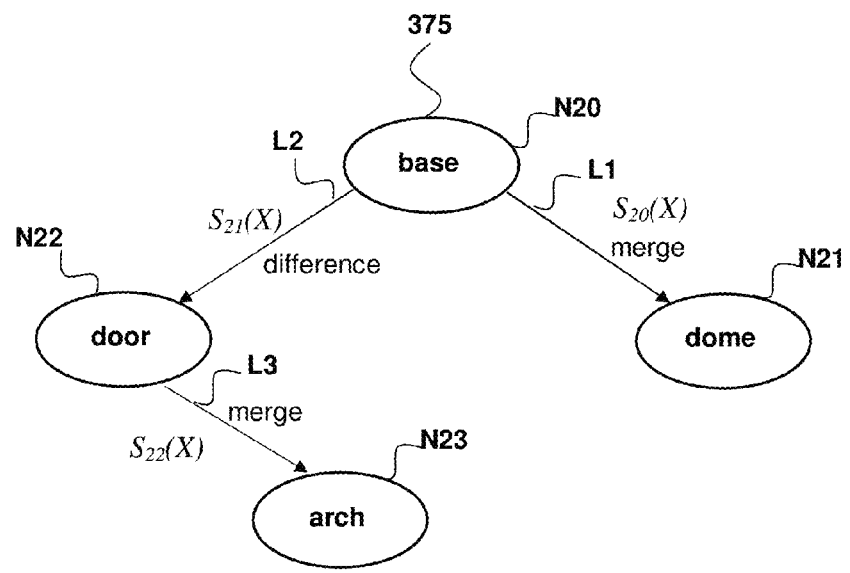
FIG. 9B is the scene graph of FIG. 8D with an additional cylinder structure added.

The process is exemplified with the construction of the domed-arch object depicted in image I100 of FIG. 6A. The arch object is constructed with structure components 50 and 51 of FIG. 4A and FIG. 4B and structure components 52 and 53 of FIG. 3B and FIG. 3C. The resulting model construction 100 is shown as FIG. 12F. Scene graph 375 of FIG. 9B depicts the construction hierarchy, with nodes N20, N21, N22, and N23 containing structures 52, 53, 51, and 50, respectively.

At step ST50 the user imports an object image 24 or downloads an object image 21. Ancillary data 22, such as accompanying parametric descriptors of objects depicted in imagery, is also downloaded at step ST50. Ancillary data might also be imported as data 24, for example in the case of digital acquisition devices that provide such information.

In the present example object image I100 of FIG. 6A is downloaded from network 10. A default 3D construction coordinate system is established with camera C100 belonging to image I100 assuming an arbitrary default 3-space pose and internal parameterization.

Figure 8A:
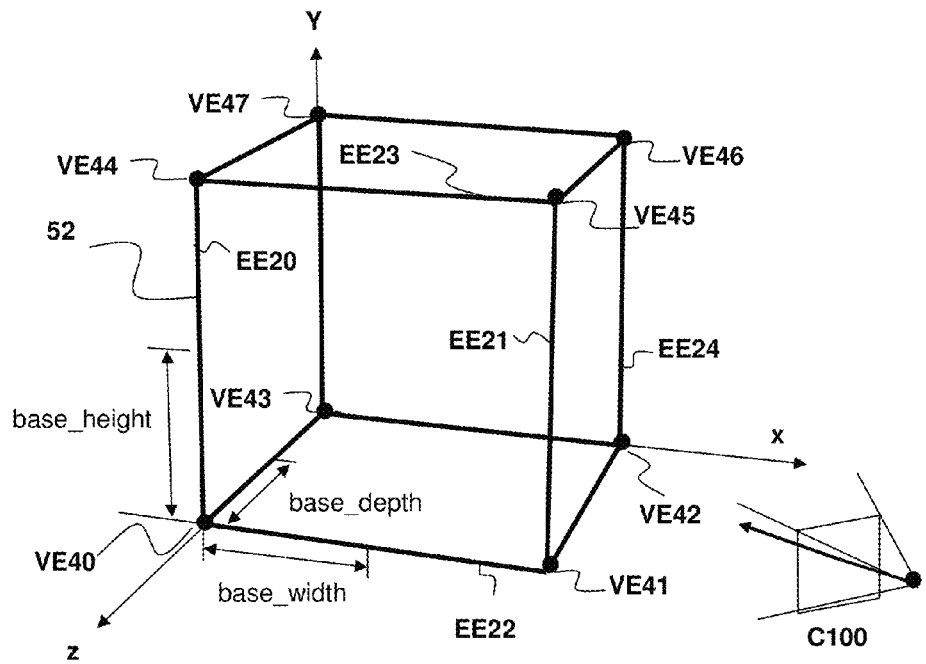
FIG. 8A shows a 3D construction with the image of FIG. 6A with an unsolved box structure in its default initial position and an unsolved camera model.
Figure 8B:
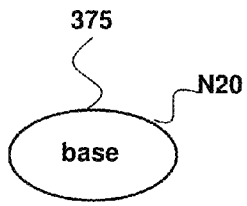
FIG. 8B shows a scene graph containing the box structure.

At step ST51 a model structure is selected and instanced. In the present example, the user selects a "box" structure from built-in library 18 which is instanced by the system as structure 52. Structure 52 serves as the base of the domed-arch object construction and contains three shape parameters base_width, base_height, and base_depth. By default, the first structure is spatially constrained to the origin of the 3D construction coordinate system. FIG. 8A shows the initial scene construction with structure 52 constrained to the origin of the 3-space coordinate system. The values of structure 52 shape parameters and camera C100 internal and external parameters are initialized to arbitrary default values. The system inserts "base" structure 52 as root node N20 in scene graph 375 of FIG. 8B.

At step ST52, through user-interactive input 25 and interface 12, the user interactively places feature annotations in the current input image and establishes correspondence between model structure elements and image features. In the present example, line segment edge features EF20, EF21, EF22, EF23, EF24 are placed in image I100. These annotated features are shown in image I101 of FIG. 6B. This set of features is sufficient to identify the x, y, and z extents of the base object. Feature pairs EF20-EF21, EF22-EF23, and EF21-EF24 set x, y, and z dimensional extents, respectively. Annotated features EF22 through EF24 are corresponded by the user to geometry edge elements EE20 through EE24, respectively. In the present example, this correspondence is done explicitly by the user through a simple point-and-click mechanism within 12.

Alternately, the establishment of feature annotations and their correspondence to structure geometry is done directly and implicitly, as previously described. For the present example, in this modality, image I100 is marked with structure 52 vertex elements VE10, VE11, VE12, and VE13.

The construction parameter space includes nine unknown parameters for camera C100 (six pose, one focal length, and two center-of-projection), three unknown shape parameters base_width, base_height, and base_depth for structure 52, and nine spatial operator parameters (three each for rotation, translation and scale). For the default initialization of the first structure, the spatial operator parameters are fully constrained. To set a relative object scale, one or more shape parameters are set to arbitrary default values by the system or user. To set an absolute object scale, one or more shape parameters are set to of known real dimensions by the system or user. Parameter values may be imported into the system as ancillary data 22 accompanying the import of an image 21. In the present example, parameter base_width is set to 1.0 units to establish a relative scale. Intrinsic camera parameters may also be set to known calibration values by the system or user.

At step ST53, photogrammetric modeling engine 13 solves the parameter space of all unknown geometry structure and camera parameters. In the present example, modeling engine 13 executes its reconstruction algorithms to recover nine parameters defining camera C100 and two unknown and unconstrained shape parameters base_height and base_depth. FIG. 11A shows the construction prior to recovery of shape and camera parameters. In FIG. 11B, image I104 depicts structure 52 base geometry back-projected into image I100 with unrecovered shape parameters and from the unrecovered camera C100. In FIG. 11C, camera and shape parameters are recovered. In FIG. 11D, image I105 shows structure 52 geometry back-projected into image I100 with recovered shape and camera parameters. The geometry now aligns with the image.

At step ST54 the system inquires as to whether geometry engine GE 15 is to evaluate geometric operators between nodes. If no, (or there is only one node, as is the case for the present example) the process proceeds to step ST56. Otherwise, the process proceeds to step ST55, where all unperformed operations are executed by GE 15. In the present example, the user elects to perform geometric operations after the addition of each new structure.

At step ST56 the system inquires as to whether additional structures are to be added to the present construction. If yes, process flow proceeds back to step ST51 with the selection and insertion of the next structure. Otherwise, process flow proceeds to step ST57.

At step ST57 the system inquires as to whether additional images are to be added to the project. If yes, process flow proceeds to step ST50 where a new image is loaded and process enables marking the new image and corresponding marked features of the image with existing or new structure elements. Otherwise, process flow proceeds to step ST58.

At step ST58, the scene graph is traversed and geometry engine 15 executes all unprocessed geometric operators. If in all geometric operators where already executes at step ST54, processing is complete.

In the present example, additional structures 51 and 53, and 50 are added, so process flow cycles back through step ST51 three times.

Figure 8C:
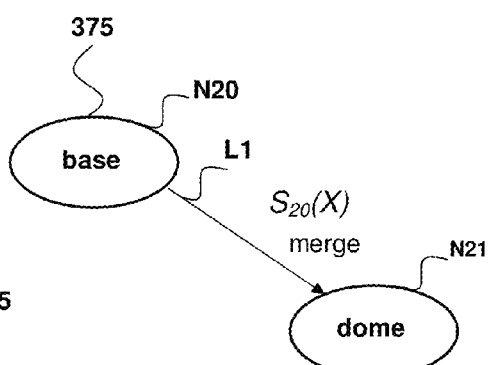
FIG. 8C is the scene graph with a sphere structure added.
Figure 8D:
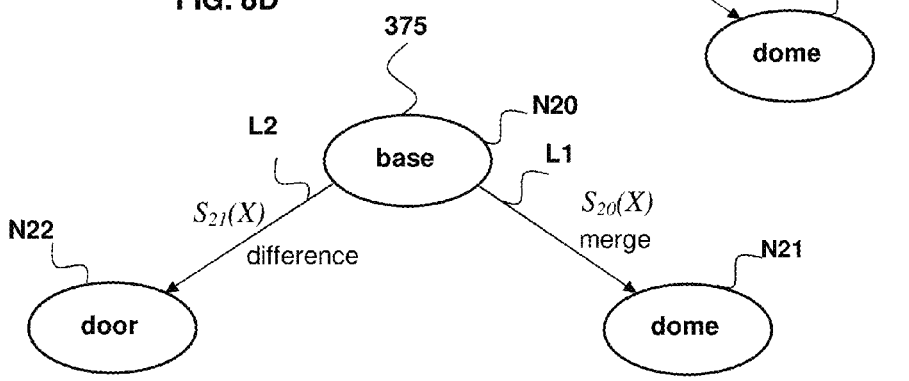
FIG. 8D is the same scene graph with yet another structure added.

At step ST51, structure 51 is instanced to represent the dome of the object construction. The system inserts "dome" structure 52 as node N22 in scene graph 375 of FIG. 8C. Spatial operator $S_{20}(X)$ in link L1 between scene graph nodes N20 and N21 of scene graph 375 encodes the spatial parameters between structures 52 and 51. Variable parameters of translation, rotation, and scale are explicitly constrained to position the "dome" component relative to the base component, as shown FIG. 9. Link L1 contains the geometric boolean merge operator 61 specifying that structure 51 will be combined with base structure 52.

To position the dome on top of base structure 52, the midpoint of the y bounding extent of structure 51 and the maximum y-extent of structure 52, are equated. To center it, the midpoints of the x and z bounding extents of the two structures are equated. As previously discussed, the system allows for many ways to specify constraints. For example, vertex element VE30 at the center of sphere structure 50 could be directly equated to the midpoint of the top face of structure 52.

Constraints are also placed on structure 51 shape parameters. The sphere shape parameter sphere_radius is set equal the base structure size cbase_depth. To solve for the dome height sphere_radius2, point feature VF50 is marked in image I101 of FIG. 6B and is corresponded to vertex element VE31 of structure 51.

At step ST53 modeling engine 13 solves for the dome height parameter sphere_radius2. If previously solved parameters are not "locked", the engine will optionally resolve them.

Figure 12A:
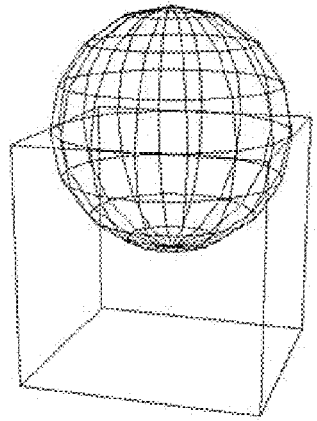
FIG. 12A shows a sphere structure constrained to the top of a box structure pertaining to the construction of FIG. 9A.
Figure 12B:
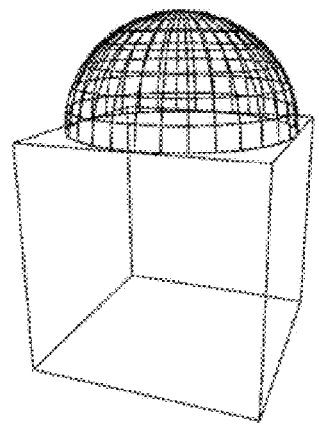
FIG. 12B shows the same construction with a boolean merge operation applied between the box and sphere structures.

At step ST55, the boolean merge operation between nodes N20 and N21 is executed by geometry engine 15. FIG. 12A shows the construction prior to the geometric operation. FIG. 12B shows the construction after to the geometric operation.

For the present example, the above process flow repeats twice, once for the addition of box structure 53 and once for the addition of cylinder structure 50.

Box structure 53 serves as the door opening of the arch assembly, as shown in FIG. 9A. It is inserted as "door" node N22 in scene graph 375 of FIG. 9B.

To position the door, spatial operator $S_{21}(X)$ in link L2 is set such that the minimum y-extents and midpoint x-extents of structures 53 and structure 52, are equated. Link L2 contains the boolean difference operator 63 specifying that structure 51 will be combined with base structure 52.

To constrain the depth of the door to that of its parent base, shape parameters door_depth and to base_depth are equated. As shown in image I101 of FIG. 6B, edge features EF22, EF30, EF28, and EF29 are marked. These are corresponded to edge elements EE22, EE30, EE28, and EE29 in FIG. 9A.

At step ST53 modeling engine 13 solves for the door_width and height parameter door_width and door_height.

Figure 12C:
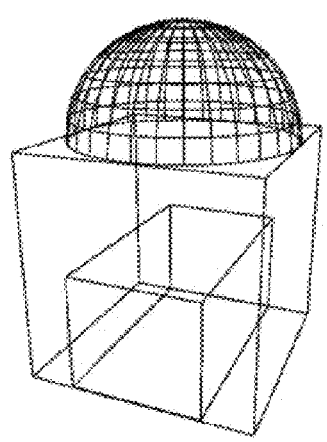
FIG. 12C shows construction of FIG. 12B with a box structure added.
Figure 12D:
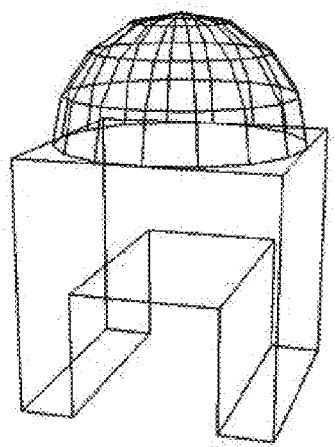
FIG. 12D shows the construction of FIG. 12C with a boolean difference operation applied between the two box structures.

At step ST55, the boolean difference operation between nodes N20 and N22 is executed by geometry engine 15. FIG. 12C shows the construction prior to the geometric operation. FIG. 12D shows the construction after to the geometric operation.

At step ST51, structure 50 is instanced to represent the arch of the object construction. The system inserts "arch" structure 50 as node N23 in scene graph 375 of FIG. 9B. Spatial operator $S_{22}(X)$ in link L3 between scene graph nodes N22 and N23 encodes the spatial parameters between structures 50 and 53. Link L3 contains the geometric boolean merge operator 61 specifying that structure 51 will be merged with door structure 53.

Cylinder structure 50 corresponds to features in image I101 of FIG. 6B. It is attached to the door by equating its midpoint y-extent with the maximum y-extent of door structure 53 and its midpoint x and z extents with those of structure 53.

The width of the arch is to coincide with that of the door, so parameter cyl_radiusA is equated to structure 53 parameter door_width. To solve for cyl_radiusB, the height of the arch, feature point VF60 is marked in image I101 of FIG. 6B and corresponded to vertex element VE35, shown in FIG. 4A. The depth of the cylinder is to correspond to that of the base and the door, so parameter cyl_length is equated to base structure 52 parameter base_depth.

At step ST53 modeling engine 13 solves for the arch height parameter cyl_radiusB.

Figure 12E:
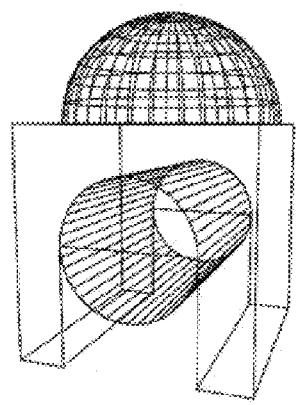
FIG. 12E shows the construction of FIG. 12D with a cylinder structure added.
Figure 12F:
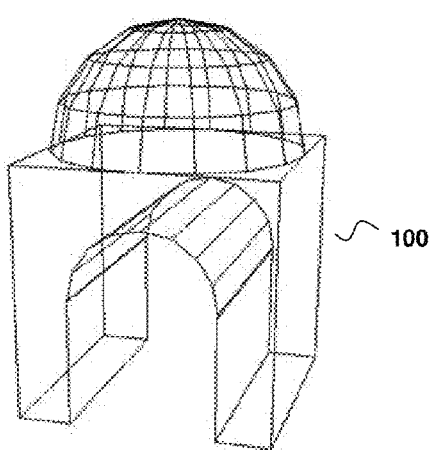
FIG. 12F shows the construction of FIG. 12E with a boolean merge applied between the cylinder structure and the second box structure.

At step ST55, the boolean merge operation between nodes N22 and N23 is executed by geometry engine 15. Given the hierarchy of the scene graph nodes, the arch structure is merged with the door structure. The merged structure is subsequently subtracted from the base structure. FIG. 12E shows the construction prior to the geometric operation. FIG. 12F shows the construction after to the geometric operation, which is the final construction. In the present example, with no more structures or images to process, process flow proceeds through steps ST56 and ST57. At step ST58, GE 15 does no geometric processing since all such operations where performed at step ST55. Process flow therefore terminates.

Figure 13E:
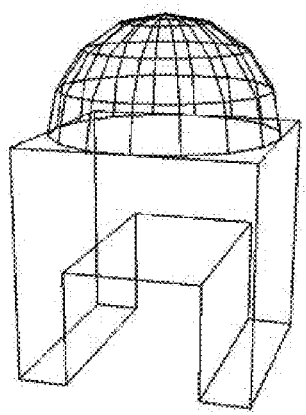
FIG. 13E shows a construction employing a revolution.

The above construction example is only but one of many solid modeling strategies for building the model of FIG. 12F. For example, as an alternative to preformed solid objects, one might employ extrusions and revolutions instead. As shown in FIG. 13D, the door structure could be implemented with the extrusion structure of FIG. 13A. In this fashion, the rectangular extrusion profile X10 would be constrained to the front face base structure 52 in the same manner as was door structure 53. With straight line profile P10 orthogonal to the face of structure 52, an extrusion along its path produces the door structure, which is then subtracted from structure 52. Likewise, revolution of profile X40 around path P40, containing vertex element VE30 corresponded to vertex feature VF50 in image I101 of FIG. 6B, produces a generated dome structure. FIG. 13E shows the final result.

Methods of Media Processing and Visualization

A set of system configurations and methods for processing and visualization of media utilizing the media processing engine (MPE) are disclosed.

The phantom cursor (PC) is an apparatus and process for acquiring a 3-space camera solution relative to any planar facet of a scene or object depicted in a 2D image. The PC is alternately utilized to solve for structure constrained to a 3-space plane given a known camera relative to the plane.

The PC apparatus comprises cursor graphics associated with 2D images, a user interface specification for creating and or modifying the cursor graphics, and an underlying 3-space construction frame and a parameter solution process. The PC apparatus embeds the fundamental geometry and camera construction and recovery processes of the MPE. This includes the annotation of 2-space imagery, the placement of and constraints on 3-space structures and cameras, the correspondence of 2-space features to 3-space elements, and the recovery of unknown parameters. The "phantom" terminology is employed to denote that structure components formed by the PC mechanism may or may not contribute to a construction model output.

The cursor graphics represent 2D-feature annotations to be associated with a 2D image. In the present embodiment, the phantom cursor graphic is an n-sided planar polygon in the plane of the image, consisting of n feature vertices (points) and n feature line segments (edges). For a given cursor graphic, the number n is either a built-in attribute of the system or is explicitly specified by the user. The system supports any number of simultaneous cursor graphics of varying dimension.

The 2D features of a PC graphic correspond to elements of a structure embedded in a 3-space construction frame. In the present embodiment, a quadrilateral structure embedded a reference plane, whose elements are corresponded to quadrilateral features in the image plane of a camera, is sufficient for Media Processing Engine 11 to recover the camera relative to the reference plane. Such a construction is also sufficient to recover the shape parameters of the structure embedded in the reference plane relative to a specified camera.

In the present embodiment, there are two primary ways that a cursor graphic is instantiated in an image. When the dimension n of the cursor graphic is known, a pre-formed cursor graphic of that dimension is instanced. When the dimension is unknown in advance, an interactive process is invoked, whereby the user interactively forms the cursor by indicating the corner feature points of the cursor graphics directly onto the 2D image to which the cursor is associated.

Figure 17A:
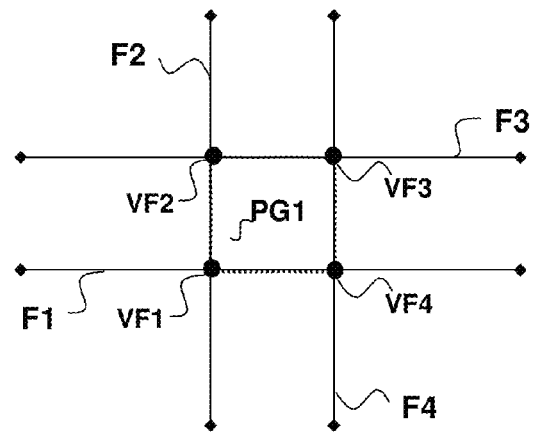
FIG. 17A is a diagram of a Phantom Cursor graphical user interface mechanism.
Figure 17B:
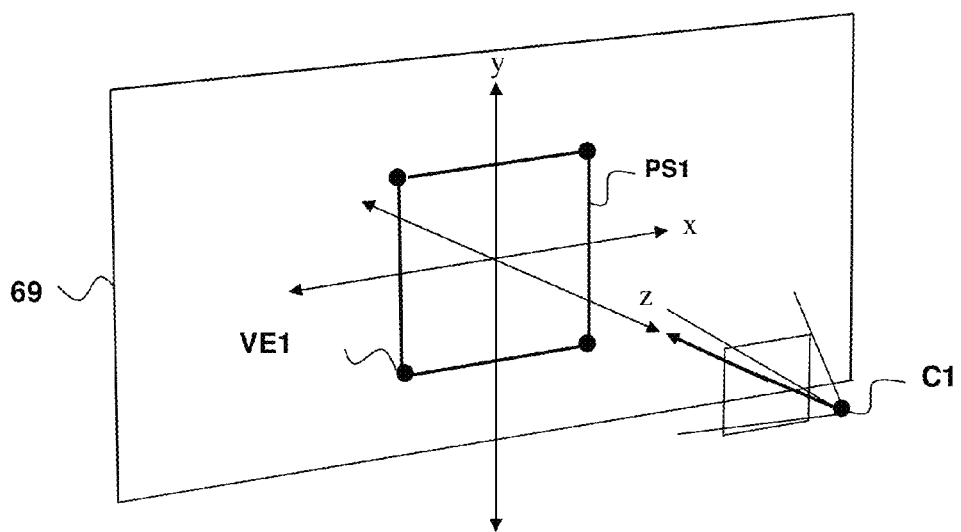
FIG. 17B is a diagram of the default 3-space construction created upon initialization of a phantom cursor.

FIG. 17A shows pre-formed quadrilateral (n=4) PC graphic PG1. PG1 comprises four feature line segments F1, F2, F3, and F4. The intersections of these feature line segments determine the four corner feature vertexes VF1, VF2, VF3, and VF4 of the main rectangle. The extensions of the feature line segments beyond the intersections provide a visual aid to assist the user in manipulating the cursor. PG1 is yet to be associated with a 2D input image. FIG. 17B shows a default 3-space construction frame associated with the PG1. The present embodiment defaults the 3-space construction frame to a standard Cartesian coordinate system with x, y, and, z axes oriented as illustrated. Rectangular structure 69 embedded in the reference plane represents the imaging structure. Default camera C1 is initialized to some arbitrary internal and external parameterization. Element vertex VE1 is assigned as the first vertex of PS1 and is automatically corresponded to PG1 vertex feature VF1. Assuming a clockwise order of the remaining vertices of PS1, all the vertexes and line segments between PG1 and PS1 are automatically corresponded. These assignments and orientations are defaults and are fully alterable by the user or the application.

Figure 18A:
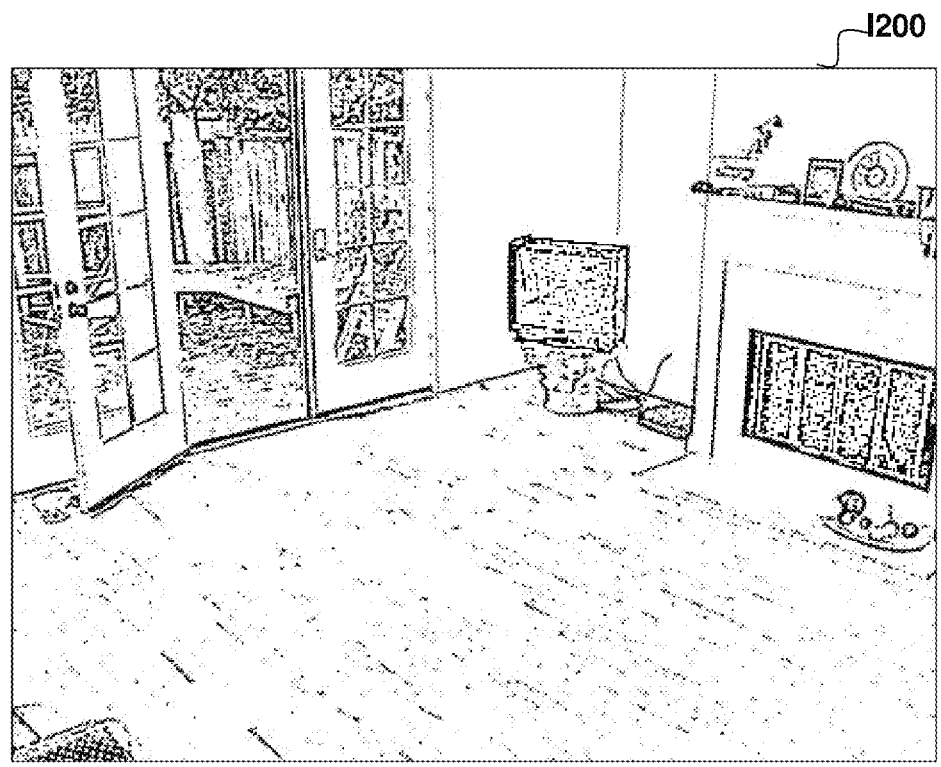
FIG. 18A is an image of a room scene.
Figure 18B:
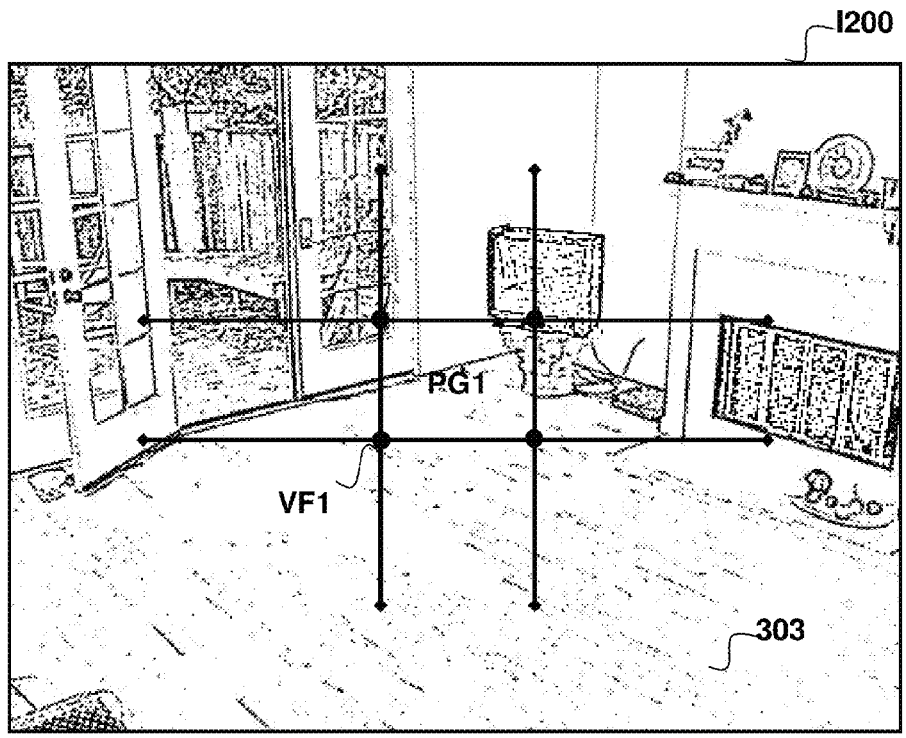
FIG. 18B is the image of the room scene with a default quadrilateral phantom cursor graphic in its initial "floating" position.
Figure 18C:
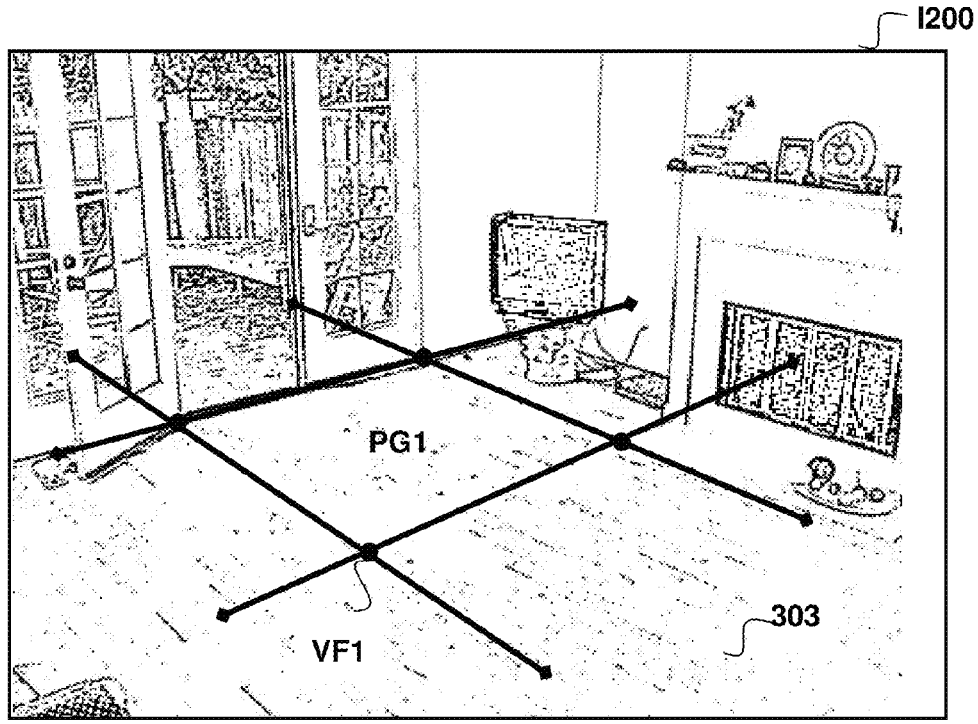
FIG. 18C shows the image of the room scene with the phantom cursor graphic modified by the user.
Figure 18D:
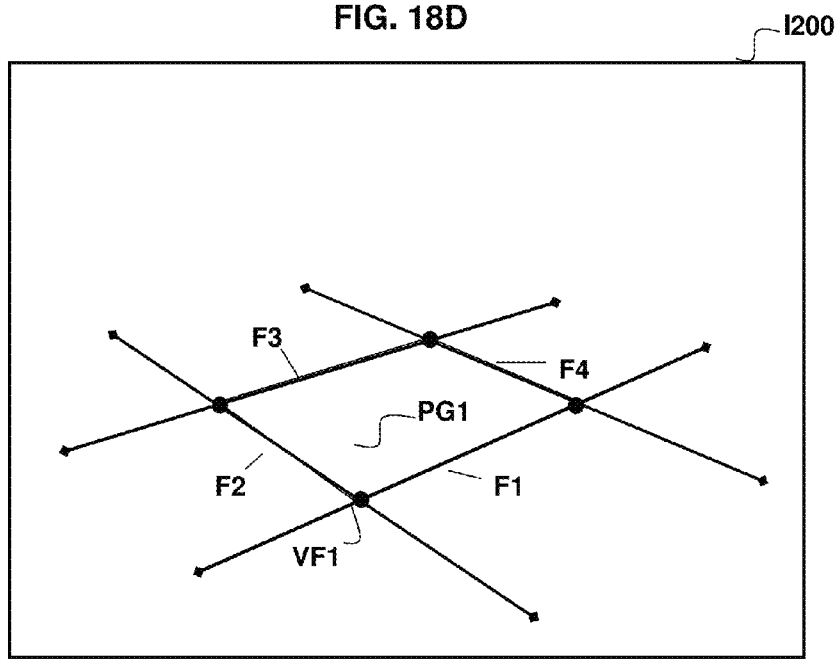
FIG. 18D shows the phantom cursor image annotation overlay from FIG. 18C.

As an example of the processing and application of the PC, a plane in the room scene of image I200 of FIG. 18A is recovered. FIG. 18B shows image I200 with PG1 superimposed. Floor plane 303 depicted in the image is to be recovered. To recover a 3-space plane representing floor 303 from image I200, the user interactively reshapes phantom graphic PG1 superimposed within the image viewing window such that it appears to lie in perspective on the depicted plane of the floor. FIG. 18C and FIG. 18D show modified cursor graphic PG1 reshaped from its original square shape to a quadrilateral in the 2D image plane. This quadrilateral is now the image feature annotation set that relates the projection of the 3D reference plane and embedded structure construction into the image plane of the camera.

Figure 18E:
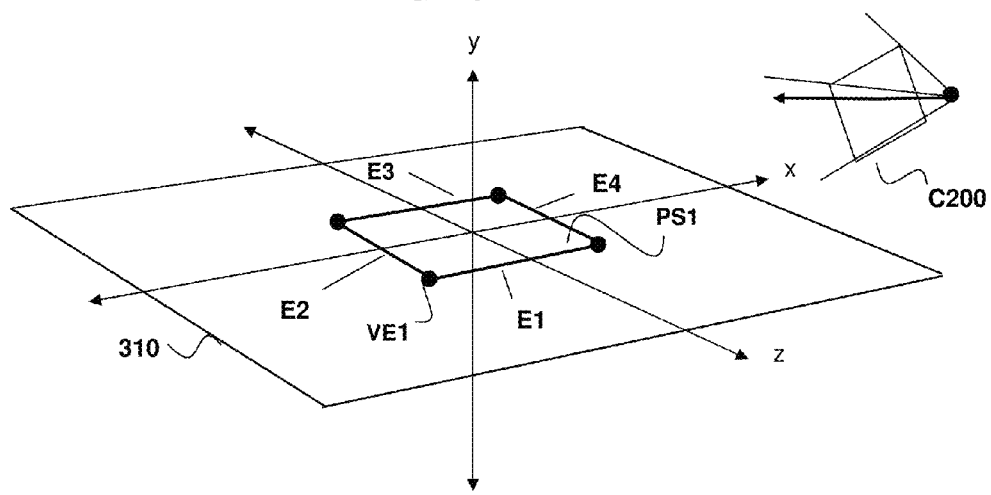
FIG. 18E shows the 3-space construction for the current phantom cursor example.

The 3-space construction of the present example is shown in FIG. 18E. The x-z plane is designated by the application as the initial reference plane defining floor 303 in image I200. The reference plane is represented by structure 310 embedded in the x-z plane. In general, the orientation of the initial reference plane is set by either the application or explicitly by the user. PC structure PS1 is embedded in plane 310 and by default is centered on the 3-space world origin. In the present example, structure PS1 is a 2-parameter rectangle. Camera system C200 is attached to the input image I200 and is to be recovered. PME 13 recovers camera C200 and phantom structure PS1 shape parameters relative to fixed reference plane 310.

Figure 19:
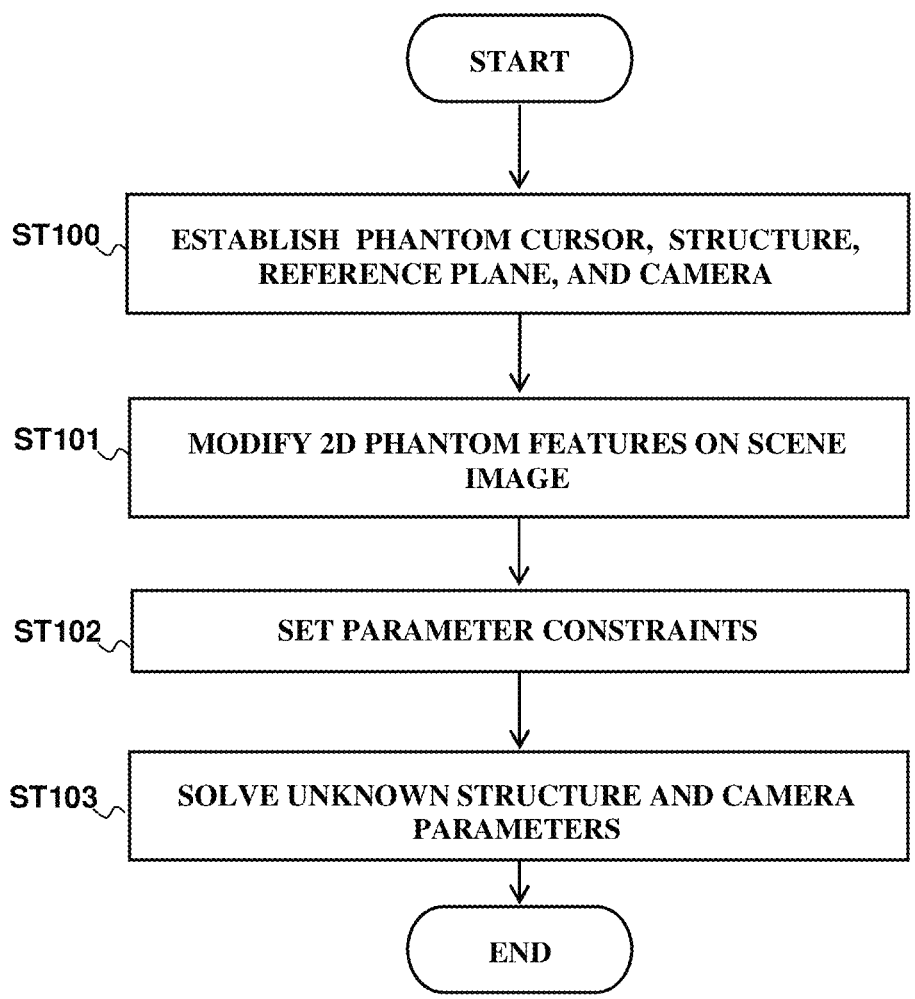
FIG. 19 is a flow diagram outlining the phantom cursor process.

FIG. 19 shows a flow diagram of the PC process. Upon entry at step ST100, PC graphic PG1, construction reference plane 310, 3-space PC structure PS1, and 3-space camera system C200 are established and initialized.

At initialization, PC graphic PG1 feature segments F1, F2, F3, and F4 and feature points VF1, VF2, VF3, and VF4 do not correspond to any feature of input image I200-the cursor is "floating" as shown in FIG. 18B. Unless explicitly overridden by the user, the system automatically corresponds PC graphic features to PC structure elements. In FIG. 18D and FIG. 18E PG1 line segments F1, F2, F3, and F4 are assigned to PS1 edge elements E1, E2, E3, and E4, respectively. Alternate correspondences are equally valid as long as they maintain a proper clockwise or counterclockwise feature to edge assignment. The system also allows the user explicitly establish the correspondences if desired.

At step ST101, through user interface 12 and user-interactive input 25, the user interactively reshapes PC graphic PG1 superimposed on image I200. In the current embodiment and for the present example, user interface 12 allows the user to interactively "grab" line segment and point features to reshape the PG1 in a "rubber-banding" fashion. Cursor line segment features F1 through F4 and point features VF1 trough VF4 are repositioned such that PG1 appears to lie in proper perspective within the targeted plane depicted in the image. For the present example, this is the depicted floor plane 303. The PC mechanism does not require image feature annotations to correspond directly to particular features seen in associated imagery. This allows the system to treat scenarios in which features in an image are incomplete, obscured, or do not exist. Execution of step ST101 establishes correspondence between PC graphic PG1, input image I200, and camera C200. With the correspondence between the PC structure PS1 and PC cursor graphic PC1 established by the system, the PC graphic PC1 is now considered "attached" as opposed to "floating".

At step ST102, parameter constraints are set implicitly by system or explicitly by user. If the plane recovery represents the first geometry-camera relationship established the PC automatically defaults one dimension of structure PS1 to an arbitrary scale value. This establishes implicit scale for the project. Alternately, partial or full true scale may explicitly set by the user with known or assumed values. For example, for partial scale, the user sets one dimension of rectangle PS1 to an actual known dimension of the scene or object. For full scale, the user sets two dimensions. In general, for an n-sided phantom structure, n shape parameters may be set. When explicit scale is to be set, the user will typically align PC graphic features to observed features in the image that are of known (or to be guessed) dimensions.

At step ST103, photogrammetric modeling engine 13 is invoked to solve for all unknown and unconstrained parameters of the overall PC construction. The shape parameters of PS1 as well as the intrinsic and extrinsic parameters of camera C200 are recovered.

Image Mosaics

Sometimes the field-of-view of a camera is not wide enough to capture an entire scene in one image. For such scenes, a wide angle lens might be used, but such hardware is expensive and can still produce insufficient results. The system provides a processing modality that will mosaic together any number of images shot from a camera from the same viewpoint. This apparatus and method allows an individual to ready transform an ordinary camera into a wide-angle acquisition and visualization system.

In mosaic mode, media processing engine 11 accepts two or more 2D digital images 24 or 21 under the control of user-interactive input 25 through user interface 12. An example of input 24 is a user downloading images from a digital camera directly onto the host computer system. An example of input 21 is a user downloading digital imagery from a conventional film developing service (e.g. conventional 35 mm film) which offers digital output format and delivery directly over the Internet.

Figure 20:
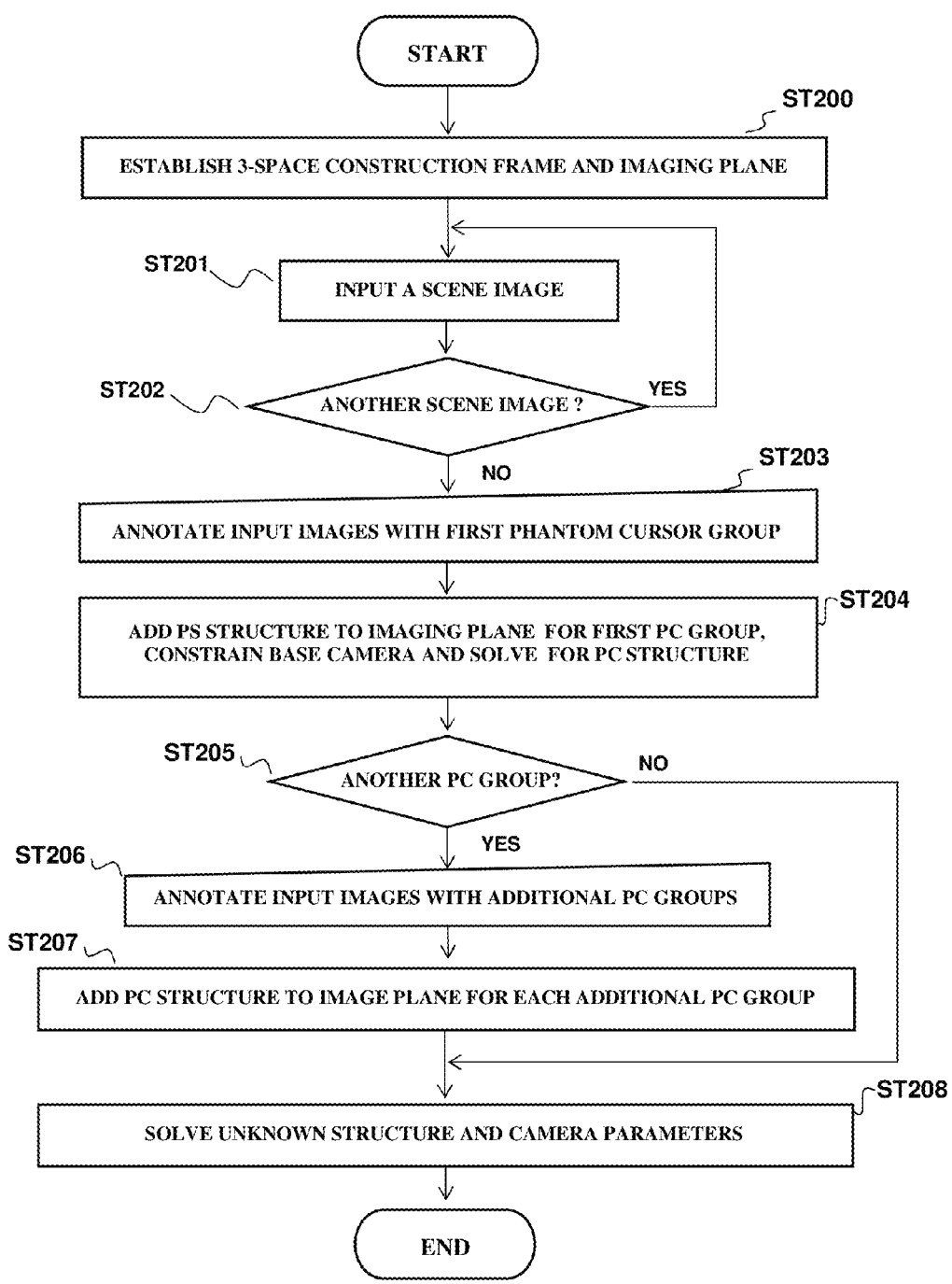
FIG. 20 is a flow diagram outlining an image mosaic process leveraging the phantom cursor process.

A flow diagram of the mosaic process is shown in FIG. 20. The process begins at step ST200 with the establishment of a 3-space mosaic construction frame and imaging plane. The construction frame constitutes the parametric 3D geometric representation of the mosaic. By default, the 3-space construction frame of the mosaic apparatus is the default PC construction of FIG. 17B. This establishes the x-y (z=0) plane of the standard Cartesian coordinate system as the mosaic imaging plane.

At step ST201 the user enters the first input image via 12. The first input image is established as the base image of the mosaic construction. Process flow then proceeds to step ST202 and a system query for entry of another input image. By definition, a mosaic comprises two or more images. If at step ST202 only one image has been loaded, process flow automatically proceeds back to step ST201 for entry of another image. If at step ST202 no additional images are required, process flow proceeds to image annotation step ST203.

To relate and mosaic together any two images, the user identifies, within each image, one or more planar polygonal regions in common with the other image. Such regions are marked in each image with the PC mechanism. Correspondences amongst regions and images are established by formation of PC groups, whereby each PC group creates and shares a common geometric structure embedded in the mosaic imaging plane of the 3-space construction.

At step ST203, the first PC group is established. The user identifies a region common to two or more input images. Through user-interactive input 25 and interface 12 a PC is created and placed by the user clicking on n corner points of an identified n-sided region while the system "rubber-bands" out piecewise adjoining line segments. By default, the system maintains PC and group accounting by mode-all PC's established during a given "form group" mode are equated. In general, groups may be set explicitly by the user or implicitly by an application.

Figure 21:
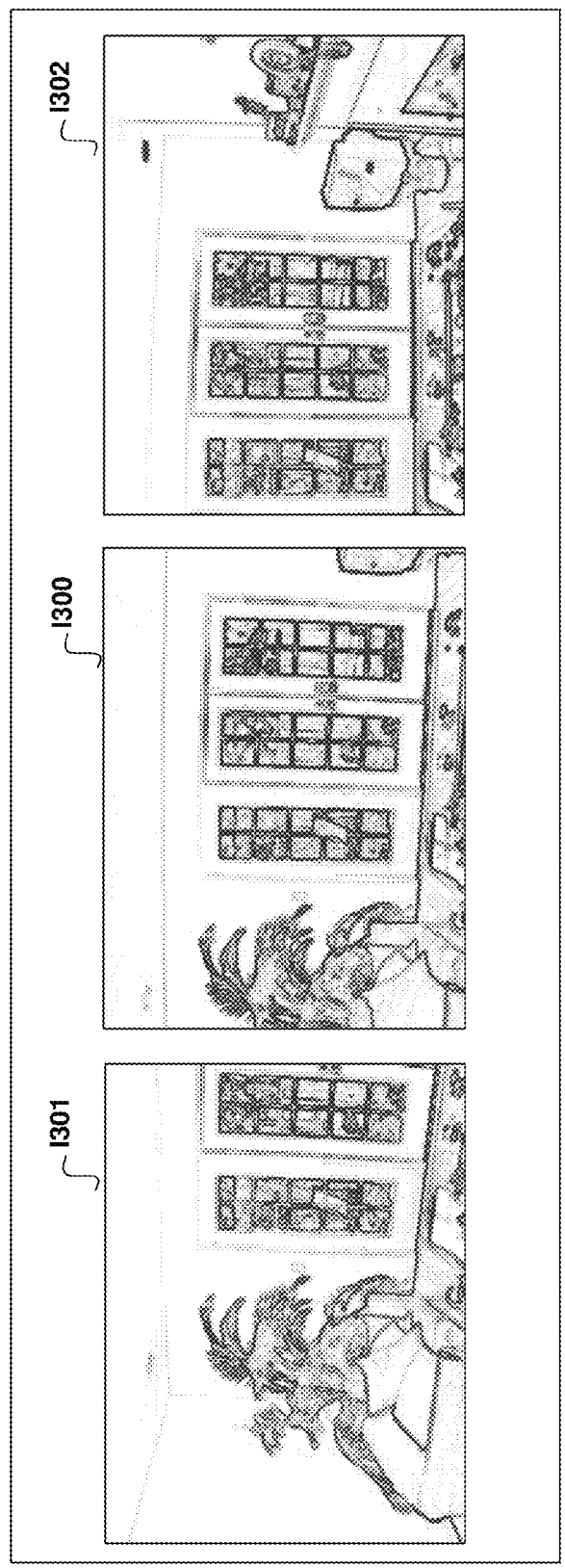
FIG. 21 shows three images of a room scene used as example input to the system mosaic processing method.
Figure 22:
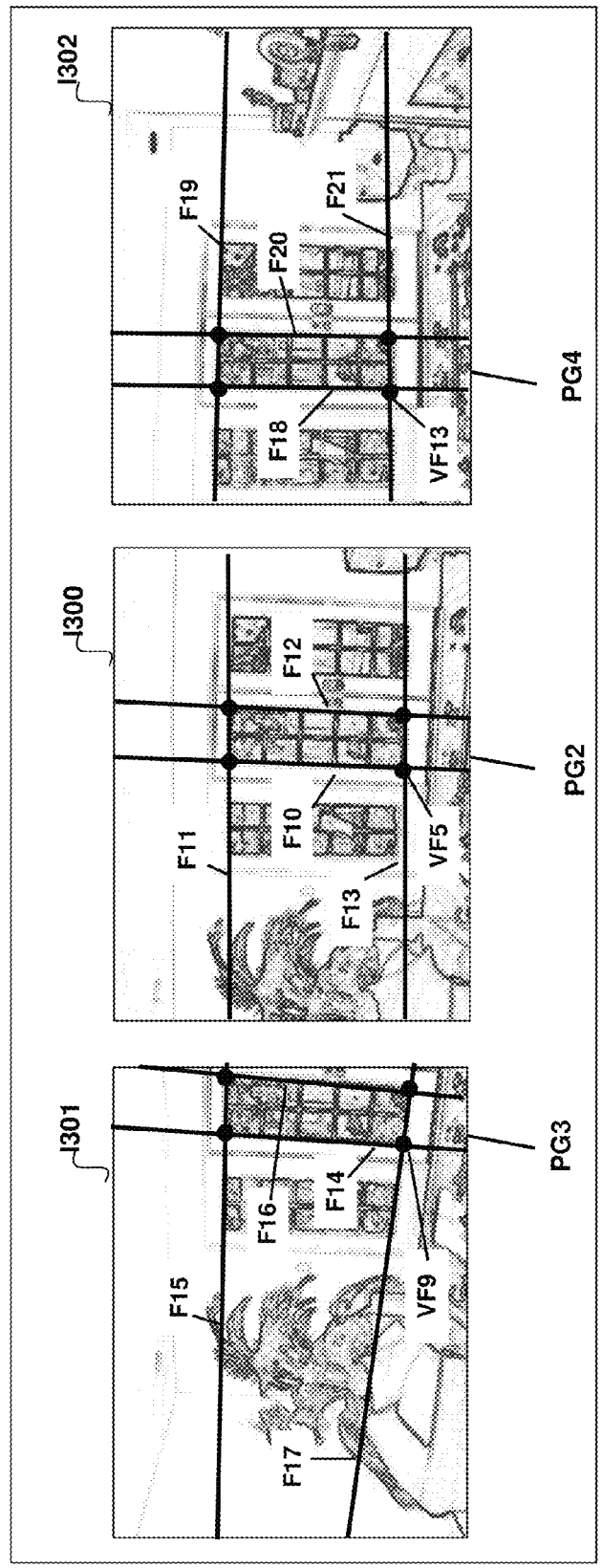
FIG. 22 shows the three images with annotations applied as part of the mosaic processing.

An example of the user-interactive process at step ST203 is shown with the set of input images of FIG. 21. The user inputs three images I300, I301, and I302 at steps ST201 and ST202. By choice of the user, image I300 is entered first, thus becoming the base image. The user visually identifies and selects the center "french door" region common to all three images. FIG. 22 shows input images I300, I301, and I302 with PC graphics superimposed. In image I300, the user marks four corner points of the identified region starting from the lower-left corner point VF5 and proceeding in a clockwise order. A counter-clockwise layout could have been entered, as long as within a group, each PC annotation follows the same clockwise or counter-clockwise orientation. This produces a PC graphic PG2 with edge features F10 through F13 as shown. The system automatically extends the polygon edge line segments to span the dimensions of the image. This enhances accuracy and provides an visually aids the user's adjustments to the PC graphic. The user may interactively adjust PC graphic features by moving the edge segments and or the corner points through user-interactive input 25 and interface 12. In image I301, the user marks the identified region starting from the same lower-left point orientation VF9 and proceeding in the same clockwise fashion, producing a PC graphic PG3 with edge features F14 through F17. The same process is carried out with image I302, starting with point VF13, producing a PC graphic PG4 with edge features F18 through F21. In this example, the PC graphic of each image corresponds to the same image region-PG2, PG3, and PG4 are of the same group. With the user following a consistent data input orientation, the system automatically corresponds image I300 PC feature F10 to image I301 PC feature F14 and image I302 PC feature F18, and so on.

In 3-space, the construction of a mosaic consists of a common imaging reference plane and structure representing that plane, a PC structure for each PC group embedded in the imaging plane, and a camera system associated with each input image. At step ST204, the PC structure for the first PC group is embedded in the reference imaging plane structure.

Figure 23:
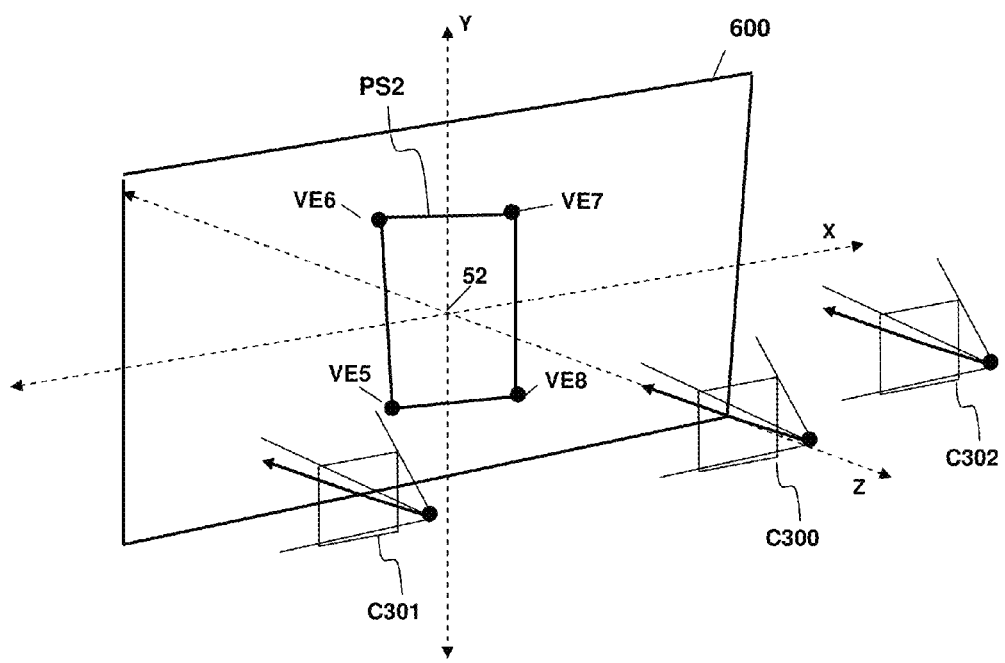
FIG. 23 shows the 3-space construction corresponding to the mosaic processing of the images of FIG. 22.
Figures 24A, 24B, 24C:
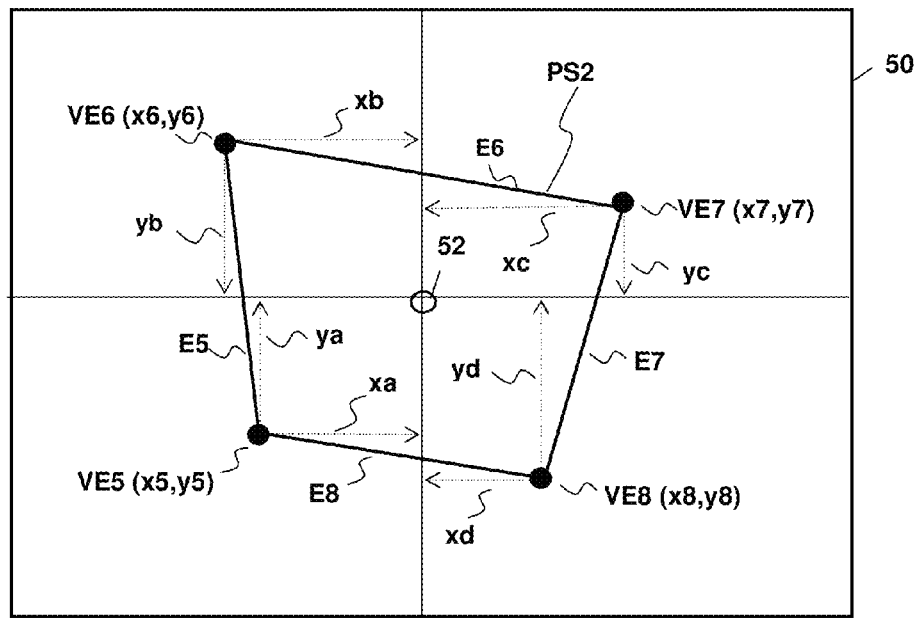
FIG. 24A shows a detailed diagram of a quadrilateral phantom cursor structure.
FIG. 24B gives the parameterization of the vertices of a quadrilateral phantom cursor.
FIG. 24C is a correspondence table that maps the relationship between 2D edge features and 3D elements of a quad phantom cursor.

A construction for the present example with three input images I300, I301, and I302 is shown in FIG. 23. The mosaic imaging plane is represented by planar rectangular structure 50. Cameras C300, C301, and C302 correspond to images I300, I301, and I302 and PC graphics PG2, PG3, and PG4, respectively. At step ST204 the first (and only) PC structure, PS2, corresponding to PC group PG2, PG3, and PG4, is embedded in image plane structure 50 with its centroid spatially constrained to 3-space coordinate origin 52. PS2 is a quadrilateral, corresponding to the dimension of each PC graphic in the group. PC structure PS2, shown in greater detail in FIG. 24A, is comprised of four vertices VE5, VE6, VE7, and VE8 and four edge elements, E5, E6, E7, and E8.

The shape of PC structure PS2 is determined by 8 independent parameters xa, ya, xb, yb, xc, yc, xd, and yd. The coordinates of the vertices of PC structure PS2 are a linear combination of these shape parameters as prescribed in FIG. 24B. In general, an n-sided structure contains 2n parameters. If the structure is constrained to be rectangular or square, then the numbers of shape parameters are 2 and 1, respectively.

At step ST204, a base image and camera for the first PC group is selected. Unless set by the user or application, the base image defaults to be the first image entered at step ST200. In the present example, this is image I300. In 3-space, the mosaic composition of a set of images requires finding the camera solution of each image relative to a common image plane. By default, the base camera-image pair (C300-I300) is fixed such that its line-of-sight is orthogonal to the image plane (coincident with z-axis) and its point-of-view a fixed distance along the z-axis. In this configuration, the mosaic imaging plane and the image plane of the base camera are parallel.

Given the default spatial orientation and relationship of the base camera-image pair, the projection of the PC graphic of the base image establishes the correspondence and spatial orientation of PC graphics features with PC structure elements. For the present example, FIG. 24C shows how PC structure PS2 is corresponded to the PC graphic group comprised of PC graphics PG2, PG3, and PG4. Each edge element of PS2 corresponds to 3 edge features. For example, edge element E5 corresponds to edge features F10, F14, and F18.

At step ST204 the shape parameters of the first PC structure are solved by modeling engine 13. Once solved, the values of these shape parameters are locked.

At step ST205, an inquiry to determine if additional PC groups are to be added. If yes, the process flow proceeds to step ST206, otherwise the process flow proceeds to step ST208.

At step ST206, the user adds one or more additional PC groups. At step ST207 a PC structure is automatically added to the mosaic imaging structure for each additional group. These structures are constrained to lie in the imaging plane but are not explicitly constrained in position.

At step ST208, the shape and position parameters of all unsolved PC group structures and cameras are solved for by modeling engine 13. In the present example, all three input images are corresponded through a PC structure PS2. No additional PC groups are added. Cameras C301 and C302 are recovered by modeling engine 13 relative the solution of PS2 and camera C300 at step ST204.

At step ST209, visual reconstruction engine 16 composes the set of input images into a single mosaic image. In mosaic mode, output 26 of media engine 11 is a single image composition of the input image set. The composition of the input images is a projection of the images onto imaging plane 50 from the respective recovered cameras of the input images. In the present embodiment, the base image is first projected and texture-mapped onto the mosaic imaging structure. Subsequent camera projections are clipped against regions on the image plane texture-mapped, with only regions previously not texture-mapped rendered. The clipped images are composed using standard edge feathering techniques. In general, any blending and composition methodology may be employed.

Figure 25:
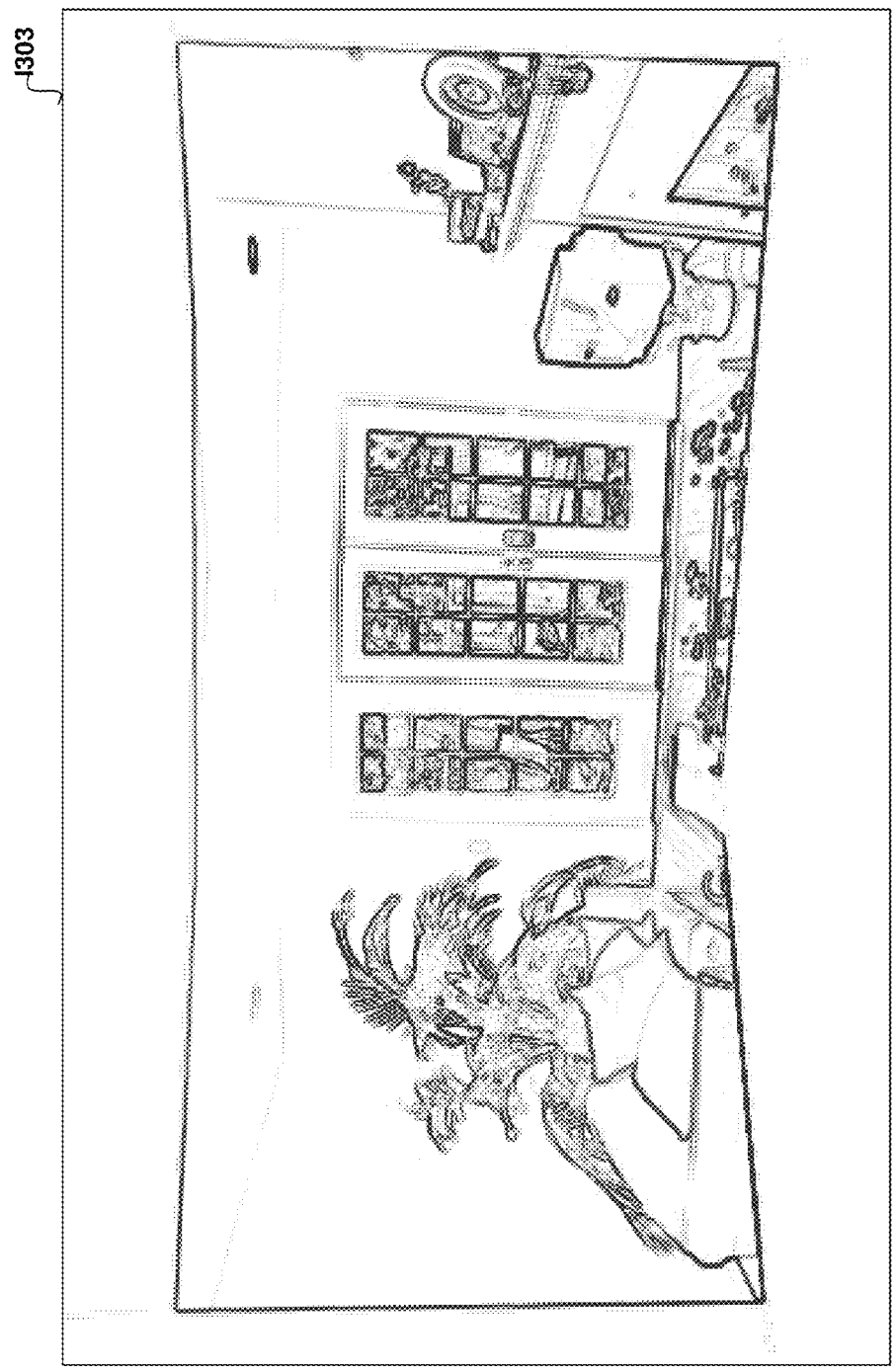
FIG. 25 is an image created by mosaic of the three images of FIG. 21.

Rendering Engine 17 displays the resulting composition. FIG. 25 image I303 shows the resulting mosaic composition for the present example with of input images I300, I301, and I302. In addition to output 26, output 27 delivers the mosaic content output to the network 10. A mosaic database is three-dimensional and therefore the rendering of the mosaic may leverage the 3D structure. For example, the entire mosaic imaging plane construction be rotated or translated in a 3D viewing operation.

Image Collages

A collage is a composition of a base (destination) image with one or more ancillary product (source) images. The composition process entails "cutting" specified regions of source images and "pasting" them into specified regions in the destination image. Examples of base images include single images representing scenes and/or objects to be modified and image mosaics of such images generated by the system or by an external process.

In collage mode, media engine 11 accepts two or more 2D digital images from the user at data input 24 under the control of interface 12. Alternately, images are downloaded into the system at input 21 from network 10. The system outputs 2D image collage compositions 26 for rendering and viewing by the system, for storage, or sends 2D image compositions to network 10 through output 27.

Under the control of user-interactive input 25 and interface 12, the collage process entails the user identification and annotation of "cut from" feature regions in a set of input source images and identification and annotation of corresponding "paste to" feature regions in an input base image. A system solution for source and destination region geometry and camera systems relative to a common collage imaging plane enables projective composition of source collateral with the destination collateral.

Figure 26:
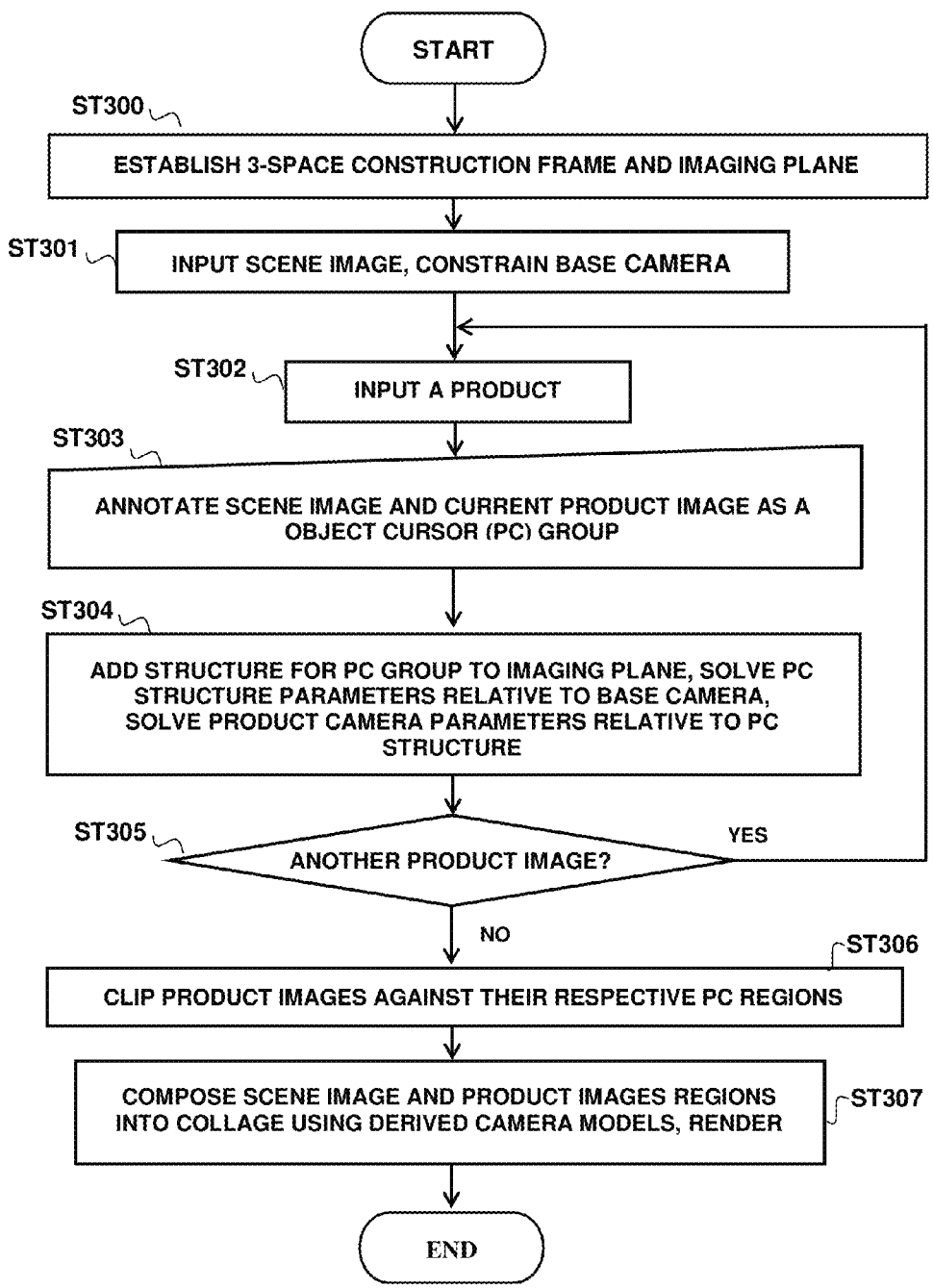
FIG. 26 is a flow diagram of an image collage process that leverages the phantom cursor process.
Figure 28A:
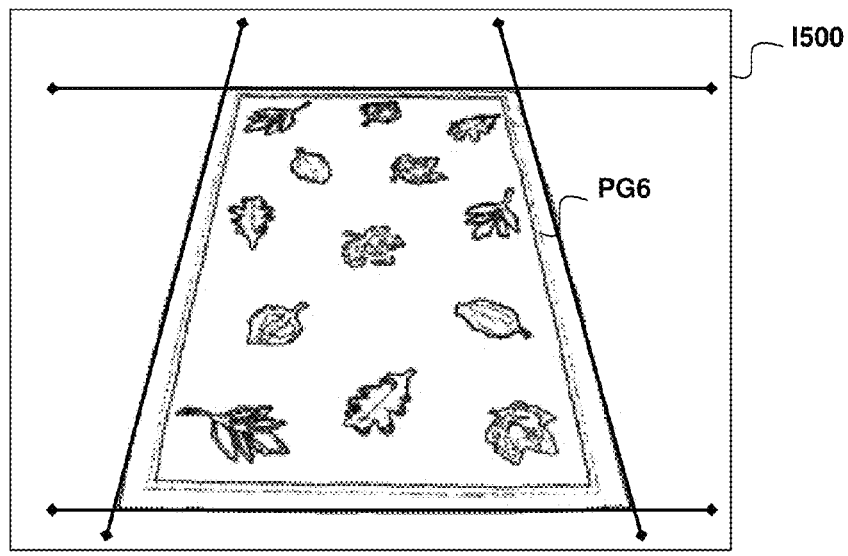
FIG. 28A is an image of a rug product to be used for the collage processing.

A process flow diagram for image collage construction and composition is shown in FIG. 26. As an example, a collage is formed with scene image I200 of FIG. 18A as a base image and two product images I500 and I502 shown in FIG. 28A and FIG. 28B. FIG. 29A shows the 3-space collage construction frame for current example.

At step ST300, the process begins with the establishment of a 3-space collage construction frame and imaging plane. In 3-space, the construction of a collage consists of a common collage imaging plane and structure, one or more structures embedded in the imaging plane structure representing destination regions, and a camera system associated with each input image. The 3-space construction frame constitutes the 3D parametric geometric representation of the collage. By default, the 3-space construction frame of the collage apparatus is the default PC construction of FIG. 17B with the x-y (z=0) plane as the collage imaging plane. A shown in FIG. 29A, planar rectangular structure 600 is embedded in the plane and serves as the collage imaging plane structure.

At step ST301 a base image is entered through user interface 12. In the present embodiment, the process assumes a collage based upon a single base image. If additional scene images are desirable or required, the mosaic process (or other means) are employed to produce a base image that is a mosaic composition of a multiplicity of scene images. Source images may also be mosaic compositions. For the present example, scene image I200 is entered. For base image I200, associated camera C200 is established and constrained to a fixed 3-space position and pose parameterization. Its point of view is on the z-axis a fixed distance 601 from the construction frame origin and its line of sight is coincident with the z-axis and pointing toward the imaging plane 600.

At step ST302 a source (product) image is imported. In the present example, carpet image I500 of FIG. 28A is imported. In the construction frame of FIG. 29A, corresponding camera C500 is instantiated with an unsolved default parameterization.

At step ST303 the user annotates the base image and the current source image as a PC group.

As previously disclosed, PC graphics are entered on a point-by-point basis or as a pre-formed graphic from built-in library 18.

For the present example, source image I500 is annotated with PC graphic PG5 to identify the source region of the current source image. Feature vertex VF1 is arbitrarily assigned first and the remaining three vertices are marked in a clockwise direction. Scene image I200 is annotated with PC graphic PG6 to identify the corresponding destination region in the base image resulting in FIG. 27 image I400. For PC graphic PG6, feature vertex VF5 is marked first and the remaining vertices are marked in a clockwise direction. The PC process corresponds VF1 to VF5 and the remaining features in the PC group according to the given input topology.

At step ST304 a PC structure for the current PC group is embedded in the collage imaging plane and structure. By default, the dimension of the PC structure for the group is the number of vertices of the source region PC. In the present example, the dimension is four.

Given the fixed position and pose of the base image camera, the PC structure elements are automatically corresponded to base image PC graphic features through projective topological preservation. The PC structure elements are automatically corresponded to the source PC graphic features since the base and source PC graphic correspondences have been established. Modeling engine 13 solves for the unknown variable shape parameters of the PC group structure based on its correspondence with the fixed base camera. After the group PC structure parameters are recovered, they are locked. Modeling engine 13 subsequently recovers the variable intrinsic and extrinsic parameters of all or selected source cameras.

Figure 27:
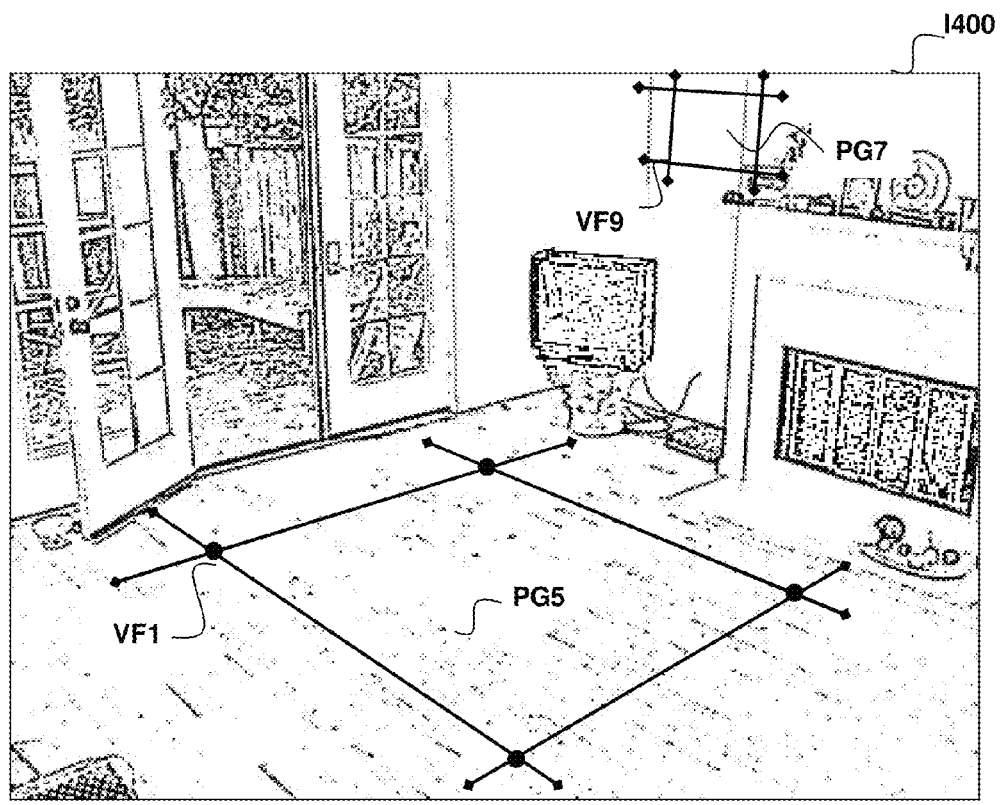
FIG. 27 is an image of a room scene with annotations added for collage processing.

In the present example, PC structure PS3 is placed in imaging plane structure 600, as shown in FIG. 27. PC structure PS3 vertex element VE10 is corresponded to PC graphic PG5 vertex feature VF1 and PC graphic PG6 vertex feature VF5. PS3 contains 8 independent shape parameters like structure PS2 of (a). These variable shape parameters are recovered based on the fixed position and pose of camera C200 attached to base image I200. With these structure parameters constrained, camera C500 attached to source image I500 is recovered.

At step ST305, the system queries as to whether additional source images are to be processed. If yes, process flow proceeds back to step ST302 and the input of another source image. If no, process flow proceeds to step ST306. In the present example, process flow proceeds back to step ST302 with the input of source image I502 of FIG. 28B. At step ST303, FIG. 27 base image I400 is annotated with PC graphic PG7. Vertex feature VF9 is entered as its first vertex. Source image I502 is annotated with PC graphic PG8 with vertex feature VF13 as its first entry. At step ST304 PC structure PS4 is inserted in imaging plane structure 600. Again, the structure placed contains 8 independent shape parameters like the structure PS2 of (a). The system corresponds PC graphic PG7 vertex feature VF9 to PC graphic PG8 vertex feature VF13 and PC structure PS4 vertex element VE20. PC structure PS4 variable shape parameters are recovered by modeling engine 13 based on the fixed position and pose of camera C200 attached to base image I200. With these structure parameters constrained, the variable intrinsic and extrinsic parameters of camera C502 attached to source image I502 are recovered.

At step ST306, reconstruction engine 16 prepares the collage database for composition and rendering. All source images are clipped against their respective PC graphic regions. This constitutes the "cut" portion of the "cut-and-paste" collage processing paradigm. By default, the interior region of a PC graphic is retained as the source imagery to be composed with the base imagery. Alternate selections are made by the user or the application program. In general, any combination of clip regions can be selected. In the present example, image I500 is clipped against PG6 and the interior region of the PC graphic is retained. Likewise, image I502 is clipped against PG8 and the interior region of the PC graphic is retained.

At step ST307, Rendering Engine 17 composes and renders the base image with all source images. Clipped source image regions are composed with their respective base image destination regions by projecting them onto the base imaging plane through their recovered cameras.

In the present example, base image I200 is projectively texture-mapped onto image plane 600 through camera C200. Then, source image I500 is projectively texture-mapped onto it corresponding structure PS3 through camera C500 and source image I502 is projectively texture mapped onto structure PS4 through camera C502. Upon projection, source regions may be combined with destination region using any desired blending operation. In the present example, source pixels replace destination pixels. The final collage is FIG. 30 image I401.

Rendering engine 17 implements multiple image layer composition techniques to resolve hidden surface and hidden object situations during collage composition. Commonly available image region selection algorithms and techniques are incorporated to generate masking layers. These layers are known as alpha channels. During composition, these masking layers determine which pixels of source and destination imagery contribute to the final collage composition. Rendering engine 17 processes alpha channel images as an integral component of its projective composition methods. Rendering engine 17 utilizes some of the same techniques in the rendering of full 3D constructions.

Figure 31B:
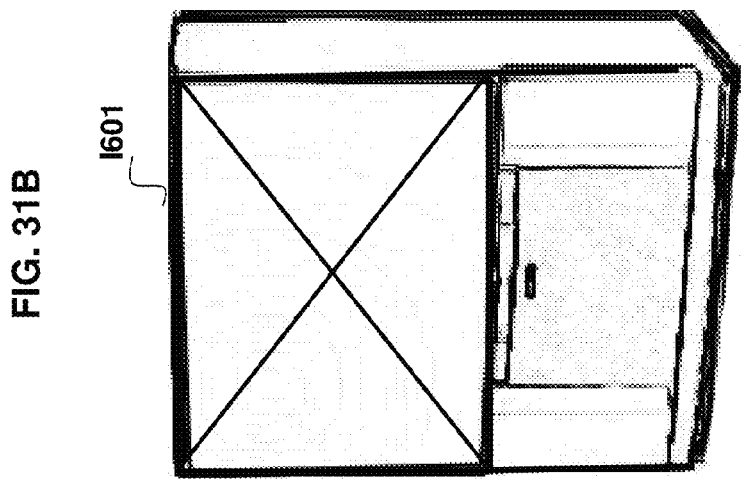
FIG. 31B shows an image of a television object to be composed with the scene image through collage processing.
Figure 31A:
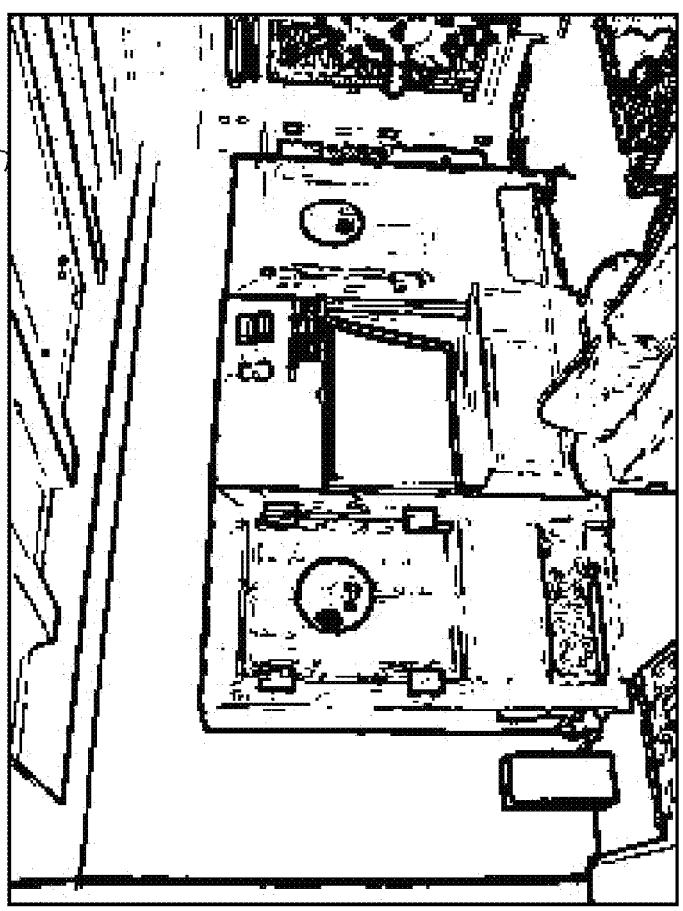
FIG. 31A shows an image of a room scene.
Figure 32A:
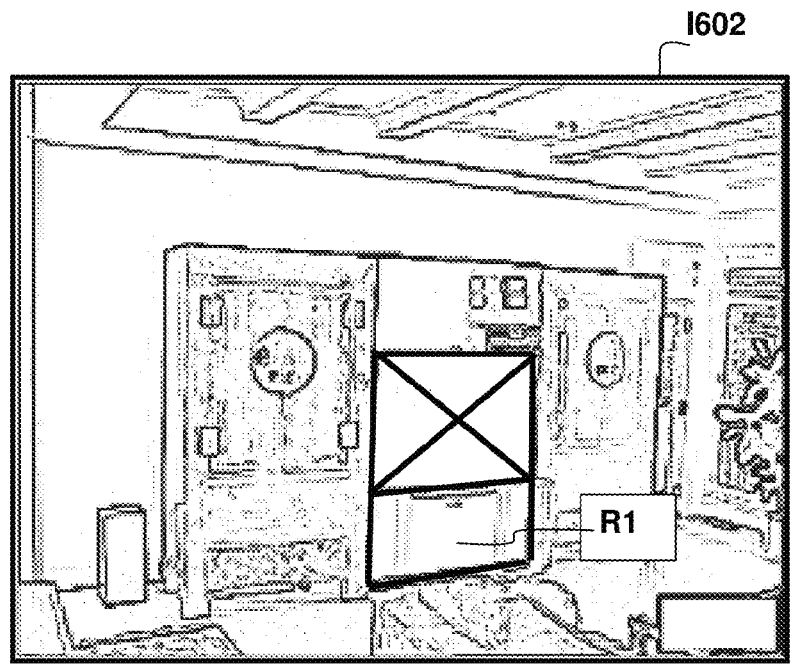
FIG. 32A shows an image of the room scene after composition with the image of the television.
Figure 32B:
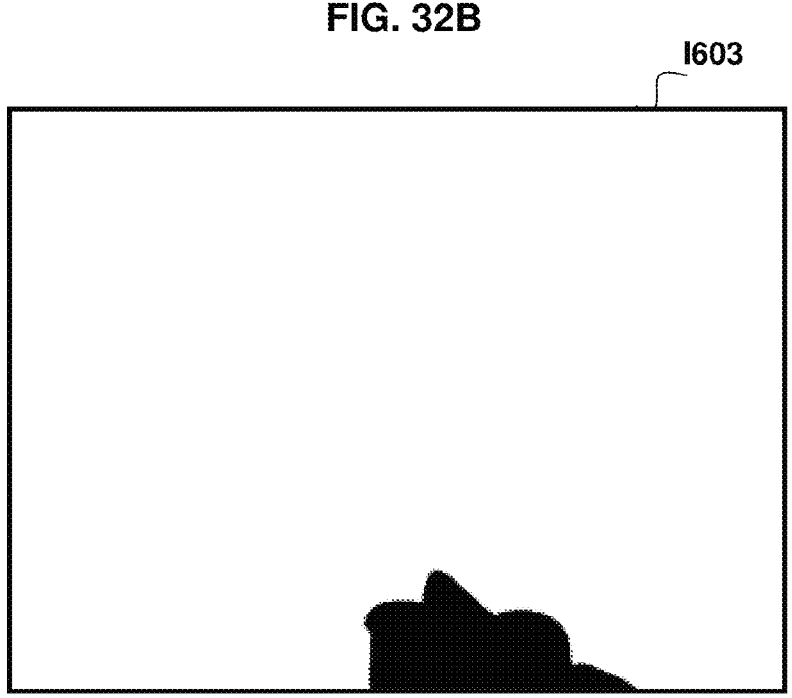
FIG. 32B shows a generated alpha image that will correct undesired hidden surface regions.
Figure 33:
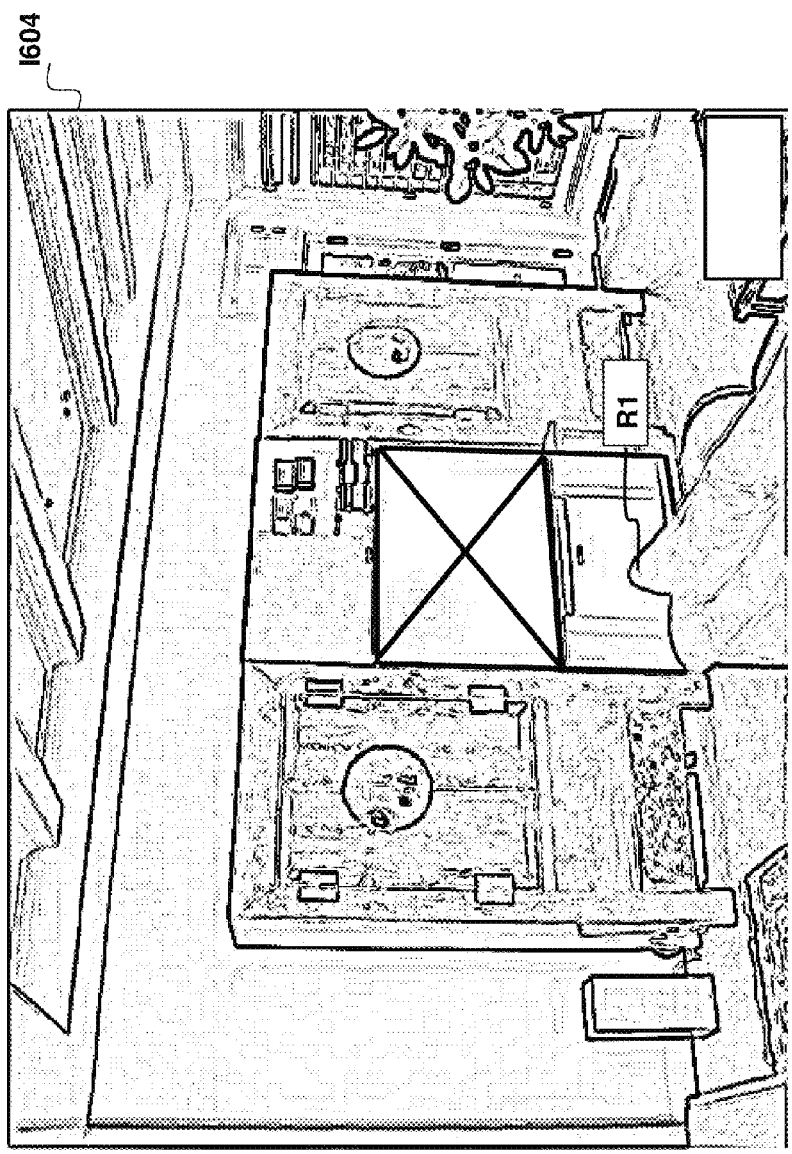
FIG. 33 shows a final image of the collage construction of FIG. 32A after application of the alpha image.

As an example of alpha channel processing, FIG. 31A and FIG. 31B shows room scene image I600 into which television image I601 will be collaged. Image I602 of FIG. 32A and FIG. 32B shows a collage composition of images I600 and I601. In image I602, source "television" pixels of image I601 are seen obscuring "couch" pixels, a visibly unrealistic and undesirable result. This area is pointed to as region R1. Image I603 of FIG. 32B shows an alpha channel image generated by the user with a system incorporated image region selection tool or a standalone image processing tool such as [4]. In image I603 the "couch" region (black pixels) is isolated from the remainder of the scene (white pixels). In the rendering process, rendering engine 17 projects alpha mask image I603 from the perspective of the recovered scene image camera onto the collage imaging plane prior to rendering the source region of image I601. Upon rendering image I601, destination pixels are replaced only if their corresponding alpha image pixels of image I603 are white. Image I604 of FIG. 33 shows the final result, with the couch pixels preserved. Image I604 also shows utilization of the alpha channel image I603 to assist in modifying the depicted color of the couch.

3D Scene Construction

The above-described mosaic and collage methods form image compositions based on 3-space constructions with a single imaging plane. The 3D scene construction methods disclosed below extend these concepts to constructions that are assemblages of multiple planar and volumetric structures in 3-space. Scene constructions are assembled from one or more input images.

Scene construction methods are presented in the context of an application specific implementation of the current embodiment of the system. The application example given is targeted for the construction of a 3D architectural scene. An example room interior construction is shown. This application and associated methods are just one example of the general applicability of the MPE to a vast range of scene and object construction scenarios.

Figure 34:
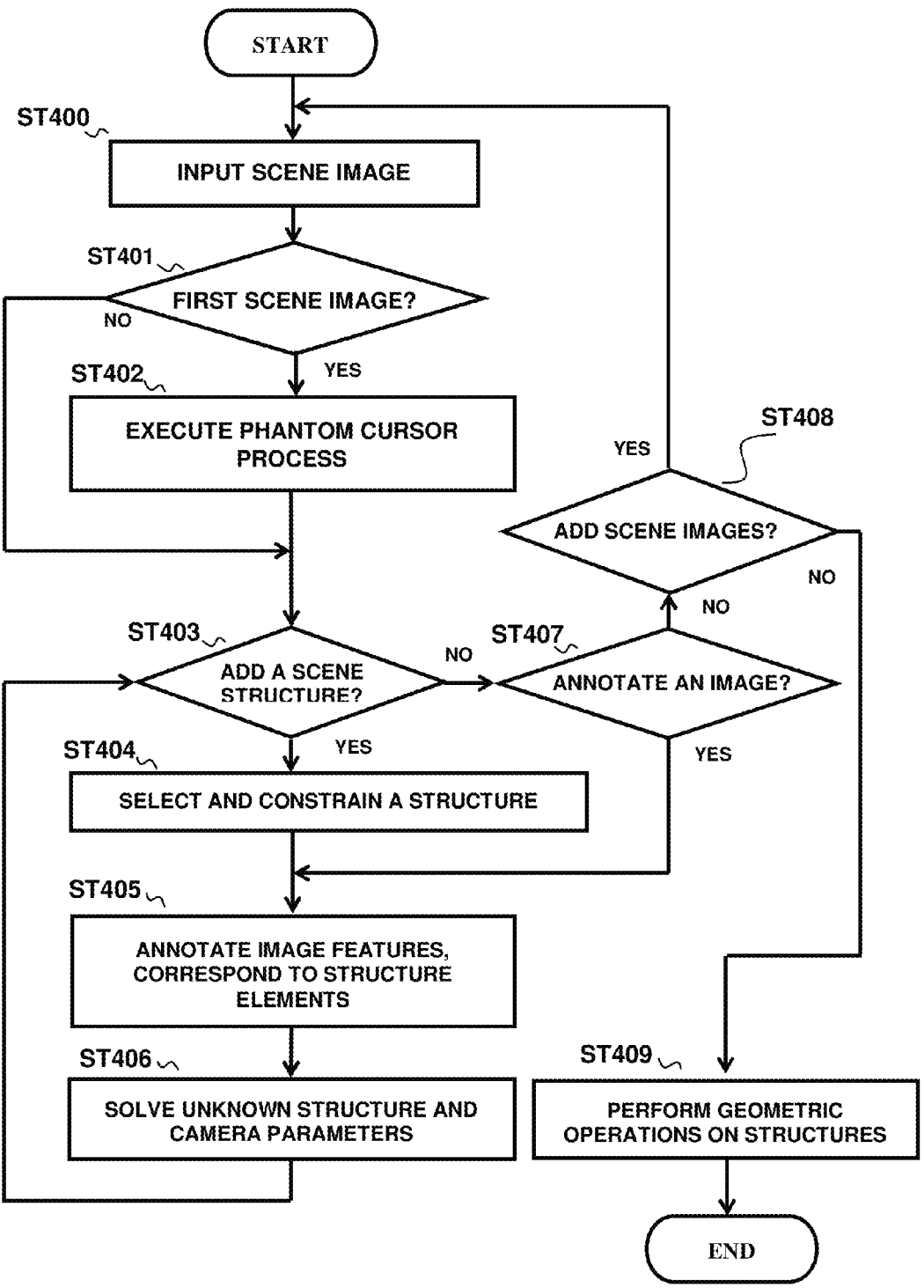
FIG. 34 is a flow diagram outlining the process of creating a 3D scene model from one or more images and levering the phantom cursor.
Figure 35:
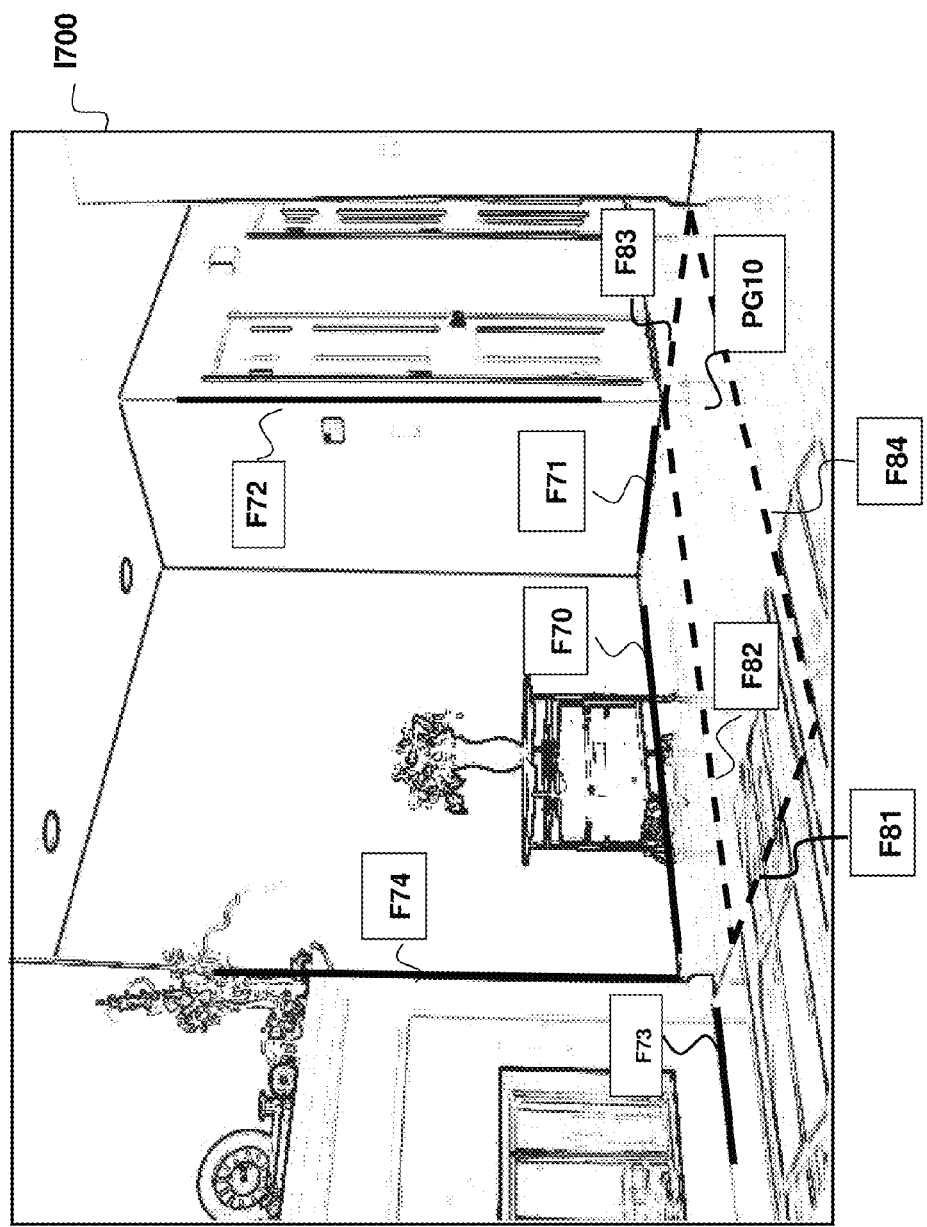
FIG. 35 is an image of a room interior with annotations added for construction of a 3D model of the room based on the process outlined in FIG. 34.
Figure 36:
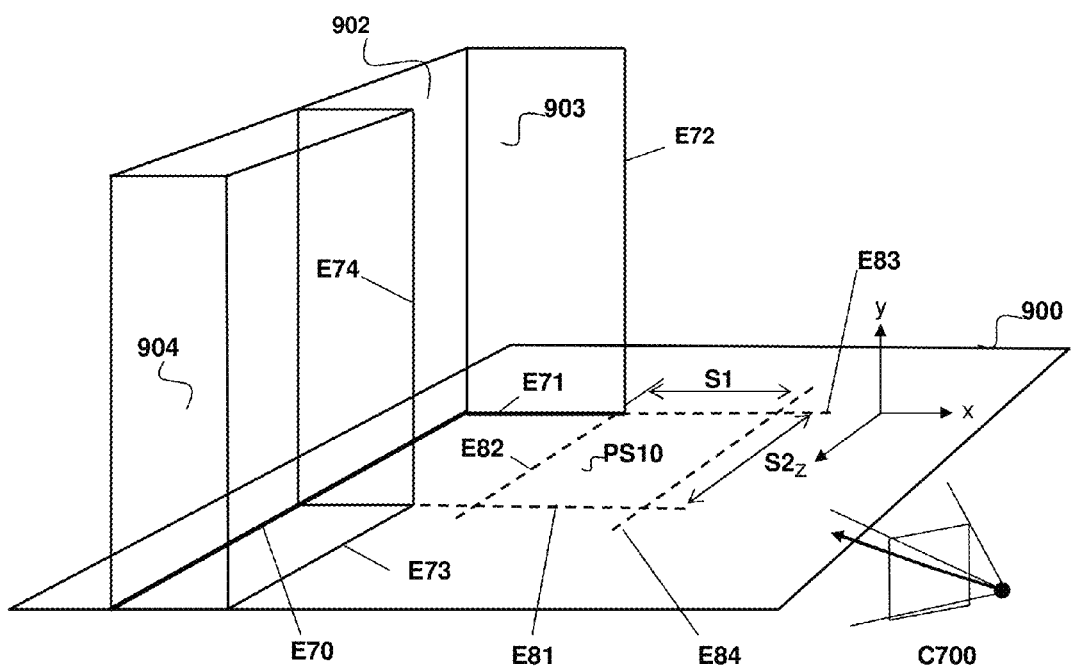
FIG. 36 is a 3D model of the room depicted in FIG. 35.

A process flow diagram of a general 3D scene construction process is shown in FIG. 34. As an example, a 3D geometric construction for the scene depicted in image I700 of FIG. 35 is created. The resulting geometric construction is shown in FIG. 36.

At step ST400 the user imports a scene image through user interface 12. At step ST401 the system determines if the current input image is the first. If it is, then process flow proceeds to step ST402. Otherwise, process flow proceeds to step ST403.

At step ST402 a PC process is initiated for the recovery of an initial scene reference plane and structure and camera system for the current scene image. The present application is pre-programmed to begin construction of a room environment from a root floor plane. This "floor-up" method defaults the horizontal x-z plane of the PC Cartesian coordinate system as the floor reference plane. In general, an application requiring only the recovery of a wall surface might initialize the y-z or x-y plane as the initial reference plane. Alternately, the user may explicitly specify the orientation of the initial reference plane.

By default, a planar rectangular structure is automatically placed by the system to represent the reference plane. The reference structure contains two variable shape parameters set by the system at initialization. The values for these parameters are selected such that the reference plane is large enough to encompass the field-of-view of the current scene camera. Initially, the size parameters are set to arbitrarily large numbers. These values are either explicitly modified by the user or are procedurally modified by the system once the field-of-view of the designated scene camera is recovered. In the latter case, the application determines if the geometry of the structure is clipped by the image window of the camera, when back-projected into the camera. If so, the system enlarges the geometry until this condition is eliminated. This procedure thus ensures that the size of the structure is large enough to span the extent of the view port of the camera.

To recover the floor plane geometry and scene camera parameterization, a PC graphic is placed by the user in the main scene image and a corresponding PC structure is placed in the default floor reference plane. The PC process is executed with modeling engine 13 solving for the variable shape parameters of the PC structure and intrinsic and extrinsic variable parameters for the camera associated with scene image. In the PC process, the user enters known, guessed, or measured values for PC structure shape parameters. A scene takes on true-to-scale proportions if actual measured values are provided.

For the present example, at step ST400 scene image I700 is imported. This is the first input image and process flow proceeds to step ST402. At step ST402, planar rectangular structure 900 from built-in library 18 is inserted by the system in horizontal x-z plane of the coordinate frame. Within structure 900, a planar rectangular structure from library 18 is embedded as PC structure P510. P510 is spatially constrained to be centered at the origin of the coordinate frame. P510 contains two variable shape parameters S1 and S2. Camera C700, corresponding to image I700, is instanced with unsolved default parameters. PC graphic PG10 is placed in scene image I700, as shown in FIG. 35. Through user-interactive input 25 and interface 12, the user interactively shapes PC graphic PG10 in scene image I700 to appear to lie in the depicted floor. FIG. 36 shows the 3-space construction with floor plane structure 900, PC structure PS10, and camera C700 established by the PC process. PC graphic PG10 features F81, F82, F83, and F84 correspond to PC structure PS10 elements E81, E82, E83, and E84, respectively.

Figure 37:
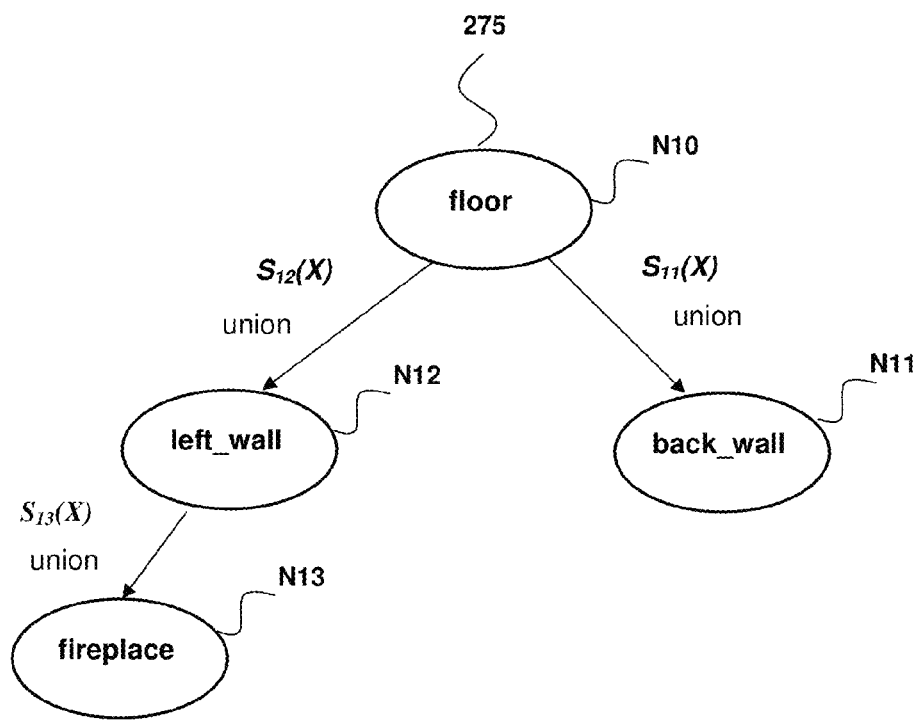
FIG. 37 is a scene graph corresponding to the 3D model of FIG. 36.

The scene construction is calibrated to real world dimensions through PS10 variable shape parameters S1 and S2. In image I700 the user has aligned PG10 such that dimension S1 corresponds to the width of the depicted hallway entrance and S2 corresponds the distance between the wall of the hallway entrance and the end of the fireplace. The user supplies known measured values or guessed values for these parameters. Modeling engine 13 solves for all unknown parameters of the PC construction. Floor structure 900 and scene camera C700 intrinsic and extrinsic parameters are recovered relative to established structure 900 and calibrated to produce the scale dictated by the submitted shape parameters of PC structure 900. FIG. 37 shows the construction scene graph 275 with structure 900 in "floor" node N10.

At step ST403, the system queries as to whether additional structures are to be added. If yes, process flow proceeds to step ST404. Otherwise, process flow proceeds to step ST407.

At step ST404 the next structure of the 3-space construction is selected and placed. Structure selection is explicit by the user or implicit by the application.

In the present example, the user places a wall for the "left" side of the room. Planar rectangular structure 902 instanced from built-in library 18 is selected by the user as a "wall" object. The present application is pre-programmed to place "wall" structures in an orthogonal orientation relative to "floor" structures and to build-up from floor structures. Structure 902 is inserted into scene graph 275 as "left-wall" node N12, a child of floor node N1. The system constrains the minimum y-extent of plane 902 to the surface of floor plane structure 900. As with reference plane 900, structures added to the scene are initialized to default or procedurally generated sizes. Structure 902 has two shape dimensions S3 and S4, corresponding to wall_width and wall_height, respectively. Unless explicitly overridden by the user, the application sets wall_width and wall_height to values large enough that the extents of these structures cover the field-of-view of the 2D image window as viewed by the scene camera C700.

At step ST405, the full position and shape parameterization of an added structure is resolved.

To determine the complete set of placement and dimensions parameters of an added structure, the user annotates features in the scene image that correspond to elements of the new structure. In a typical application, the system will request information from the user specific to the context of the construction underway. In the present example, to solve for the exact positioning of structure 902 relative to structure 900, the system requests the user annotate input image I700 with an edge feature line segment that indicates where the wall and floor meet. In image I700, the user annotates line segment F70. The system knows this edge element belongs to a "floor-wall" juncture, so image feature F70 is automatically corresponded to structure 902 edge element E70. Given that floor plane 900 and camera C700 are known, the F70-E70 correspondence pair is sufficient to fully place structure 902. The system then queries the user to provide image annotations for the left, right and top edges structure 902 to resolve its shape parameters. If none are provided, as is the case here, then default or system procedurally derived dimensions are retained.

At step ST406, modeling engine 13 solves for unknown parameters of the construction. In the present embodiment, the system locks all previously solved for parameters. As an option, the system allows for all or select groups of solved parameters to be re-solved. In the present example, at the insertion of wall plane 902, parameters pertaining to reference plane 900 and camera C700 are locked. The unknown and unconstrained parameters of spatial operator $S_{12}(X)$ in the link between scene graph nodes N10 and N12 are recovered.

Process flow returns to step ST405 and the system queries as to whether more structure are to be added. In present example, two more structures, planar "wall" structure 903 and volumetric "fireplace" box 904, are added. Planar rectangular structure 903 is placed orthogonal to floor structure 900. The position of plane 903 relative to plane 900 is established with user-supplied feature annotation F71 in image I700. Image feature F71 is automatically corresponded to structure 903 edge element E71. The user also annotates image feature edge segment F72 corresponding to structure 903 element E72 to place the right edge of the wall 903. Structure 903 is inserted into scene graph 275 as "back-wall" node N11, a child of floor node N10, with spatial positioning given by spatial operator $S_{11}(X)$. The next structure added to the construction is three-parameter volumetric box structure 904, which becomes "fireplace" node N13 in scene graph 275, a child of left-wall node N12. By default, the application constrains the minimum y-extent of the box structure to floor structure 900 and set "box-height" dimension S5 equal to the height value of wall structure 903. The application also sets the minimum x-extent of structure 904 to the plane of left-wall structure 902, constraining the back of the fireplace to the face of the wall. User placed image feature annotations F73 and F74, corresponding to structure elements E73 and E74, determine the width and depth dimensions of fireplace structure 904. Modeling engine 13 solves for all remaining unconstrained and unsolved parameters, including spatial operator $S_{13}(X)$ in the link between scene graph 275 nodes N12 and N13.

A scene construction contains one or more scene images. The user may elect to annotate an image at any time, in which case process flow proceeds to step ST405. Alternately, at step ST407, the system queries the user as to whether a scene image is to be annotated. If affirmative, process flow proceeds to step ST5. If negative, process flow proceeds to step ST408, where the system queries the user as to whether a scene image is to be added to the construction. At step ST408, if affirmative, process flow proceeds back to entry point step ST400. Alternately, the user may add scene images at any time, at which point process flow proceeds to step ST400. The addition of an image also means the addition of a camera system attached to the image. At step ST400, upon user entry of the image through interface 12, process flow proceeds to step ST403 through step ST402. At step ST408, if negative, process flow proceeds to step ST409.

At step ST409, with all scene structures specified, placed, and unknown structure shape, spatial positioning, and camera parameters resolved, the system performs all geometric operations on the scene construction. The scene graph of the scene construction is traversed and the geometric operations to be performed between structures are extracted from the links of the scene graph and are executed by GE 15. A traversal of FIG. 37 scene graph of 275 shows that all links between structure nodes contain boolean union operator 60. The scene construction of FIG. 36 depicts the scene 3D construction after traversal of the graph and execution of all union operators.

In the present embodiment, there is only one 3D construction frame processed at a time. The existence of multiple image-camera systems means that image feature annotation sets of different images may correspond to common structure elements. The parameter space to be solved is increased by the parameterization of additional cameras.

Intelligent Objects and Intelligent Scenes

Intelligent objects are object constructions whose functional components are structurally modeled and subject to physical simulation through variation of the variable parameters of their composition. An example of an intelligent object is a cabinet construction containing a drawer construction that is parameterized to slide open and close.

Intelligent scenes, analogous to intelligent objects, are scene constructions whose functional components are structurally modeled and subject to physical simulation through variation of the variable parameters of their composition. An example of an intelligent scene is a room interior construction containing a door construction that is parameterized to swing open and close.

Media Integration Methods

The system provides seamless integration, visualization, and simulation amongst the various construction modes and types. This includes the integration of image mosaics, image collages, 3D scene constructions, and 3D object constructions. Constructions are integrated within a single project or as the coalescing of a number of separate projects. The latter scenario is typically implemented using a client-server processing model, whereby construction components are interchanged between a multiplicity of processing nodes and projects.

Figure 39:
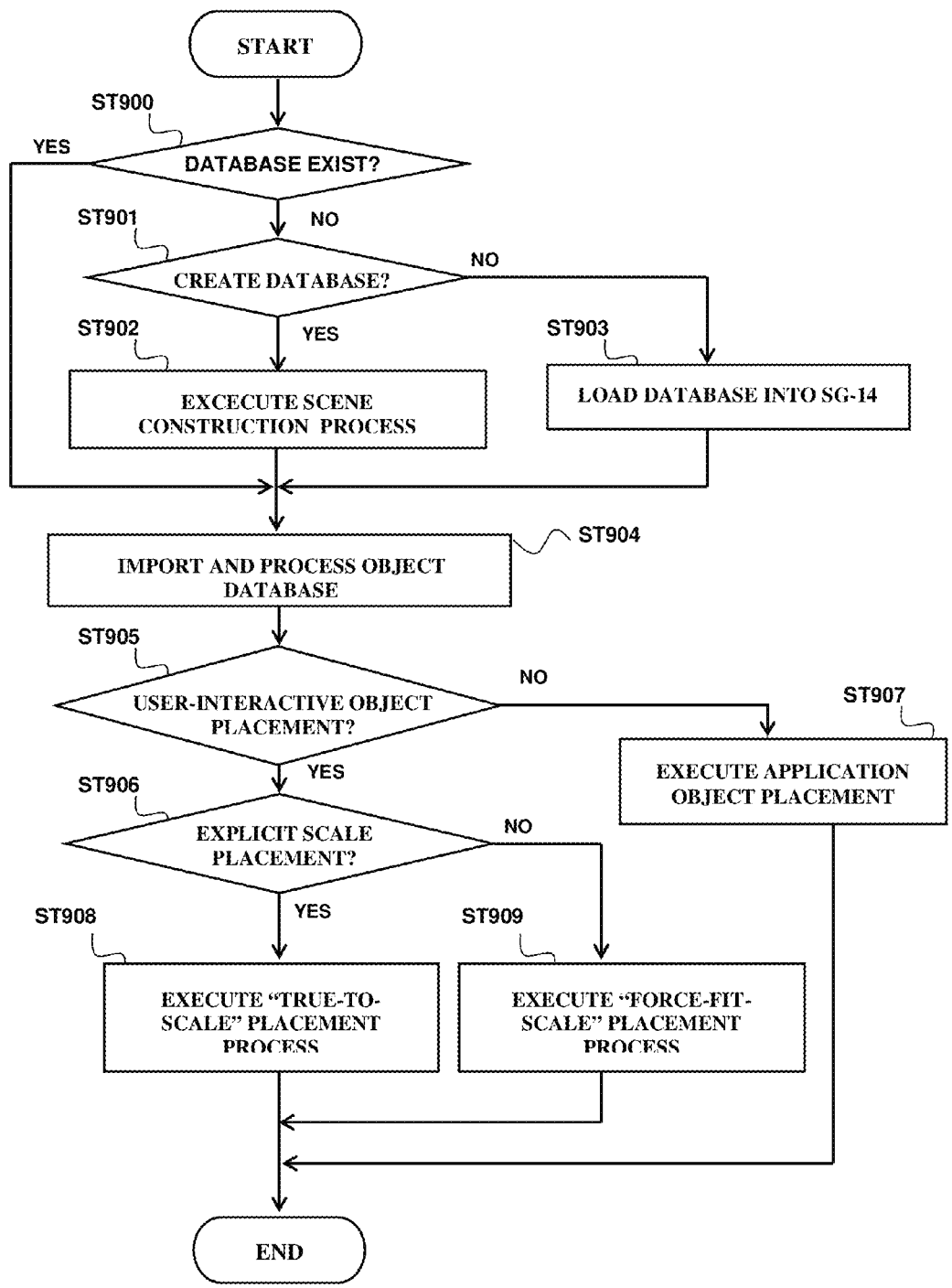
FIG. 39 is a flow diagram showing how to integrate constructed object and scene models with various interaction and scaling options.

Central to media integration processing is the merger and manipulation of construction databases comprised of scene graph and ancillary data structures. FIG. 39 illustrates a media integration and simulation process flow.

At step ST900, the system queries as to whether a valid scene graph database resides in unit 14. If true, process flow proceeds to step ST904 and the import of an insertion database. If not, process flow proceeds to step ST901 where a decision is made whether to construct a new scene database or load on existing saved scene database. If the user elects to create a new database, process flow proceeds to the 3D scene construction process at step ST902. Otherwise, process flow proceeds to step ST903 and the import of a scene database into unit 14.

At step ST904 an object database is imported and preprocessed. Imported databases range from complete projects that include imagery, geometry and camera models, and ancillary data to sparse projects that might include only one of these components. For example, the receiving application might import imagery of an object but not the object geometry; depending on the application configuration, geometry for a construction related to an imported image may be internally sourced from built-in library 18. This reduces the amount of data transferred over network 10.

At step ST905 the method of object placement is selected. The placement of an object is either under the control of the application or the discretion of the user. If initial placement is not under the control of the user, process flow proceeds to step ST907 where objects are assigned an initial position within the 3-space coordinate system procedurally determined by the application program. Otherwise process flow proceeds to step ST906 where the type of user-interactive object placement is selected.

Object placement is established by the user object with a point-and-click mouse interface through user input 25 and interface 12. The anchoring of source and destination constructions is accomplished by selection and correspondence of features of source images and/or elements of source models to features of the destination scene images and/or elements of destination scene models. For the source, the user interactively selects one or more image feature annotations or object elements as anchor reference points. For the destination, the user interactively selects geometric elements of the scene model, existing scene image feature annotations, or places new image feature annotations in one or more destination images. Modeling engine 13 solves for all unknown and unconstrained parameters defining the shape and spatial interrelationships between merged construction components.

Scale factors between source and destination models are established by the method of placement employed and the known and recovered values of the established parameter space. In present embodiment, the system employs two primary methods of placement, true-to-scale and force-fit-scale. True-to-scale processing is based on the use of explicitly known values of source and destination model parameters. Force-fit-scale processing is based on the use of implicit and recovered values of source and destination model parameters governed by placement constraints.

At step ST906 the type of user-interactive placement is selected. If the "explicit scale" processing is selected process flow proceeds to step ST908. Otherwise process flow proceeds to "force-fit scale" processing at step ST909.

At step ST908 true-to-scale object insertion is executed. In this mode, source and destination model dimensions are known or assumed. To merge models of known dimension, the user identifies and equates feature and element anchors in source and destination imagery and geometry. Modeling engine 13 solves for the values of unknown spatial operators and camera models. The absolute scale between merged source and destination models is preserved. A typical use scenario of explicit scale is when a scene of known true dimensions is inserted with an object of known true dimensions.

At step ST909 force-fit scale object insertion is executed. In this mode, a destination region is specified which allows modeling engine 13 to size as well as position the source model into the destination model. The scale factor between merged source and destination constructions is established by the proportions of the destination region. A typical use scenario for this method is the insertion of an object of unknown dimensions into a scene.

As an example of the overall process flow of FIG. 39, the integration of the rug object depicted in image I500 FIG. 28A within scene I200 of FIG. 18A is executed.

Figure 42A:
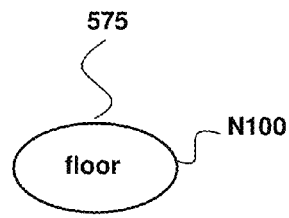
FIG. 42A shows the scene graph of the scene construction for the scene of image of FIG. 40A prior to insertion of the rug object.
Figure 42B:
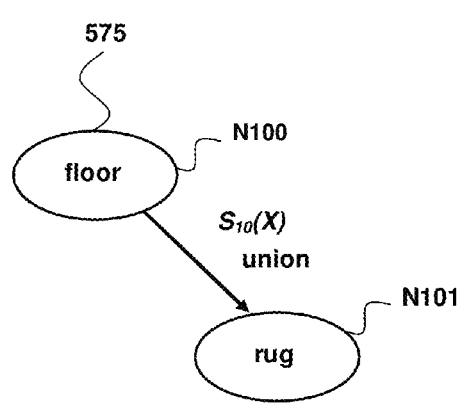
FIG. 42B shows the construction scene graph after the insertion of the rug object.
Figure 42C:
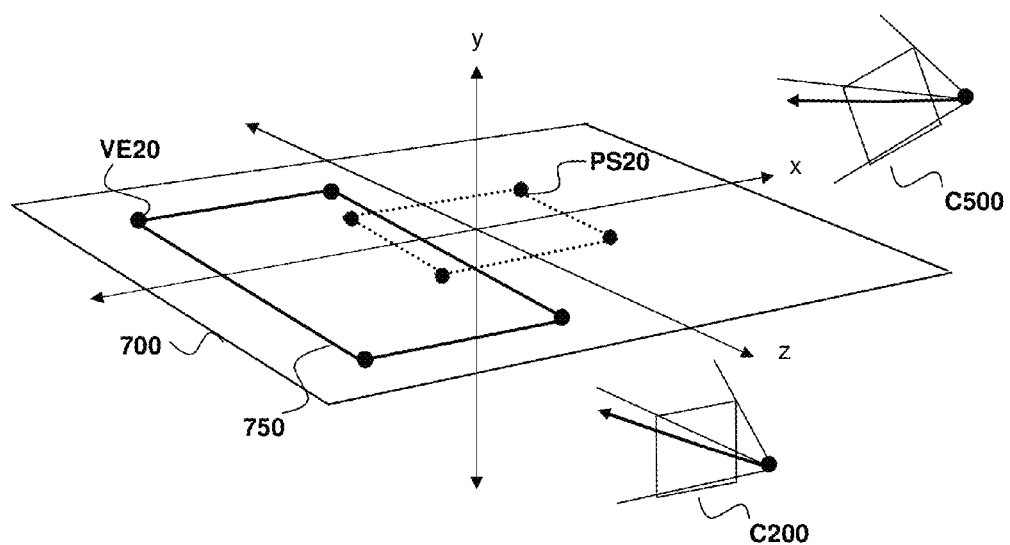
FIG. 42C shows the constructed scene model with the inserted product model.

At step ST900 a new scene database is constructed. Process flow proceeds to step ST902 and the 3D construction process of FIG. 34 is executed. In that process, at step ST402, the PC construction process of FIG. 18A-FIG. 18E is executed. Analogous to FIG. 18E, the 3-space construction of FIG. 42C is produced, with recovered floor plane structure 700, embedded PC structure PG20 and recovered camera model C200 for image I200. Data structures unit 14 contains scene graph 575 with a single node N100 containing floor structure 700, as shown in FIG. 42A. The scene is scaled to true measured dimensions through the PC process, with the PC graphic aligned to known image feature reference points and the actual measured dimensions of those features entered for the corresponding parameters of the PC structure.

At step ST904 an imported object database comprises rug source image I500 of with corresponding PC graphic PG6, and rug shape parameters rug_length and rug_width. The present application example is pre-configured to import "rug" databases. As such the system is configured to internally supply planar rectangular structures from built-in library 18 for "rug" object constructions. With the import of image I500, camera model C500 is established. In the present example, no camera model parameters are imported with image I500; camera C500 is internally initialized with no known model parameters assumed. The application automatically assigns planar rectangular structure 750 from built-in library 18 to incoming PC graphic PG6, establishing the geometric model of the rug object. Vertex element VE20 of object structure 750 is identified as the correspondence to PG6 vertex feature VF5. A direct correspondence between all PG6 edge and vertex features and structure 750 edge and vertex elements is established.

At step ST905, the user elects to interactively place the rug object. At step ST906 the user elects to place the rug using its imported true dimensions rug_length and rug_width. At step ST908 the user places cross-hair image features 933 in scene image I200 to establish the destination anchor point for the rug object on the depicted floor, as shown in image I800 of FIG. 40A. For the source anchor point, the user selects PC graphic PG6 feature point VF5 directly on image I500 of FIG. 28, or vertex VE20 directly on object geometry 750. The application also texture maps image I500 onto geometry 750, allowing the user to select VF5 and VE20 concurrently and directly from a 3D texture-mapped model presentation. The selected source and destination anchor points are then equated, completing the source-to-destination correspondence and the executing the insertion is executed. Modeling engine 13 solves for all unknown camera and spatial operator parameters to place rug structure. The imported rug shape parameters rug_length and rug_width explicitly specify the true size of the rug object within the scene of known dimensions.

FIG. 42C shows rug object structure 750 inserted and constrained to floor structure 700. Two cameras are shown. Camera C200 for scene image I200 and camera C500 for rug image I500. In FIG. 42B, node N101 containing structure 750 is inserted into scene graph 575 as a child of floor node N100, reflecting the insertion of the rug object into the scene. The spatial relationship between structures N100 and N101 is given by the spatial operator $S_{10}(X)$ in the link between the nodes. The values for the variable parameters of $S_{10}(X)$ are established by explicit geometric constraints and computation of modeling engine 13. In the present example, they translation component of $S_{10}(X)$ is set to zero, constraining structure 750 to lie in the plane of parent structure 700. The x and z translation and y rotation components of $S_{10}(X)$ are recovered by modeling engine 13 to place the rug at anchor point 933, as shown in image I801 of FIG. 40B.

An alternate example demonstrating the force-fit-scale processing of step ST909 is disclosed. The method combines destination and source model creation and integration through a shared PC process. Combined is the PC process for finding a camera model and reference plane in a 3-space construction for an input scene image and a "force-fit" procedure for merging additional 3-space constructions. The user interface procedure is similar to that of the disclosed 2D image collage process.

The process is exemplified with the previous example of integration of the "rug" object of FIG. 28A within scene I200 of FIG. 18A. At step ST900 process proceeds to step ST901. At step 901, the user elects to create new geometry and process flow proceeds to step ST902.

Figure 43:
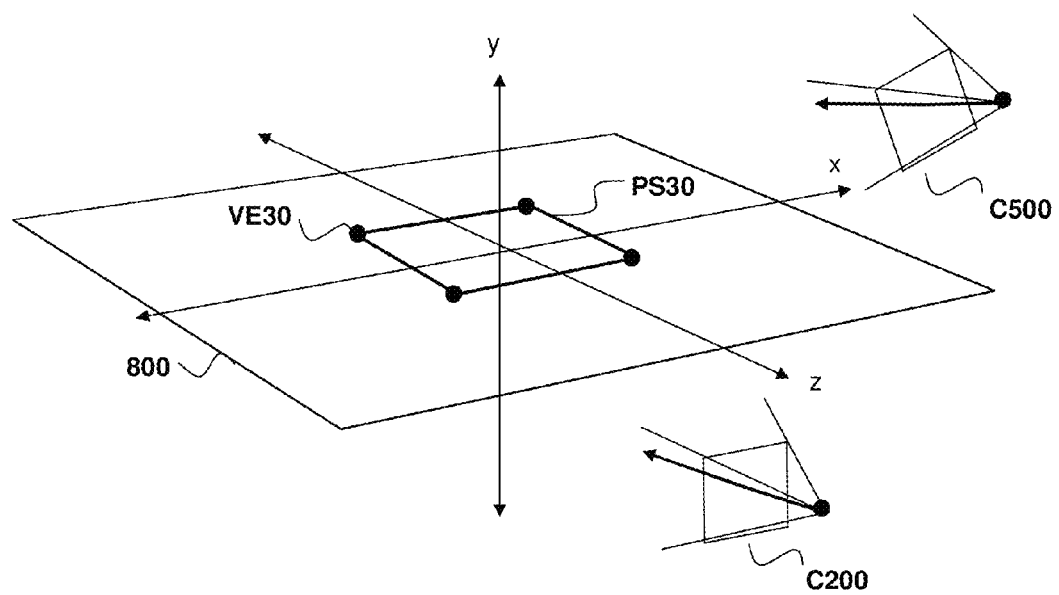
FIG. 43 shows the 3-space construction for a "force-fit" model integration procedure.

At step ST902 a destination reference plane is selected by the user and a PC process is initiated for the recovery of the initial destination scene reference plane, structure, and camera system relative to the current scene image. The application could be more specifically tailored-such as a "place rugs on floors" or a "place pictures on walls" application, in which case the destination orientation is a built-in attribute of the application. A PC graphic is placed in the scene image and shaped by the user to define the destination region into which an object to be inserted. A corresponding PC structure is placed in the selected reference plane and structure. FIG. 43 shows the 3-space construction.

At step ST902, the user explicitly indicates that the destination of an object is a horizontal "floor" plane and the application defaults the horizontal x-z plane of the PC Cartesian coordinate system defaults as the floor reference plane. Planar rectangular structure 800 from library 18 is inserted by the system in horizontal x-z plane of the coordinate frame. If, for example, the picture product of FIG. 28B image I502 is to be placed within a vertical wall structure in the same scene, the user would explicitly specify a vertical "wall" plane and the application would default the horizontal y-z plane of the PC Cartesian coordinate system defaults as the wall reference plane. Scene image I200 of FIG. 18A is annotated with PC graphic PG5 to identify the destination region in the scene image, as shown in image I400 of FIG. 27. Feature vertex VF1 of PG5 is marked first and the remaining PG5 vertices are marked in a clockwise direction. Within structure 800 planar rectangular PC structure PS30, corresponding to PG5, is placed centered about the coordinate system origin. Camera C200 of destination scene image I200 is initialized with unsolved default parameters. Through user-interactive input 25 and interface 12, the user interactively shapes PC graphic PG5 in scene image I200 such that the PC graphic region represent the outline of the region to be occupied by a source object or components of a source object, relative to the reference structure, and as viewed in perspective.

At step ST904 an object database is imported and pre-processed. In the present example, the imported object database consists of rug product image I500 of FIG. 28A and corresponding PC graphic PG6. Values for shape parameters rug_length and rug_width may or may not be imported. No camera model parameters are imported with image I500. The application example is pre-configured to import "rug" databases. As such, the system is configured to internally supply planar rectangular structures from built-in library 18 for "rug" object constructions. In "force-fit" mode, the application defaults to using the current PC structure geometry. In the present example, this is PS30. The application automatically assigns planar rectangular structure PS30 to incoming PC graphic PG6, establishing the geometric model of the rug object. Vertex element VE30 of object structure PS30 is identified as the correspondence to PG6 vertex feature VF5. A direct correspondence between all PG6 edge and vertex features and structure PS30 edge and vertex elements is established.

At step ST905 the application is programmed to proceed to step ST906 and then to step ST900. At step ST909 "force-fit" processing is executed. The user corresponds one or more image features of source PC graphic PG6 to one or more features of destination PC graphic PG5 or to one or more geometric elements of PC structure PS30. In the present example, the user clicks on PG6 vertex feature VF5 and then on PG5 vertex feature VF1 to fully establish the source region to destination region correspondence. Modeling engine 13 solves for the variable shape parameters of the PC structure PS30 constrained within plane 700 and intrinsic and extrinsic variable parameters for cameras C200 and C500 such that rug source region PG6 is fits into destination region PG5.

The relative scale between the rug and the scene is set by the annotation of the rug outline in the scene. The overall scale of the scene and inserted object is determined by the constrained or recovered values of PS30 variable shape parameters. This scale may arbitrary, if arbitrary default values are established for the parameters. This scale may also be based on known imported dimensions of either the scene or the rug. In the latter case, in the event the known true dimensions corresponding to the annotation region in the destination image coincide with the known true dimensions of the source region, the force-fit scale becomes a true-to-fit scale.

Interactive Media Simulation Methods

Interactive visual and physical based simulation operations can be provided between all modes and types of scene and object constructions. In general, the system can incorporate visual simulation features and techniques available to a 3D computer graphics system.

Simulation is controlled by the manipulation of variable parameters of construction through user-interactive input 25 through interface 12 or application programming. For example, the variable parameters of spatial operators S(X) linking geometric structures are static or dynamic. When static, spatial operators specify rigid spatial positioning between components of an object or scene. When dynamic, spatial operators enable and specify the simulation and animation of functional components of objects and scenes. Another example is the variation of structure shape parameters. This enables simulation features such as a review of various sizes and shapes of an object within a scene construction.

Figure 38A:
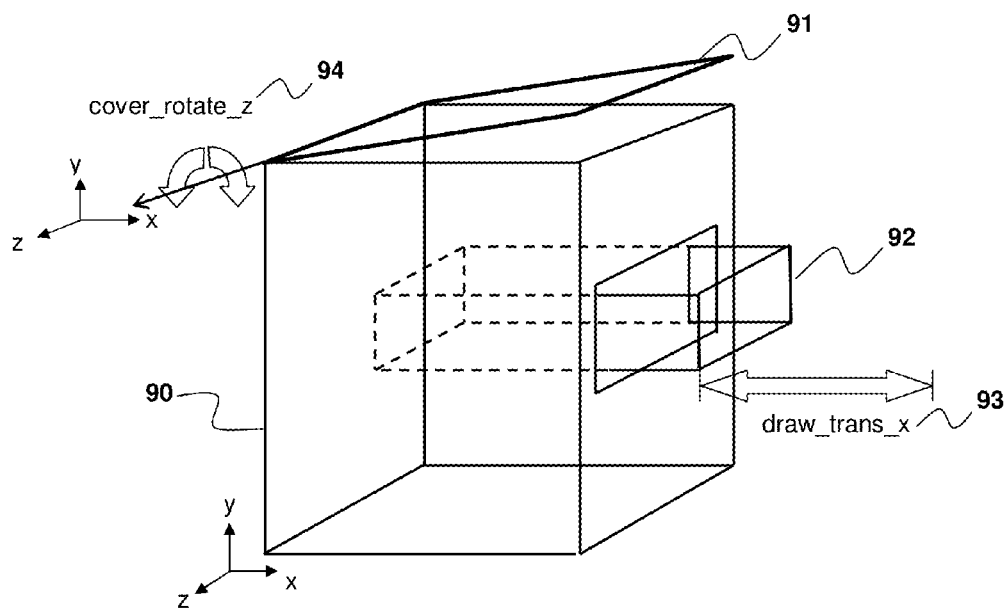
FIG. 38A is an example of an intelligent object.

FIG. 38A shows an example intelligent object assembly constructed by the system. The assembly contains dynamic spatial operators. The model assembly consists of main box structure 90, box cover structure 91, and box drawer structure 92. The object assembly is encoded as scene graph 300 with structure 90 in node N15, structure 91 in node N16, and structure 92 in node N17. Spatial operator $S_6(X)$ between nodes N15 and N16 specifies the spatial relationship between the box and its cover. Spatial operator $S_7(X)$ between nodes N15 and N17 specifies the spatial relationship between the box and its drawer. Composed within operator $S_6(X)$ is cover_rotate_z parameter 94 that specifies rotation of the cover structure about the z-axis linking the cover and the box. Composed within operator $S_7(X)$ is draw_trans_x parameter 93 that specifies translation of the drawer structure along the x-axis relative to the drawer coordinate frame. Physical-based modeling attributes are also attached to the spatial operators. Variable parameters cover_rotate_z 94 and draw_trans_x 93 are manipulated through user-interactive input 25 and interface 12 and application programming to simulate the functionality of these components of the model assembly.

Interactive simulation functions of the system include the spatial repositioning of scene models and object models relative to each other. As shown in FIG. 41A and FIG. 41B, the rug object of FIG. 28A image I500 is interactively repositioned within the floor plane of the scene to simulate various placement scenarios. The scene is represented by scene graph 575 of FIG. 42B. Repositioning of the rug object is accomplished by interactive variation of the variable parameters of $S_{10}(X)$ while retaining its fixed constrained parameters. FIG. 40B image I801 shows the rug within the scene at its user established anchor point 933. FIG. 41A and FIG. 41B images I802 and I803 are two display frames rendered from rendering engine 17 showing the rug object displaced along the floor from its initial anchor point 933.

Client-Server System Model

Disclosed is a client-server processing and communication model suitable for deployment of the MPE and methods over a wide range of network-based applications. The MPE and methods are not limited to such an implementation.

Figure 49:
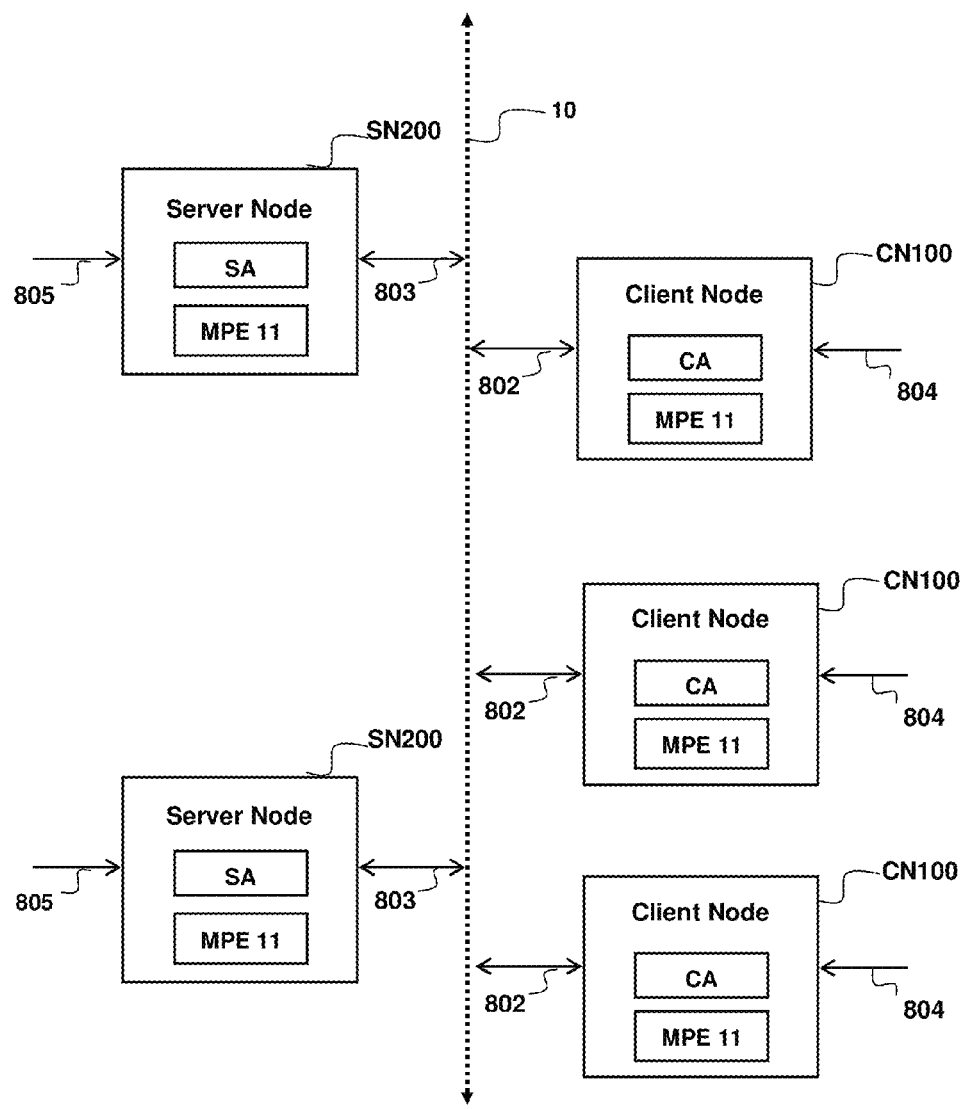
FIG. 49 is a diagram of multiple instances of the media processing engine operating over a network in client-server configuration.

As shown in FIG. 49, one or more client processing nodes and one or more server processing nodes are connected to a computer network, such as the Internet. A client node CN100 is a computer system or other network appliance connected to a computer network. It is capable of communicating with one or more server nodes and other client nodes on the same network. A server node SN200 is a computer system or network appliance connected to a computer network. It is capable of communicating with one or more client nodes and other server nodes on the same network. Client nodes and server nodes embed MPE 11.

Client node CN100 receives and sends and digital information 802 from and to network 10.

Digital information 802 received from network 10 is comprised of 2D images 21, 3D geometric models 20, and ancillary data 22. Digital imagery 21 is downloaded to a client node from a system server node, another system client node, or any other node on network 10. Geometric models 20 are parametric and non-parametric, and downloaded from a server node SN200 or other client node CN100 and generated by 11 at those nodes. Parametric models generated by 11 are structure assemblages interchangeable between client and server nodes. Parametric and non-parametric models generated by other means, such as other modeling software programs or hardware scanning devices, may also be downloaded from any network node at input 20. Data 802 sent to network 10 is comprised of user 2D images 24 and user 3D parametric models 23. Digital input 804 is digital information a client node receives from a user. This input includes user interactive input 25, user digital images 24 imported from sources such as digital cameras and analog-to-digital scanners, and 3D geometric models 23 imported from external medium such as CDROM. It also includes system project databases and ancillary data 28.

A server node SN200 receives and sends digital information 803 from and to network 10. Digital information 803 received from network 10 is comprised of 2D images 21, 3D geometric models 20, and ancillary data 22. Digital imagery 21 is downloaded to a server node from a system client node, another system server node, or any other node on network 10. Geometric models 20 are parametric and non-parametric, and downloaded from a server node or other client node and generated by 11 at those nodes. Parametric and non-parametric models generated by other means, such as other modeling software programs or hardware scanning devices, may also be downloaded from any network node at input 20. Digital information 803 sent to network 10 is comprised of user 2D images 24, and user 3D parametric models 23. A server node receives digital information 805 from a user. This includes user interactive input 25, digital images 24 imported from sources such as digital cameras and analog-to-digital scanners and 3D geometric models 23 imported from external medium such as CDROM. It also includes system project databases and ancillary data 28.

A client node executes client-side application software CA based on the MPE and processing methods disclosed. In a typical configuration, a client node downloads CA from a server node on network 10 or from other data storage and delivery medium such as CDROM. The client-side application program CA embeds some or all of media processing engine 11 capabilities and features. CA is capable of generating, composing, and visually rendering 2D image mosaics, 2D image collages, and 3D object models, 3D scene models from 2D digital images based on the disclosed system and methods. CA is capable of dynamic visual and physical-based simulation of 3D object and scene models generated within the node, received from the network or other sources, and compositions of node generated and node imported content.

A server node executes server-side application software SA based on the MPE and processing methods disclosed. The server application program SA embeds some or all of the media processing engine 11 capabilities and features. SA is capable of generating, inter-composing, and visually rendering 2D image mosaics, 2D image collages, 3D object models, 3D scene models from 2D digital images. SA is capable of dynamic visual and physical-based simulation of 3D object and scene models generated within the node, received from the network or other sources, and compositions of node generated and node imported content.

In a typical configuration, server nodes are responsible for disseminating client-side application software CA components of 11 executed by client nodes to client nodes. The components and type of processing carried out by individual client or server nodes and the data transactions between client and server nodes is a function of the target application.

E-Commerce Merchandise Visualization and Information System

A product visualization, simulation, and information communication system will now be described. Based on the media processing engine (MPE), methods, and client-server processing and communication model, the disclosed merchandising system connects product consumers, (e.g. shoppers, buyers) with product purveyors (e.g. manufacturers, retailers).

Users can visualize actual product application environments, into which purveyor product representations are seamlessly integrated, visualized, and simulated. The system also allows shoppers to generate 2D image compositions and 3D constructions of products directly from 2D imagery in the event that such representations are not already available.

The system may operate as a stand-alone application or be integrated as a component in an existing online e-commerce system.

Figure 50:
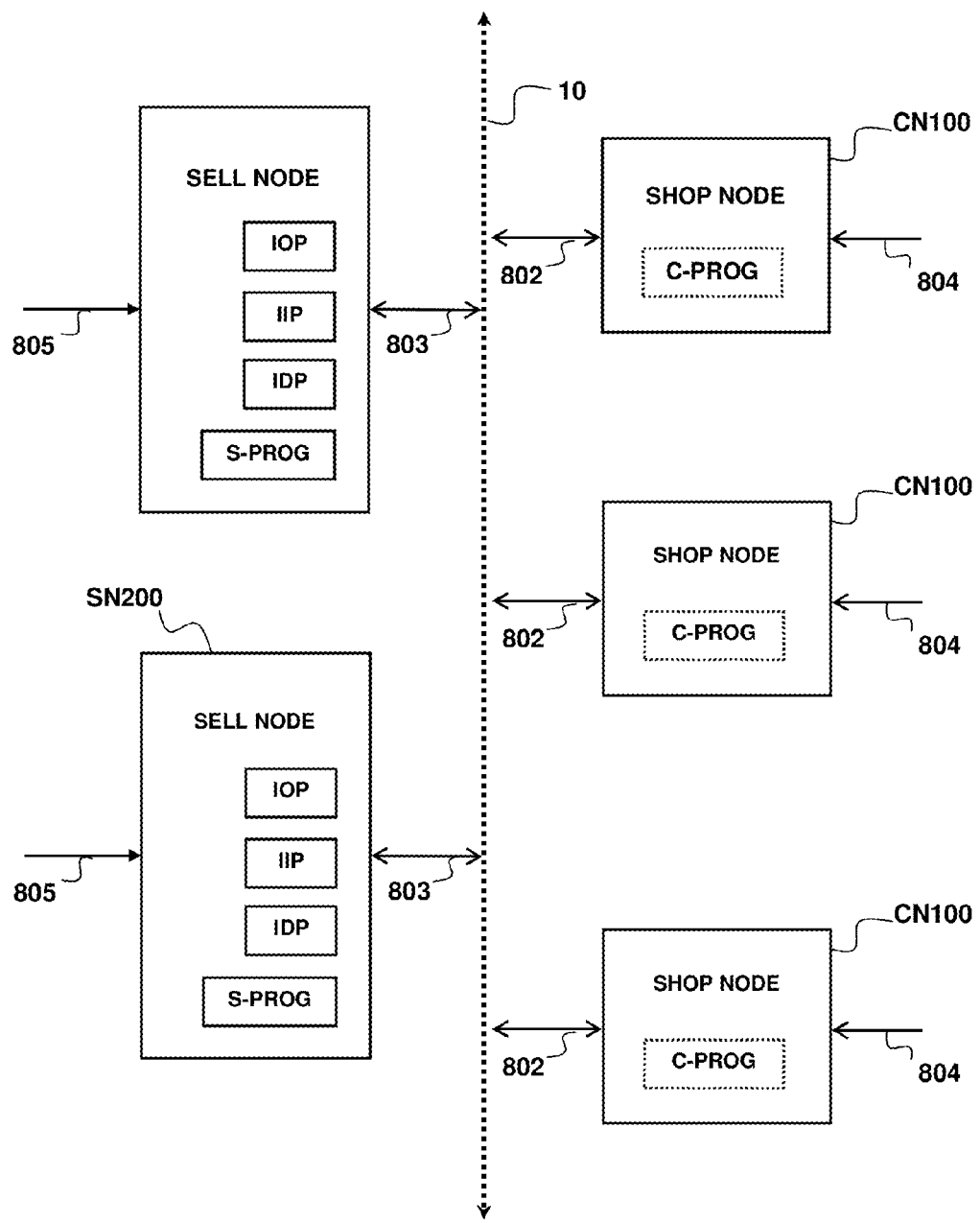
FIG. 50 is a diagram of multiple instances of the media processing engine operating over a network in client-server configuration and operating as an electronic commerce merchandising system.

The described embodiment of the e-commerce merchandising system is shown in FIG. 50. In a client-server configuration over network 10, product shoppers are associated with client nodes CN100 and product purveyors are associated with server nodes SN200. Client and server processing nodes may also operate in stand-alone mode, removed from network 10.

In the context of a merchandising system, client nodes CN100 are called SHOP nodes and product purveyor nodes SN200 are called SELL nodes. As an example deployment scenario, SELL nodes are the e-commerce web sites of product manufacturers, retailers, and the likes, and SHOP nodes are consumers and the like with an online personal computer or other web-browsing enabled device.

A SELL node functions as a content creation station, a content server, and a program server. A SELL node implements the full range of media processing engine 11 digital content creation, visualization, and dissemination capabilities. In the current client-server embodiment, SELL nodes distribute (serve) merchant-tailored processing engine 11 program components S-PROG to SHOP nodes, enabling SHOP nodes with processing engine 11 programs C-PROG. Alternately, SHOP nodes import their application software C-PROG from other mediums, such as CDROM.

In a collaborative content-creation workgroup configuration over network 10, SELL nodes share their content and project databases 20, 21, 22, and 27 with other SELL nodes.

SELL nodes create, package, and distribute 2D and 3D digital representations and ancillary information of the products and services associated with the purveyor. Such media includes all combinations of 2D product images, 3D product models, form and function parametric data, and other ancillary product information. Ancillary information includes media typically associated with product catalogs and brochures as well as video and audio presentations. Three principal media packages created and served from SELL nodes to client SHOP nodes are Intelligent Image Packages IIP, Intelligent Object Packages IOP, and Intelligent Ancillary Data packages IDP. Both SELL and SHOP nodes may also distribute all forms of data individually and not as a package.

Intelligent image packages IIP are 2D digital images or image compositions packaged and served with parametric data that enable a full range of 2D and 3D visualization and simulation capabilities at both SELL and SHOP nodes. For example, a product purveyor offers the rug product of image I500 of FIG. 28A in several choices of patterns and size. The purveyor SELL node can serve an intelligent image package IIP containing one or more images of the rug depicting color and pattern options along with parametric shape and color option data.

Figure 38B:
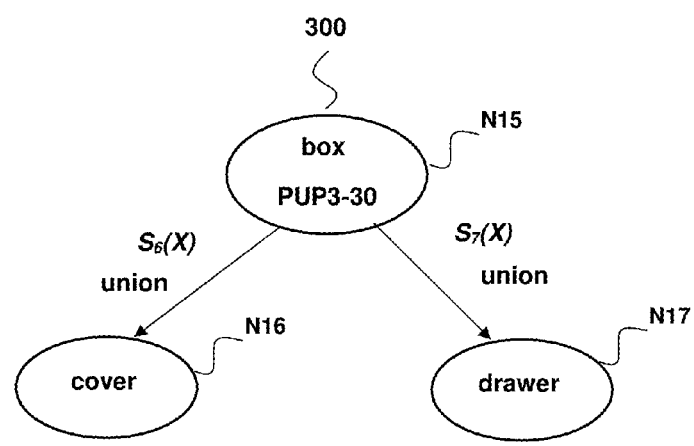
FIG. 38B shows the scene graph of an intelligent object depicted in FIG. 38A.
Figure 44A:
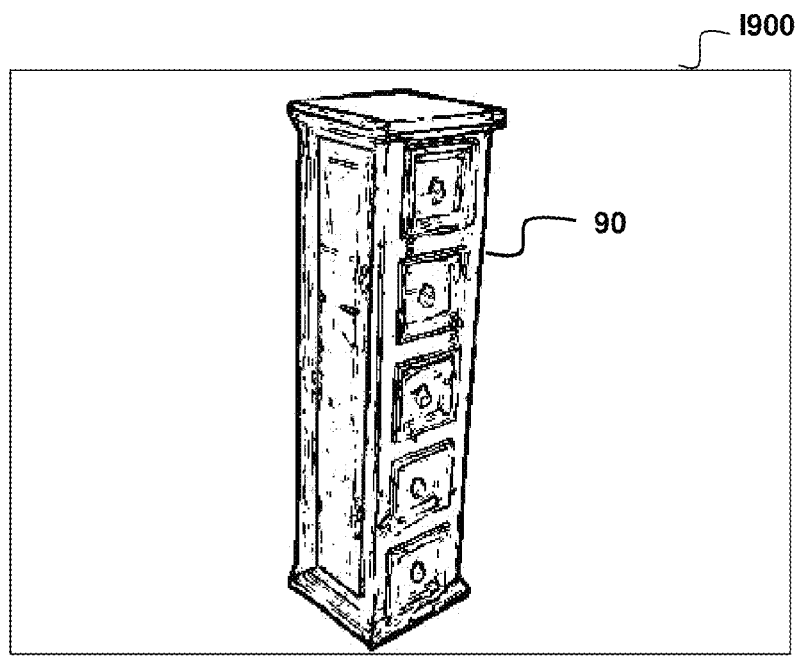
FIG. 44A is an image of a brown wooden CD cabinet.

Intelligent Object Packages IOP are packages of data associated with 3D object and scene constructions, including scene graphs, geometric structures, texture maps, camera models, and parametric data controlling construction form and function. IOPs enable a full range of 3D visualization and simulation capabilities at both SELL and SHOP nodes. As an example, a SELL node offers cabinet product 90 depicted in image I900 of FIG. 44A. An intelligent object construction of cabinet 90 is shown in FIG. 38B, with a single parametric drawer component 92 and cover component 91 modeled. As an intelligent object package, cabinet 90 is served by the SELL node with its scene graph 300, imagery I900, geometric structures, camera models, shape parameters, and function parameters (draw_trans_x, cover_rotate_z).

Intelligent Ancillary Data Packages IDP are portfolios of ancillary information related to products and services distributed from SELL nodes. Ancillary information includes textual, audio, or video descriptions of products and services. An IDP is packaged and served with IOPs and IIPs or separately.

IDP information is presented by the system through graphical display mechanisms. The primary IDP displays are 2D image overlay "pop-up" mechanism PUP2 and 3-space embedded 3D graphical display pop-up mechanism PUP3. A PUP2 is a 2D image overlay similar to 2D graphical overlay and dialog mechanisms common to windows-based applications. A PUP3 is a 3D a texture-mapped geometric "billboard" object that is embedded and rendered as an additional construction component of a 3D scene. PUP2 and PUP3 mechanisms are attached to scene graph unit 14 nodes of 2D image compositions and 3D object and scene constructions. SELL nodes generate, store, and disseminate PUP2 and PUP3 displays.

Figure 29A:
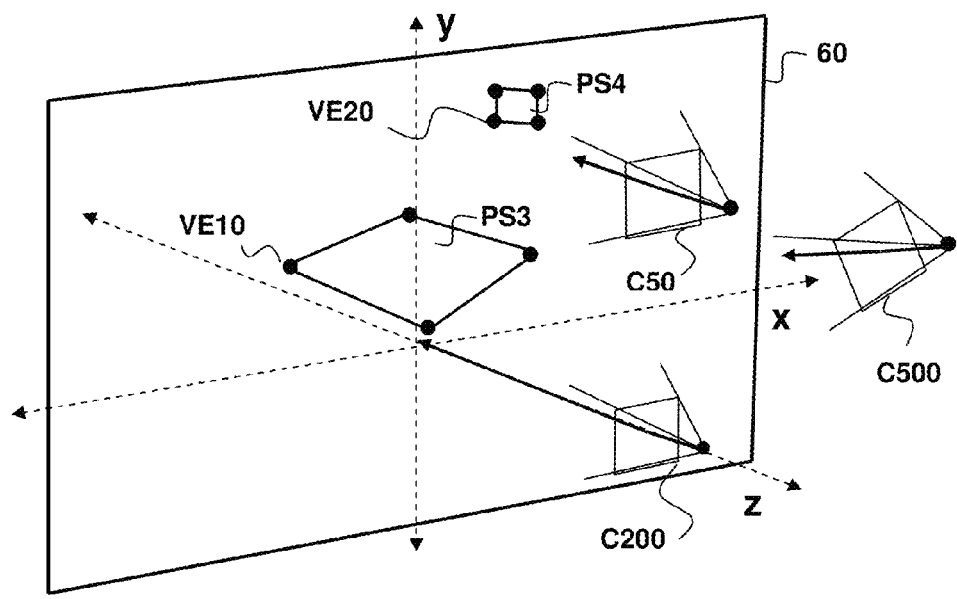
FIG. 29A shows the 3-space construction corresponding to the collage processing of the image of FIG. 27.
Figure 29B:
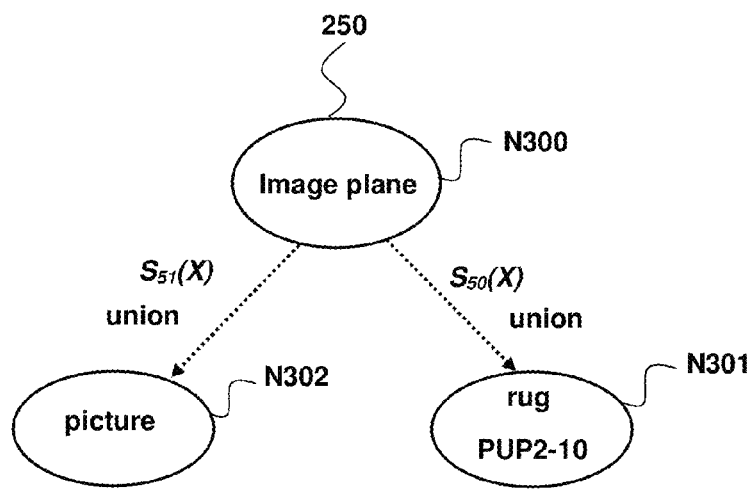
FIG. 29B is the scene graph corresponding to the collage construction of FIG. 29B.
Figure 30:
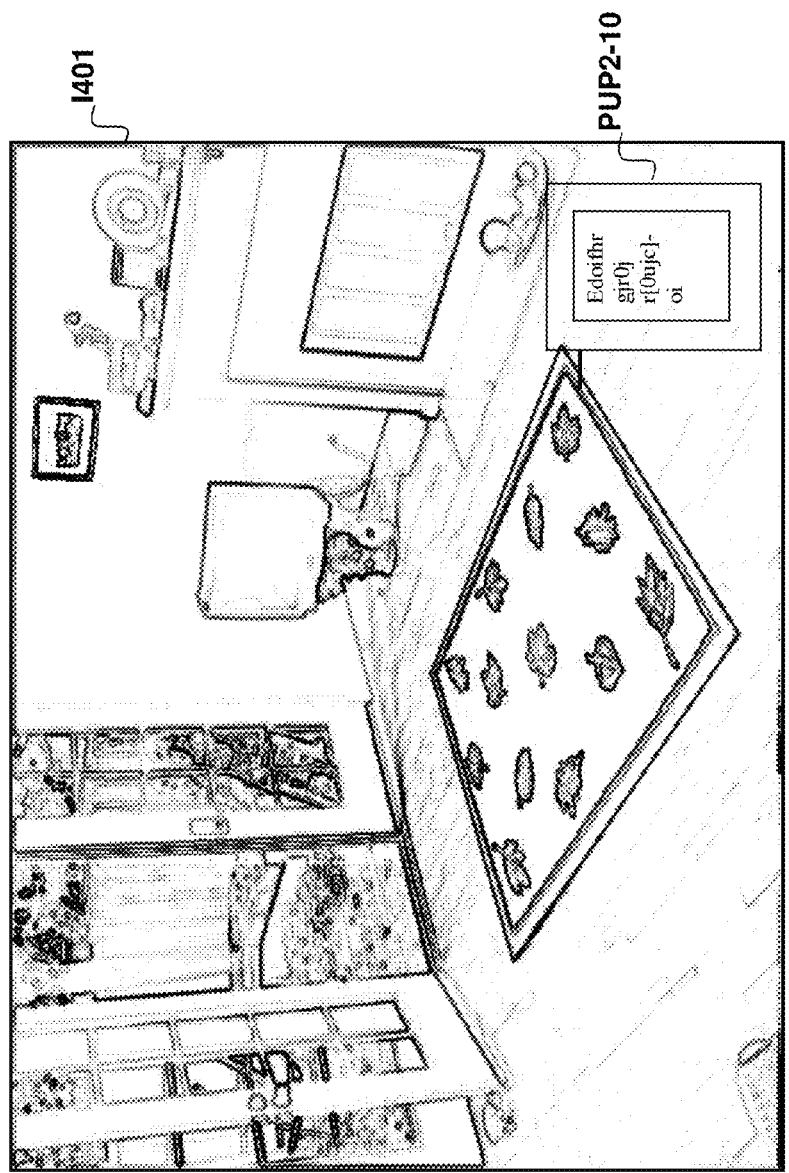
FIG. 30 is an image that is the collage composition of the image of FIG. 27 with the product images of FIG. 28A and FIG. 28B.
Figure 47:
FIG. 47 shows a 3D graphical product information display that "pops-up" provide information about a product.
Figure 48:
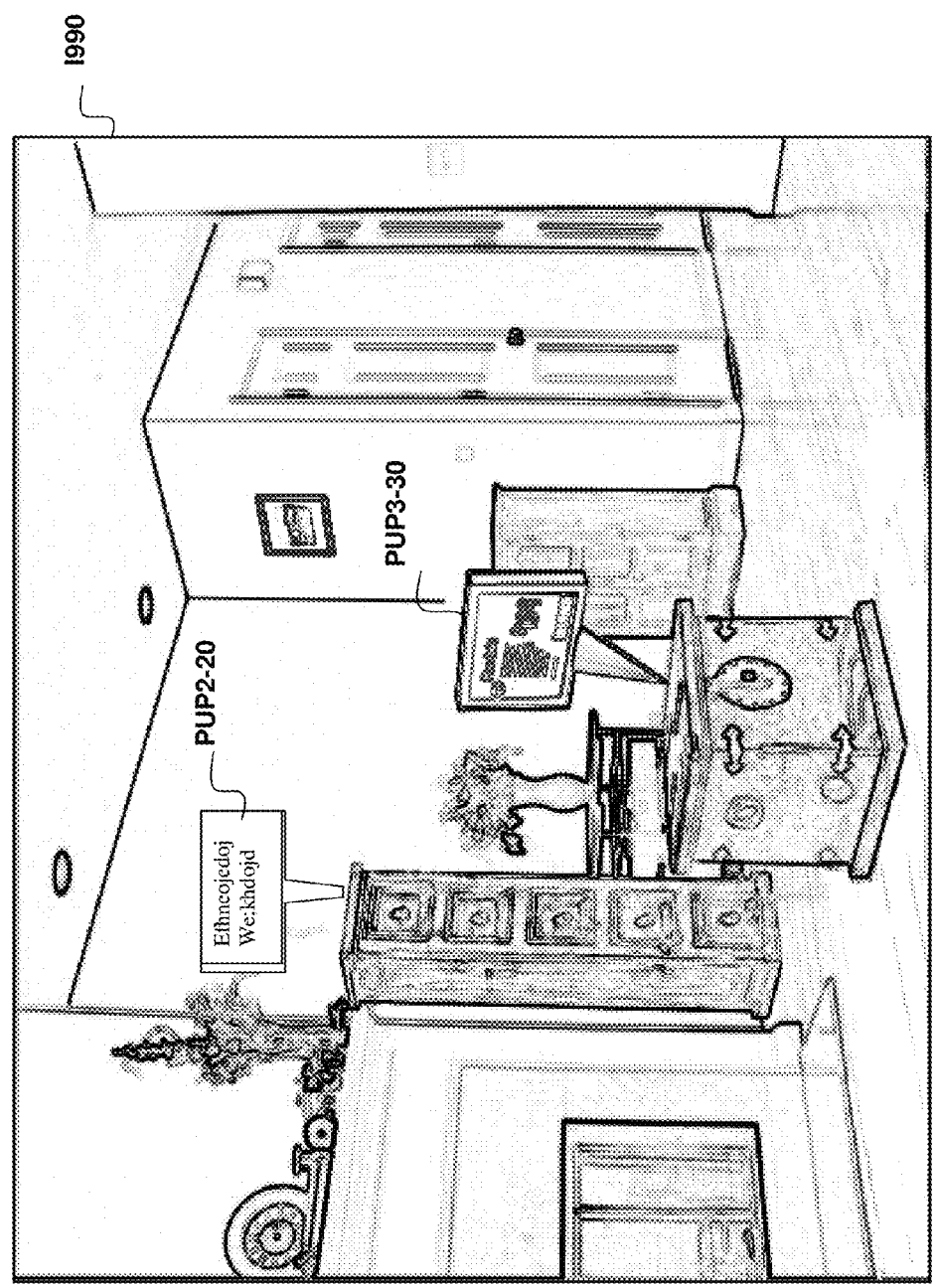
FIG. 48 shows the room scene of FIG. 46 with both 2D and 3D product information displays active.

FIG. 30 shows collage composition image I401 with PUP2 graphic overlay PUP2-10 attached to the rug object. FIG. 29B shows corresponding collage construction scene graph 250 with PUP2-10 attached to rug node N301. FIG. 47 shows an example PUP3 graphical pop-up display PUP3-30. The system allows the SELL node to create or import 3D geometry to represent a PUP3. The system is not limited to any particular PUP3 display geometry. For the present example PUP3-30, product information is displayed on one face of the display geometry. FIG. 48 shows scene image I990 with 2D overlay display PUP2-20 attached to wooden CD cabinet product 90 and 3D pop-up display PUP3-30 attached to wooden storage box product 91. FIG. 38B shows PUP3-30 attached to node N15 of scene graph 300.

PUP2 and PUP3 mechanisms also serve as launch points for associated IDP media. Through user interactive input 804, the shopper launches video and audio presentations about the product and the merchant by clicking on a PUP object or menus displayed on a PUP object.

PUP2 and PUP3 mechanisms also serve as portals for online product purchasing and customer tracking transaction systems. When the PUP mechanism connects to a SELL node's purchasing and customer tracking systems, PUP2 and PUP3 displays become the graphical user interface to those systems.

Rendering engine 17 renders PUP displays in a scene graph when they are activated. PUP displays may be re-positioned by the user or automatically by the application program. As a 2D image overlay, a PUP2 may move with the object it is attached to as a translation in the plane of the image. As a full 3D object, a PUP3 may move to any orientation within the 3-space coordinate system of the construction. In the present embodiment, a PUP3 remains attached to a selected reference point of its associated 3D object and also rotates as a billboard to maintain a consistent orientation relative to the current viewer position. This implementation is analogous to dynamic 3D billboards implemented in 3D graphics visual simulation systems.

In the present embodiment, SHOP nodes download media processing engine 11 "client-side" processing components from SELL server nodes. Some or all of media processing engine 11 functional components are downloaded over 10. The selection of components C-PROG downloaded depends on the application environment and is configurable by the system. SHOP nodes may also import C-PROG processing components from other digital data mediums such as CDROM.

SHOP nodes create and integrate 2D and 3D digital environment and product representations and information. Central to their role in a merchandising environment is enabling a shopper to acquire and reconstruct their application environment and readily integrate and simulate product constructions from SELL nodes. In addition, a SHOP node may also generate product 3D constructions directly from 2D imagery. When such information is either not available from a product purveyor or is not applicable to the circumstances. A shopper can acquire documented and undocumented digital imagery from sources such as the Internet, digital cameras, and scanners, and transform them into 3D representations. This extremely flexible program and processing distribution model allows processing and data distribution to be efficiently tailored by the requirements of the commerce environment.

SHOP nodes download product-specific 2D digital images 21, scene graphs and 3D texture-mapped models 20, and project databases and ancillary digital data 22 from SELL nodes or optionally from other SHOP nodes over network 10. Media downloaded as individual components or as IOP, IIP, and IDP packages.

SHOP nodes import user 2D digital images 24 and 3D models 23 from directly from digital acquisition devices, such as digital cameras and scanners. SHOP nodes may also download user-specific digital imagery 24 and 3D models 23 from network 10 or other medium such as CDROM. For example, a user might photograph a scene or product with an analog camera and employ a processing service that develops and digitizes film and delivers the digital images to the user via the Internet or CDROM.

SHOP nodes employ the disclosed media integration methods to integrate user generated constructions with downloaded or imported SELL node constructions. SHOP nodes employ the simulation methods enabling SHOP nodes to simulate form and function of SELL node products within their environments. In addition to spatial positioning, simulation includes exploration of product size, fit, color, and texture options as well as product functionality (e.g. open-close doors, turn on-off lights, test switches).

Several usage scenarios for the disclosed merchandising system are presented.

EXAMPLE 1

A home furnishings merchant displays items for sale at its e-commerce web site on Internet 10. The site is enabled with the merchandising system as a SELL server node SN200. Displayed at the merchant site is the rug item depicted as image I500 of FIG. 28A.

An online Internet shopper visits the merchant SELL site with interest in purchasing the rug. From the merchant site the shopper selects an option to visualize the rug in her home. This selection launches the download of a merchant-tailored client-side version of media processing engine 11 software S-PROG from the merchant SELL site to the shopper computer system on network 10. This transaction enables the shopper as a SHOP node with media processing engine 11 software components C-PROG.

The shopper seeks to visualize rug I500 in her living room depicted in FIG. 18A image I200. The shopper acquires image I200 with a digital camera and downloads it as user data 24. For a wider field-of-view of the living room scene, the shopper takes multiple snapshots and downloads them as user data 24. In the latter case, the shopper employs the image mosaic processing features of media processing engine 11 to stitch the images together.

The shopper selects rug image I500 from the SELL site, triggering a download of merchant product media from the SELL computer to the SHOP computer. The merchant SELL node transfers an intelligent image package IIP for the rug product that includes three product images 21, one for each rug color scheme offered, six size parameters denoting the dimensions of three rug sizes offered, and PC graphic PG6. The SELL node also transfers an Intelligent Ancillary Data Package IDP containing PUP2-10. No 3D object geometry 20 is transferred from SELL site to SHOP; rug geometry is generated by the SHOP node.

Figure 28B:
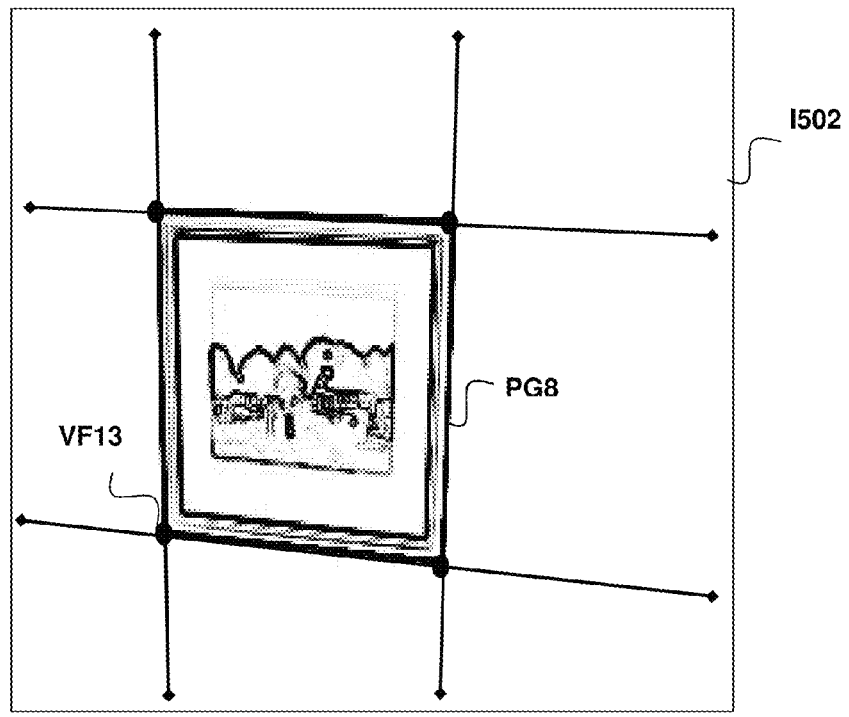
FIG. 28B is an image of a picture product to be used for the collage processing.

The shopper also takes her digital camera to a local retail store and acquires artwork image I502 of FIG. 28B to visualize it in the same living room with the rug. She imports image I502 from the digital camera into her computer as user data 24. As a SHOP node, through user-interactive input 804, the shopper employs media processing engine 11 configured in image collage construction mode to produce the collage of scene I200 with rug image I500 and artwork image I502, resulting in image I401, shown in FIG. 30.

To view the rug options downloaded with the IIP, the SHOP node application allows the shopper to click on collage product items to scroll through the insertion of the three pattern options. The SHOP node also scales the collage geometry according to the merchant supplied size parameters, allowing the user to select and visualize the various rug size offerings. When selected, PUP2-20 is displayed to provide online product information and launch the SELL node purchasing transaction system.

EXAMPLE 2

The shopper of Example 1 wants to interactively simulate placement of the rug in various positions on the floor within the living room scene. The shopper employs the system 3D scene construction mode.

Figure 40A:
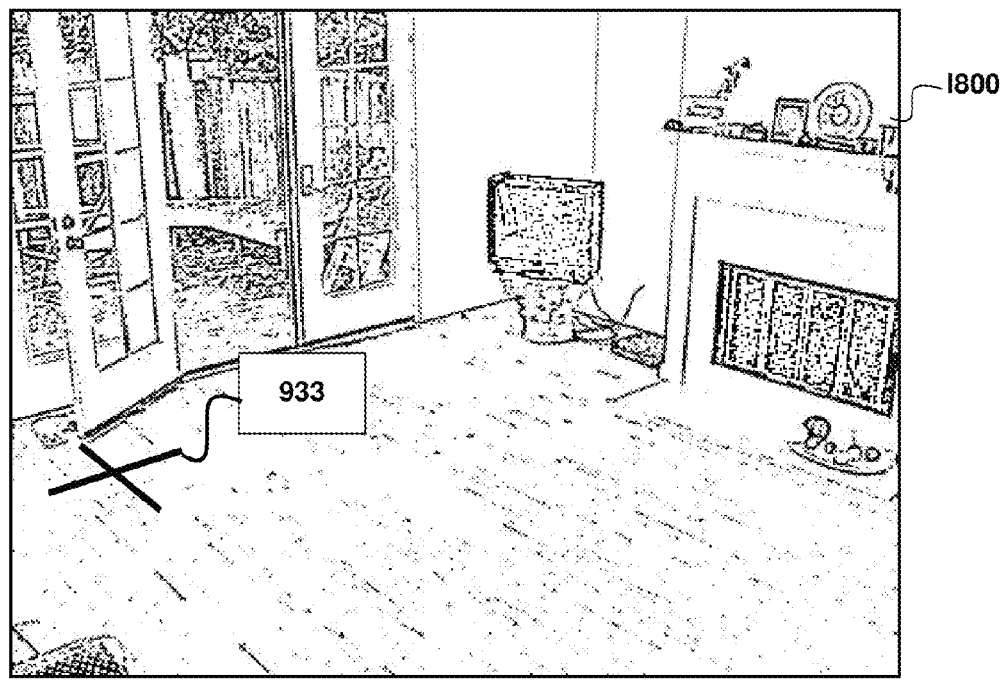
FIG. 40A is an image of a room scene with an annotation added to the depicted floor" representing the anchor point for an object to be inserted.
Figure 40B:
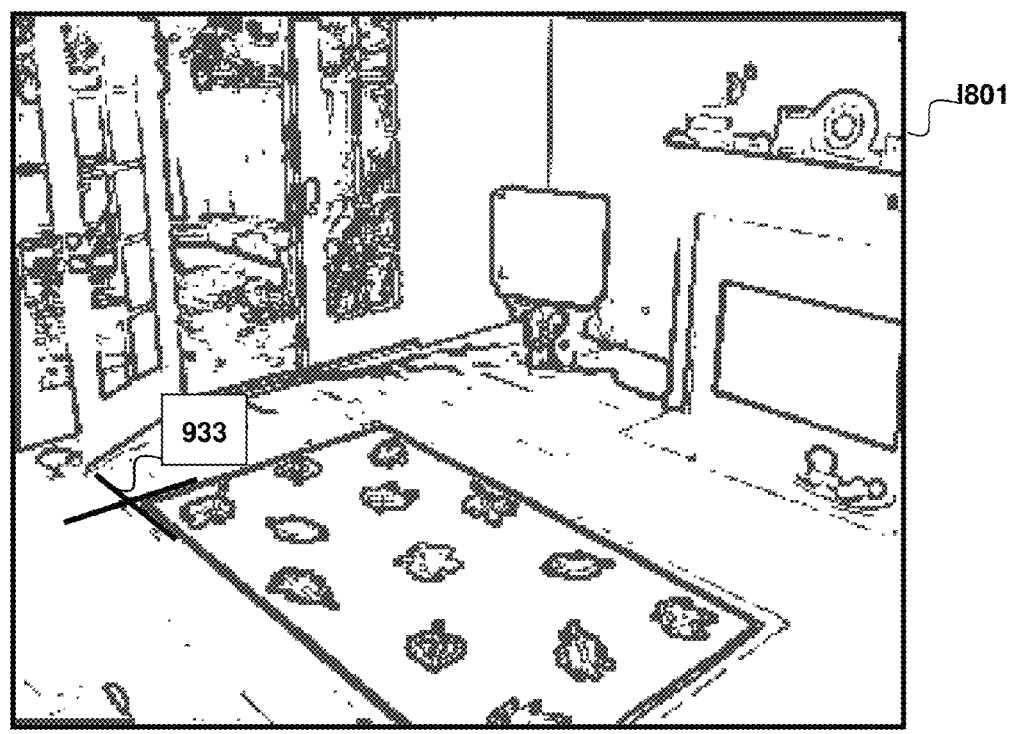
FIG. 40B is the image with the rug object of FIG. 28A inserted at the anchor point on the floor.
Figure 41A:
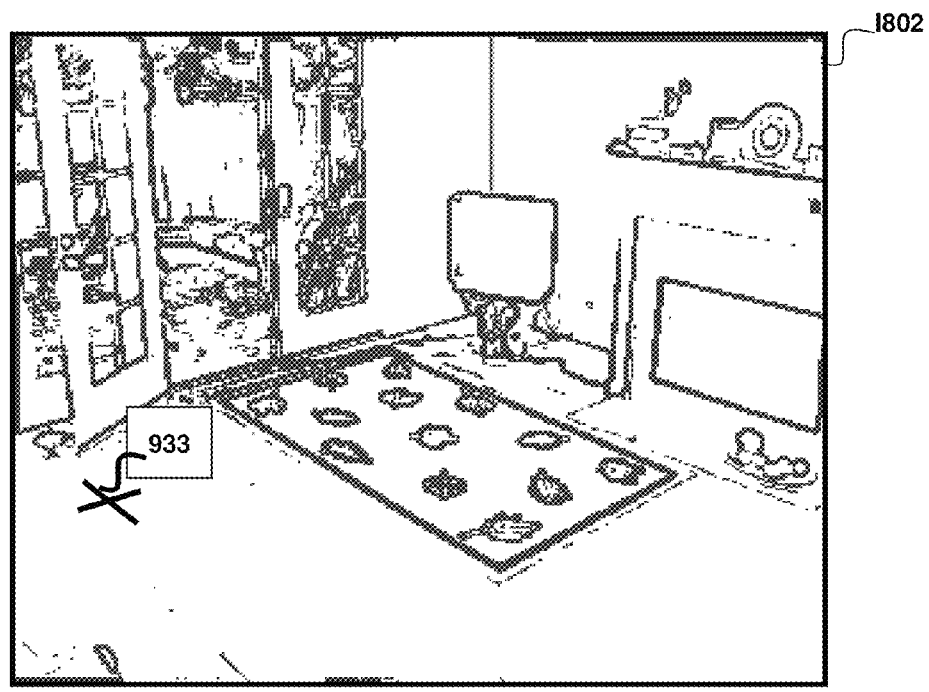
FIG. 41A is the image with the rug object moved along the floor, away from the initial from the original anchor point.
Figure 41B:
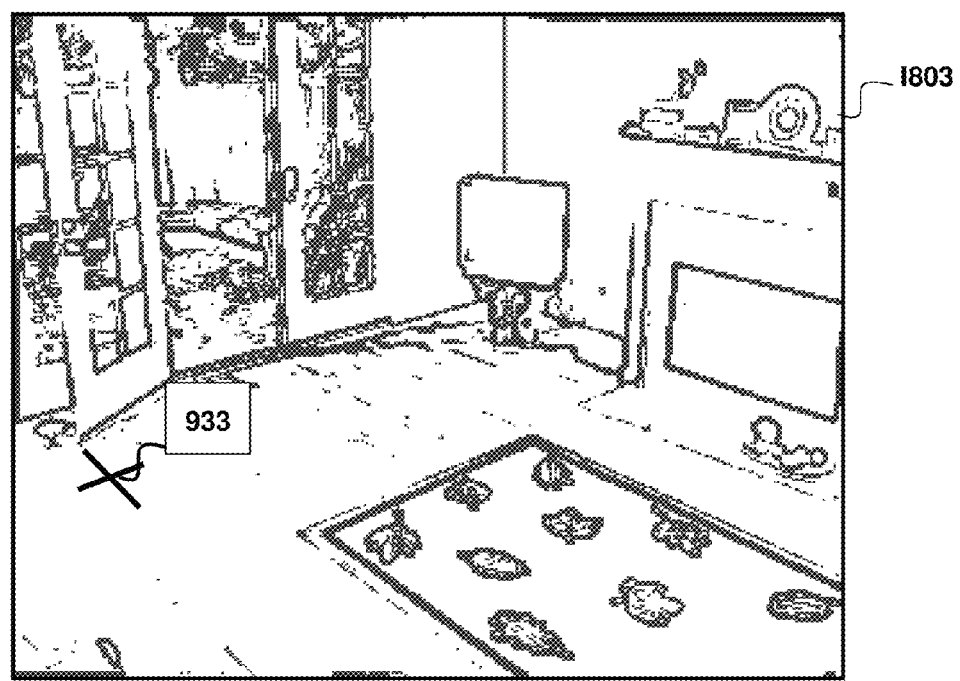
FIG. 41B is the same image with the rug moved to some other location on the floor.

The previously described process flow of FIG. 39, with the integration of "rug" object of FIG. 28 image I500 within scene I200 of FIG. 18A and "true-to-scale" object insertion of FIG. 40A and FIG. 40B, is executed. In her living room, the shopper measures the distance between the back wall of the room and the marble fireplace base as well as the combined width of the two right French doors. The shopper aligns PC graphic PG1 as shown in FIG. 18C image I200 and enters the measured values for the width and length parameters of PC structure PS20. The scene construction becomes calibrated to the true dimensions of the shopper's living room.

To place the rug on the floor of the room, the shopper selects point VF5 on the rug in image I500 and anchor point 933 on the floor in image. The system automatically places and dimensions the rug on the floor with the true rug dimensions downloaded with the merchant IIP. Using the IIP information and the system interactive simulation functions, the shopper interactively repositions the rug to various locations on the floor and scrolls through the various rug sizes, patterns, and colors. The system automatically and seamlessly interchanges HP supplied shape parameters, texture maps, and color data.

EXAMPLE 3

A shopper of home furnishings visits a merchant e-commerce web site on network 10. The merchant-site is enabled as a SELL server node SN200. The shopper selects an option at the merchant site to visualize products in his home. This selection launches the download of a merchant-tailored media processing engine 11 software S-PROG from the merchant SELL site to the shoppers' computer system on network 10. This transaction enables the shopper as a SHOP node CN100 with media processing engine 11 software C-PROG.

Figure 44B:
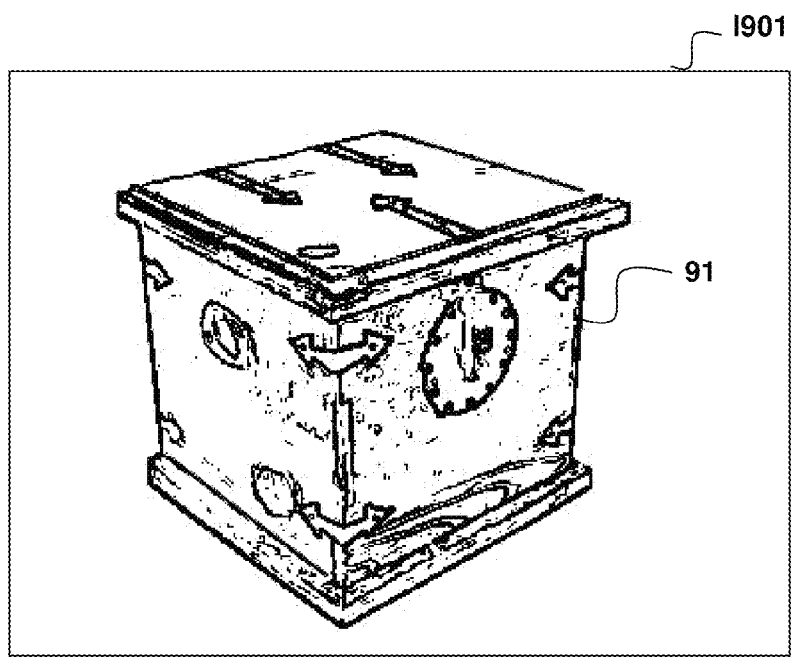
FIG. 44B is an image of a cubical pine storage box.

Displayed at the merchant site is pine storage box 91 depicted in FIG. 44B image I901. The shopper selects image I901 and the SELL node transfers an IOP and an IDP for the product to the shopper SHOP node. The IOP transferred contains the product scene graph, geometric structures, camera models, texture map imagery, and parametric shape and function parameters. The IDP contains graphic information display PUP3-30.

The shopper visits web site of another merchant on network 10. The second merchant site is also enabled as a SELL server node SN200. Displayed at the merchant site is CD cabinet 90 depicted in FIG. 44A image I900. The shopper selects image I900 and the merchant SELL node transfers an IOP and an IDP, including PUP2-20, for the product.

Figure 45A:
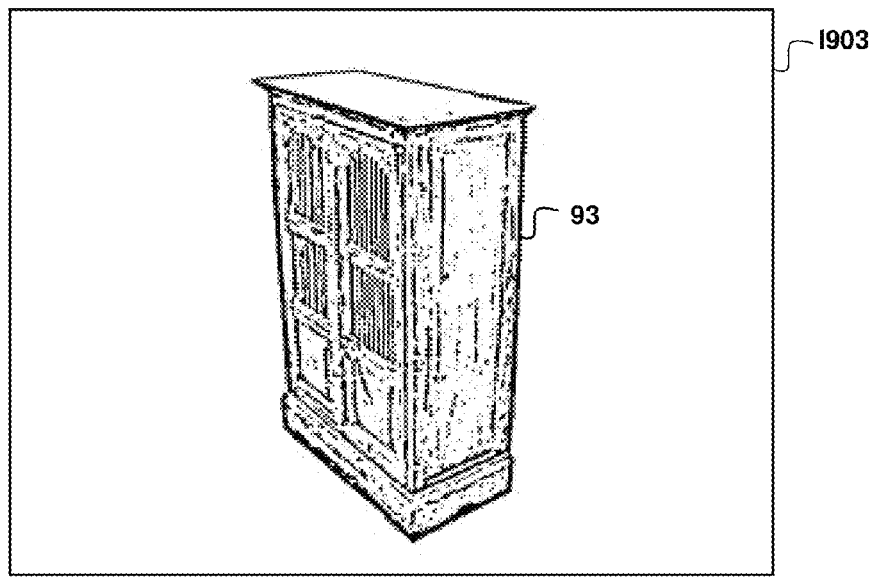
FIG. 45A is an image of a dark brown wood cabinet.

The shopper visits a third web site on network 10. At that e-commerce site, the merchant displays wood cabinet 93 as image I903 of FIG. 45A. This merchant site is not enabled as an SELL node, so the shopper downloads only image I903 using the image download facility of his web browser. The shopper manually records the advertised dimensions of the product for future manual entry into the SHOP node system.

The shopper takes a picture of the room he has in mind for the products. The shopper acquires scene image I700 of with a conventional camera and has the film developed through a service that provides digital images returned over the Internet. The shopper downloads his image I700 as user data 24 over network 10 from the film service.

Figure 45B:
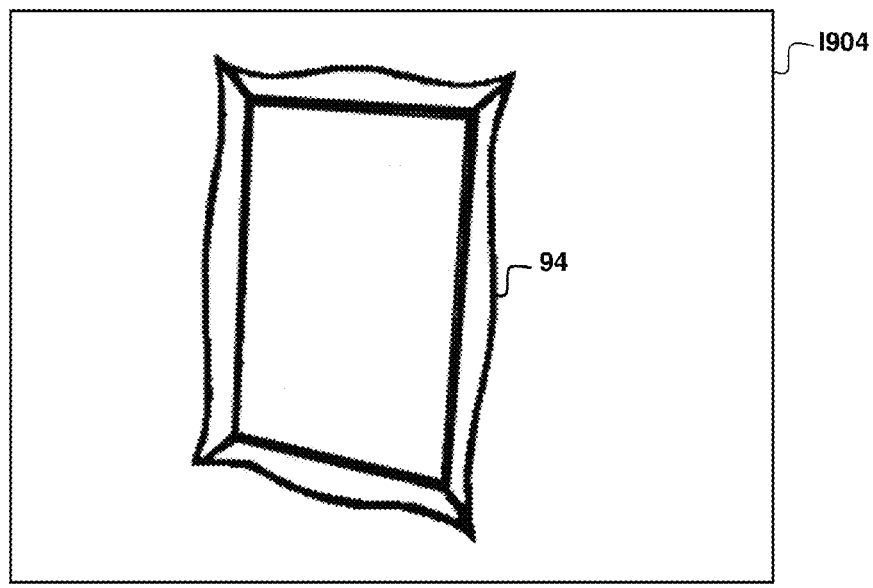
FIG. 45B is an image of a cubical pine storage box.

The shopper visits a local retail store and acquires photographs of the mirror product of image I904 of FIG. 45B and the artwork product of image I502 FIG. 28B. No dimensions for these items are obtained. These photographs are processed into digital images and downloaded into the SHOP node in the same manner as scene image I770.

Employing the C-PROG 3D scene construction program downloaded from the first merchant SELL node, the shopper produces the 3D construction from scene image I700. The shopper supplies actual room dimensions that correspond to the dimensions S1 and S2 of PC structure PS10. The room scene geometry and camera model are calibrated to true scale. If a greater extent of the room scene is desired, the shopper would acquire more images of the room and continue with the 3D scene construction process in multi-image mode.

Employing C-PROG, 3D object construction program downloaded from the first merchant SELL node, the shopper constructs a parametric 3D texture-mapped model for brown cabinet 93. The parametric model is produced true scale using the product dimensions recorded by the shopper.

The shopper then uses the construction "true-to-scale" object insertion process to insert SELL node supplied 3D models for pine storage box 91 and CD cabinet 90 and shopper constructed 3D model for brown cabinet 93 onto the floor of the shopper constructed 3D scene. The "force-fit" insertion process is employed to place mirror 94 and the artwork of image I502 on the walls of the 3D scene construction. This entails the user placing a PC graphic in each product image as the product source regions and a corresponding PC graphic on the wall locations desired as the destination regions. For the placement of mirror product 94, the system also employs the rendering engine 17 projective alpha channel masking and composition layering to produce the detail of the wrought iron frame.

Figure 46:
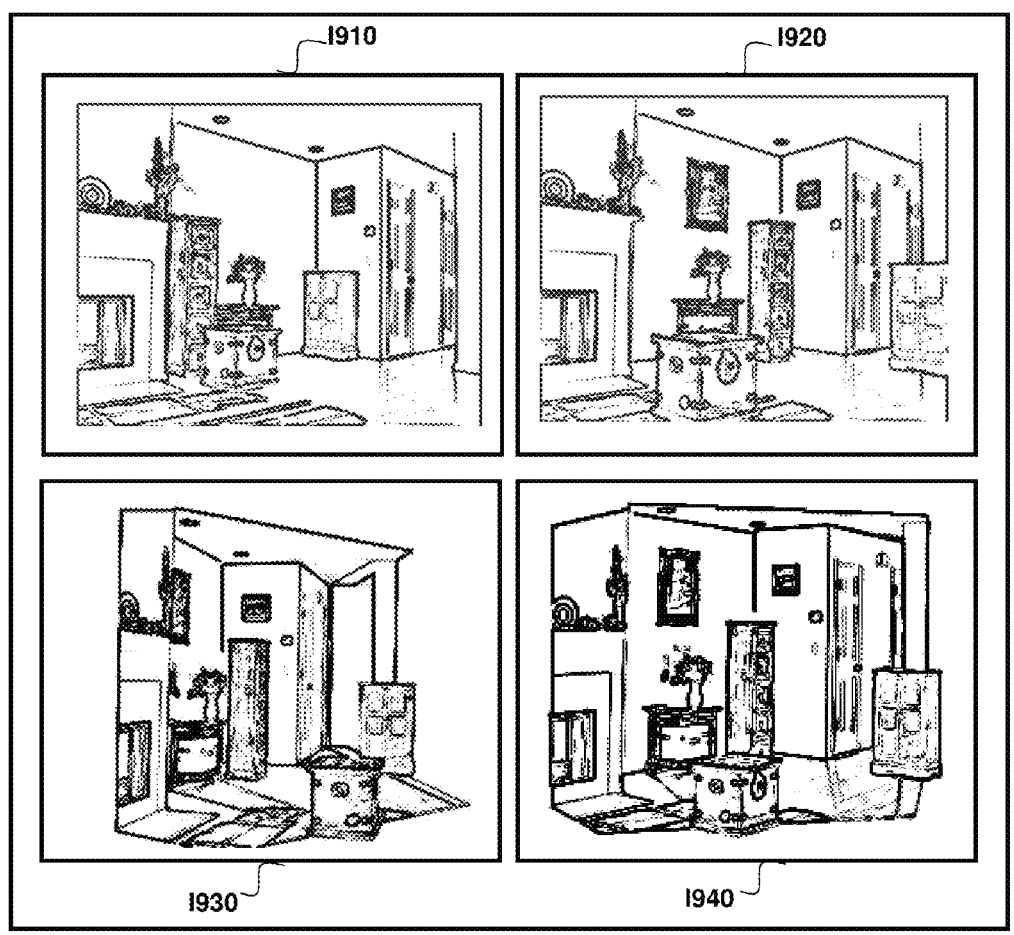
FIG. 46 shows four images of a room scene generated by the construction of a 3D model of the room in FIG. 35, insertion of constructed 3D models of the products depicted in FIG. 44A, FIG. 44B, FIG. 45A and FIG. 45B, and user-interactive navigation of the scene and movement of the product models within the scene.

The selected products are then simulated in 3D in the shopper's room scene, with the user interactively navigating the scene, repositioning the products, and exploring the functional IOP components. FIG. 46 images I910, I920, I930, and I940 show several frames of a real-time interactive 3D simulation rendered by the SHOP node. The two cabinets and the pine box are placed at various positions on the floor throughout the 3D room scene. The mirror and artwork products remain attached in place on the walls. In image I910, the mirror is moved on the wall to another location (not visible).

FIG. 48 (image I990) is a frame of the output display showing the deployment of PUP2-20 attached to the CD cabinet and PUP3-30 attached to the pine storage box. In the present example, the shopper clicks on the PUPs to view and hear about the product specifications, pricing, and options. To order a product, the user clicks on a PUP and the system launches the order transaction system of the attached SELL node.

What is claimed is:

1. A computer implemented method of three-dimensional modeling from at least one two-dimensional image of a three-dimensional space, said computer comprising one or more processor, memory, one or more user input device, one or more data output device, and one or more data storage device, wherein data relating to said at least one two-dimensional image is transformed into a three-dimensional model of the three-dimensional space or one or more objects depicted within the three-dimensional space, the method comprising the steps of:
receiving a first input representing a two-dimensional image of the three-dimensional space or one or more objects in the three-dimensional space, as captured by a camera in the three-dimensional space;
receiving a second input representing a two-directional set of lines consisting of at least two sets of two or more parallel perspective lines, the sets orthogonal to each other; and calculating camera parameters using the two-directional set of lines; wherein camera parameters include at least a camera position and a focal length;
receiving a third input representing a plurality of features depicted in the two-dimensional image of the three-dimensional space or one or more objects in the three-dimensional space, as captured by a camera in the three-dimensional space, which define a two-dimensional shape bounded by the edges; and
receiving a fourth input for indicating a geometric operation, and in response thereto, performing the geometric operation, to form a three-dimensional structure;
wherein the step of receiving an input representing a plurality of features depicted in the two-dimensional image, which define a two-dimensional shape bounded by edges, is a step of creating a three-dimensional model of the two-dimensional shape bounded by the edges in the three-dimensional space;
wherein said steps are performed on said computer.

2. The computer implemented method according to claim 1, further comprising:
receiving at least one scale dimension reference, wherein a dimension reference is a measurement of a distance in the space corresponding to a separation of two points on the digital image; and calculating the camera parameters using the two-directional set of lines and the dimension reference.

3. The computer implemented method of claim 1 wherein the step of receiving a fourth input for indicating a geometric operation, and in response thereto, performing the geometric operation, wherein said geometric operation is an extrusion operation, and in response thereto, extruding the two-dimensional shape to form a three-dimensional structure.

4. The computer implemented method of claim 1 wherein the step of receiving an input representing a two-dimensional image further comprises receiving a second or more additional two-dimensional images of the three-dimensional space and using each of the images of the three-dimensional space.

5. The computer implemented method according to claim 1, wherein the two-directional set of lines are also co-planar.

6. The computer implemented method according to claim 1, wherein the two-directional set of lines form a 4-sided polygon.

7. A computer implemented method of three-dimensional modeling from at least one two-dimensional image of a three-dimensional space, said computer comprising one or more processor, memory, one or more user input device, one or more data output device, and one or more data storage device, wherein data relating to said at least one two-dimensional image is transformed into a three-dimensional model of the three-dimensional space or one or more objects depicted within the three-dimensional space, the method comprising the steps of:
receiving a first input representing a two-dimensional image of the three-dimensional space or one or more objects in the three-dimensional space, as captured by a camera in the three-dimensional space;
receiving a second input representing a two-directional set of lines consisting of at least two sets of two or more parallel perspective lines, the sets orthogonal to each other; and calculating camera parameters using the two-directional set of lines; wherein camera parameters include at least a camera position and a focal length;
receiving a third input representing a first three-dimensional geometric structure and a plurality of two-dimensional image features depicted in the two-dimensional digital image of the three-dimensional space or one or more objects in the three-dimensional space, as captured by a camera in the three-dimensional space, which correspond to the three-dimensional geometric structure elements;
receiving a fourth input representing a second three-dimensional geometric structure and a plurality of two-dimensional image features depicted in the two-dimensional digital image of the three-dimensional space or one or more objects in the three-dimensional space, as captured by a camera in the three-dimensional space, which correspond to the three-dimensional geometric structure elements; and
receiving a fifth input for indicating a geometric operation involving the first three-dimensional geometric structure, the second three-dimensional geometric structure, or both, and in response thereto, performing the geometric operation;
wherein said steps are performed on said computer.

8. The computer implemented method according to claim 7 wherein the geometric operation is an intersection of the first three-dimensional geometric structure and the second three-dimensional geometric structure.

9. The computer implemented method according to claim 7 further comprising a step of receiving additional input representing a two-dimensional digital image of the three-dimensional space for second and subsequent images of the space and using each of the images of the three-dimensional space.

10. A computer system for three-dimensional modeling from at least one two-dimensional image of a three-dimensional space, said computer system comprising:
one or more processor for performing instructions for:
receiving a first input representing a two-dimensional image of the three-dimensional space or one or more objects in the three-dimensional space, as captured by a camera in the three-dimensional space;
receiving a second input representing a two-directional set of lines consisting of at least two sets of two or more parallel perspective lines, the sets orthogonal to each other; and calculating camera parameters using the two-directional set of lines; wherein camera parameters include at least a camera position and a focal length;
receiving a third input representing a plurality of features depicted in the two-dimensional image of the three-dimensional space or one or more objects in the three-dimensional space, as captured by a camera in the three-dimensional space, which define a two-dimensional shape bounded by the edges; and receiving a fourth input for indicating a geometric operation, and in response thereto, performing the geometric operation, to form a three-dimensional structure;

wherein the step of receiving an input representing a plurality of features depicted in the two-dimensional image, which define a two-dimensional shape bounded by edges, is a step of creating a three-dimensional model of the two-dimensional shape bounded by the edges in the three-dimensional space;

wherein said steps are performed on said computer.

11. The computer system according to claim 10, wherein the instructions further comprise:

determining, prior to calculating camera parameters, at least one dimension reference, wherein a dimension reference is a measurement of a distance in the space corresponding to a separation of two points on the digital image; and calculating, from the image, the at least one dimension reference and the two-directional set of lines, camera parameters for a camera in the space from which the image was captured, wherein the camera parameters include at least a camera position and a focal length.

* * * * *